US011788255B2

(12) United States Patent
Fukuda et al.

(10) Patent No.: US 11,788,255 B2
(45) Date of Patent: Oct. 17, 2023

(54) WORKING MACHINE

(71) Applicant: KUBOTA CORPORATION, Osaka (JP)

(72) Inventors: Yuji Fukuda, Osaka (JP); Ryota Hamamoto, Osaka (JP); Jun Tomita, Osaka (JP); Daiki Abe, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 358 days.

(21) Appl. No.: 17/360,398

(22) Filed: Jun. 28, 2021

(65) Prior Publication Data
US 2021/0404150 A1 Dec. 30, 2021

(30) Foreign Application Priority Data

Jun. 30, 2020 (JP) ................................ 2020-112965
Aug. 15, 2020 (JP) ................................ 2020-137178
May 14, 2021 (JP) ................................ 2021-082588

(51) Int. Cl.
*E02F 9/22* (2006.01)
(52) U.S. Cl.
CPC .......... *E02F 9/2253* (2013.01); *E02F 9/2246* (2013.01); *E02F 9/2267* (2013.01); *E02F 9/2285* (2013.01); *E02F 9/2296* (2013.01)
(58) Field of Classification Search
CPC ...... E02F 9/2246; F16H 61/46; F16H 61/461; F16H 61/4183
See application file for complete search history.

(56) References Cited

U.S. PATENT DOCUMENTS

| 9,316,310 | B2* | 4/2016 | Kinugawa | ............. | F16H 61/468 |
| 10,451,094 | B2* | 10/2019 | Fukuda | .................. | E02F 9/226 |
| 10,648,156 | B2* | 5/2020 | Fukuda | ................ | F15B 11/163 |
| 11,168,462 | B2* | 11/2021 | Fukuda | .................... | E02F 9/22 |
| 11,236,491 | B2* | 2/2022 | Fukuda | ................ | E02F 9/2289 |

(Continued)

FOREIGN PATENT DOCUMENTS

| JP | 2013-036274 A | 2/2013 |
| JP | 2013-078115 A | 4/2013 |

(Continued)

*Primary Examiner* — Thomas E Lazo
(74) *Attorney, Agent, or Firm* — GREENBLUM & BERNSTEIN, P.L.C.

(57) ABSTRACT

A working machine includes a prime mover, a traveling pump driven by a power of the prime mover to deliver operation fluid, a traveling motor rotated by the operation fluid delivered from the traveling pump to have a rotation speed stage shiftable between a first speed stage and a second speed stage higher than the first speed stage, a traveling switching valve shiftable between a first state where the rotation speed stage of the traveling motor is set to the first speed stage and a second state where the rotation speed stage of the traveling motor is set to the second speed stage, an actuation valve configured to change a pilot pressure of a pilot fluid to control a flow of operation fluid delivered from the traveling pump, and a controller configured to control the pilot pressure of the pilot fluid output from the actuation valve so that a value of the pilot pressure differs depending on whether the set rotation speed stage of the traveling motor is the first speed stage or the second speed stage.

22 Claims, 26 Drawing Sheets

(56) References Cited

U.S. PATENT DOCUMENTS

| | | | | |
|---|---|---|---|---|
| 11,635,141 B2* | 4/2023 | Hamamoto | ........... | F16H 61/421 60/484 |
| 2017/0284063 A1* | 10/2017 | Fukuda | ..................... | E02F 9/22 |

FOREIGN PATENT DOCUMENTS

| JP | 2017-179922 A | 10/2017 |
|---|---|---|
| JP | 2018-062848 A | 4/2018 |

* cited by examiner

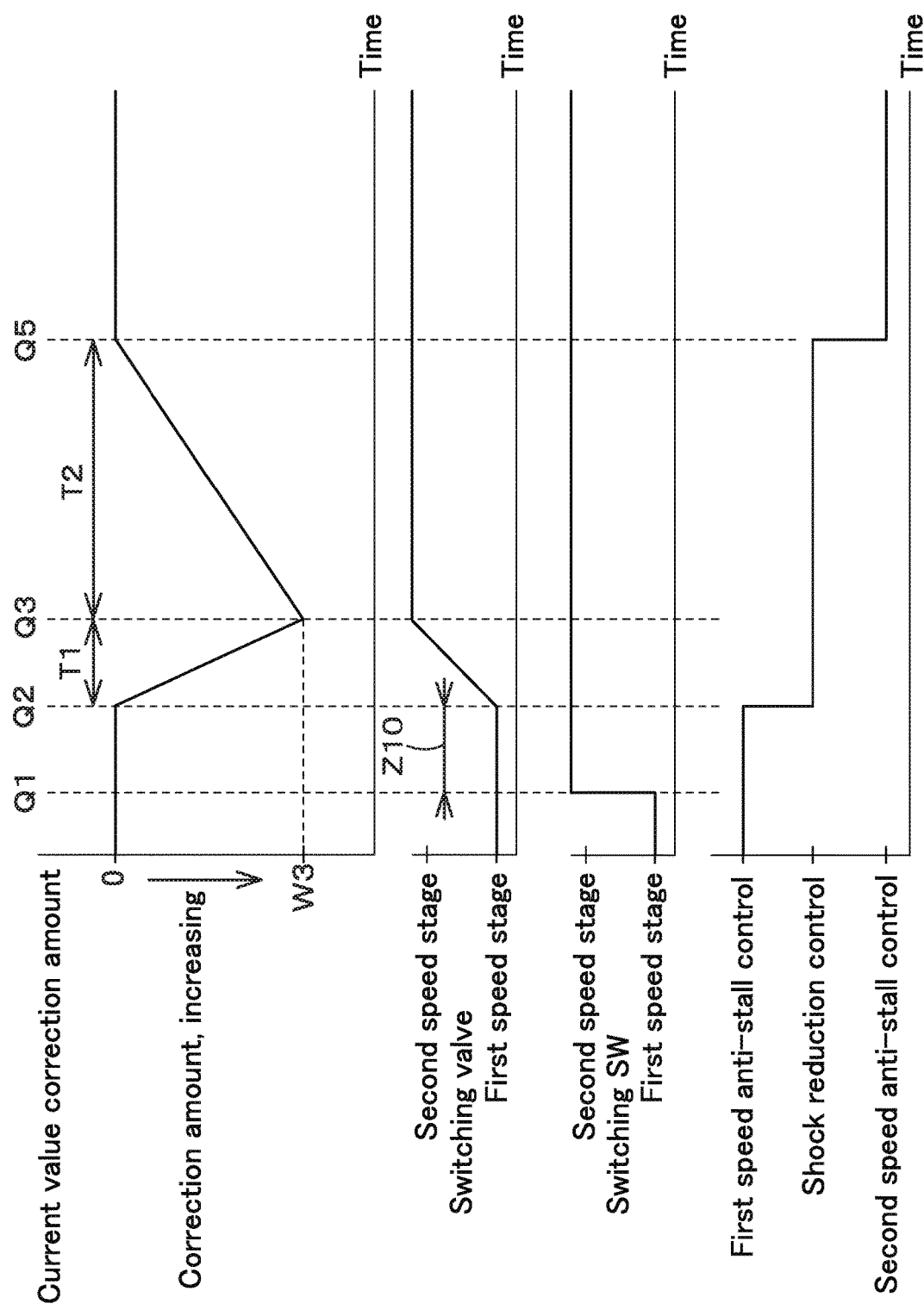

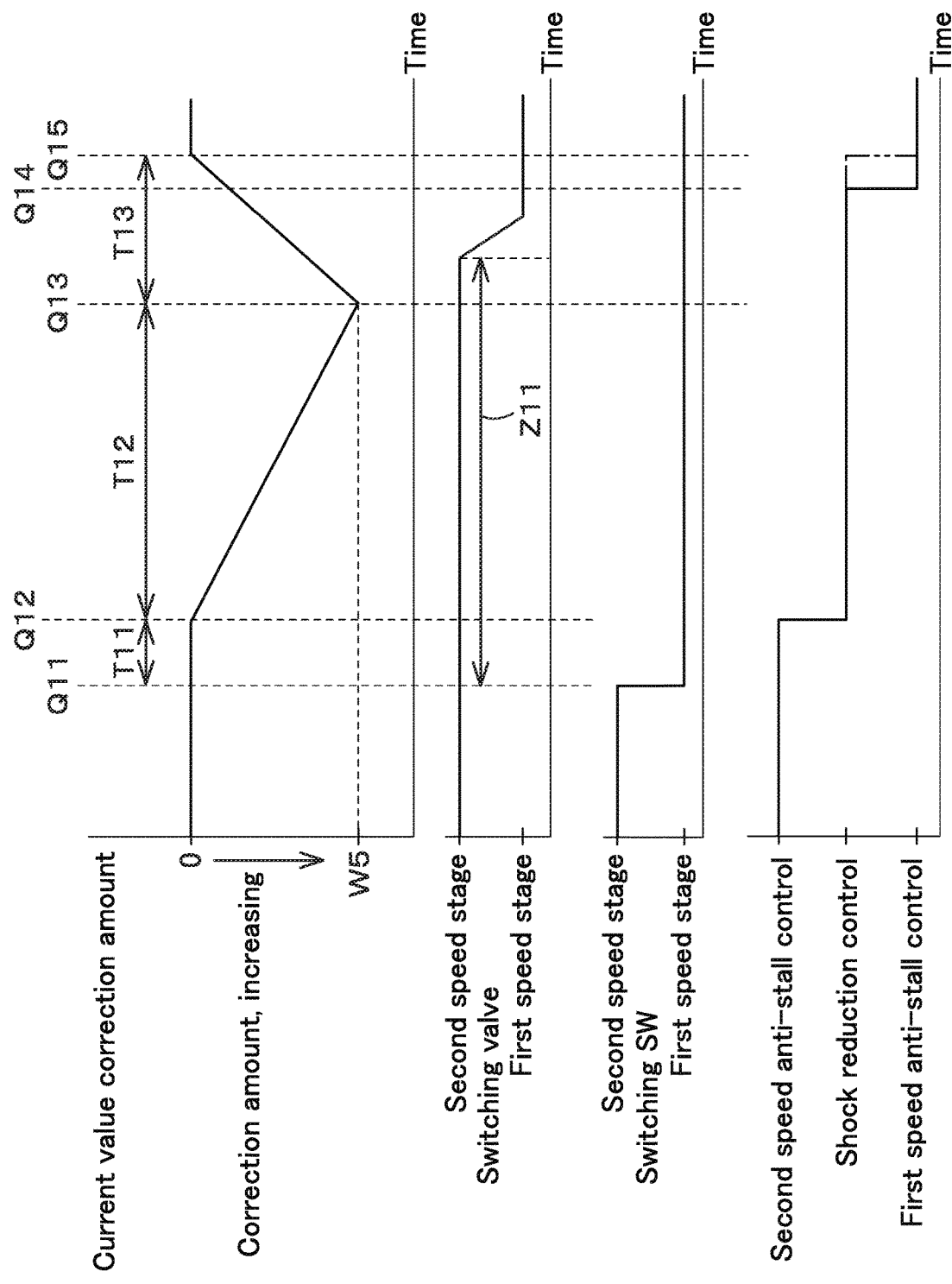

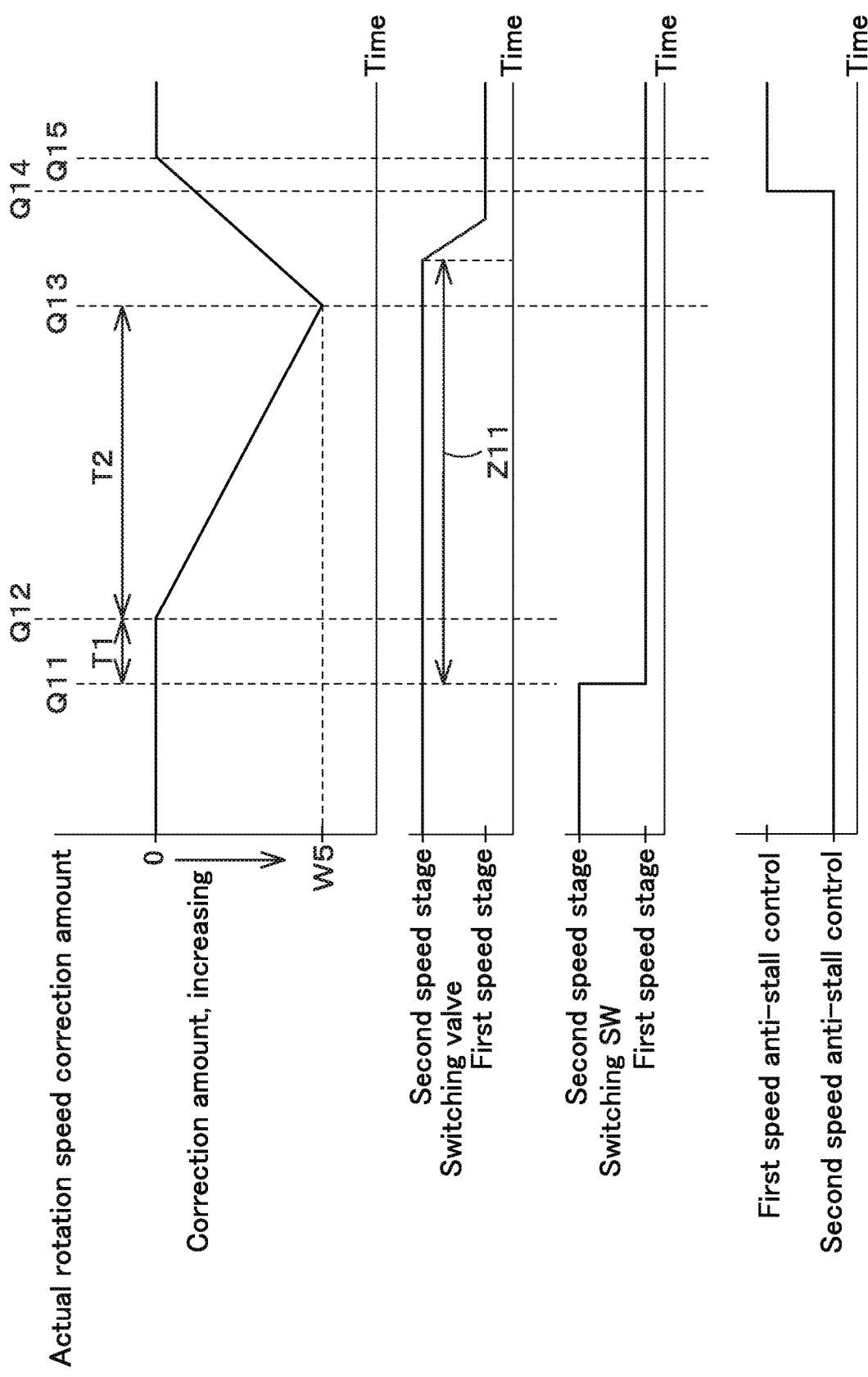

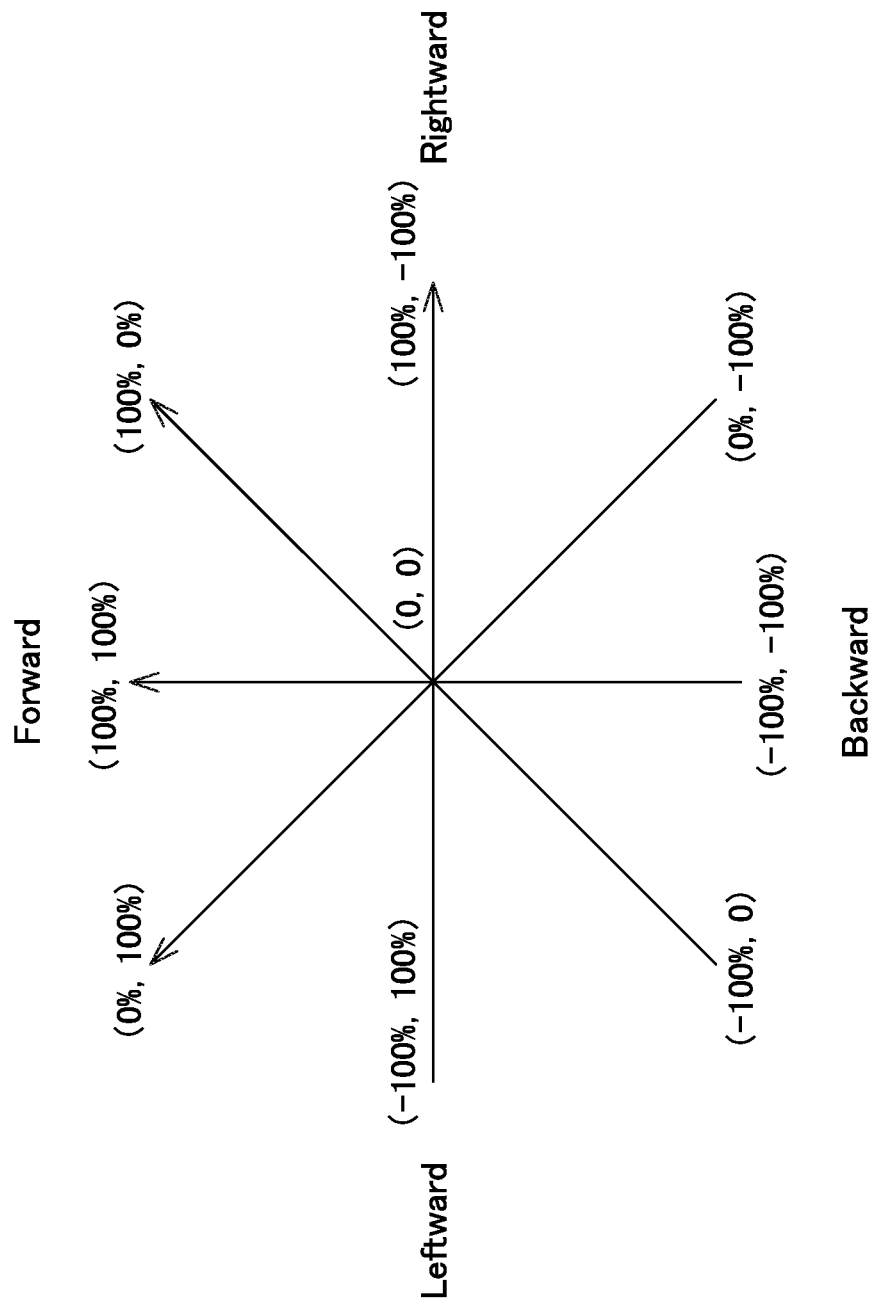

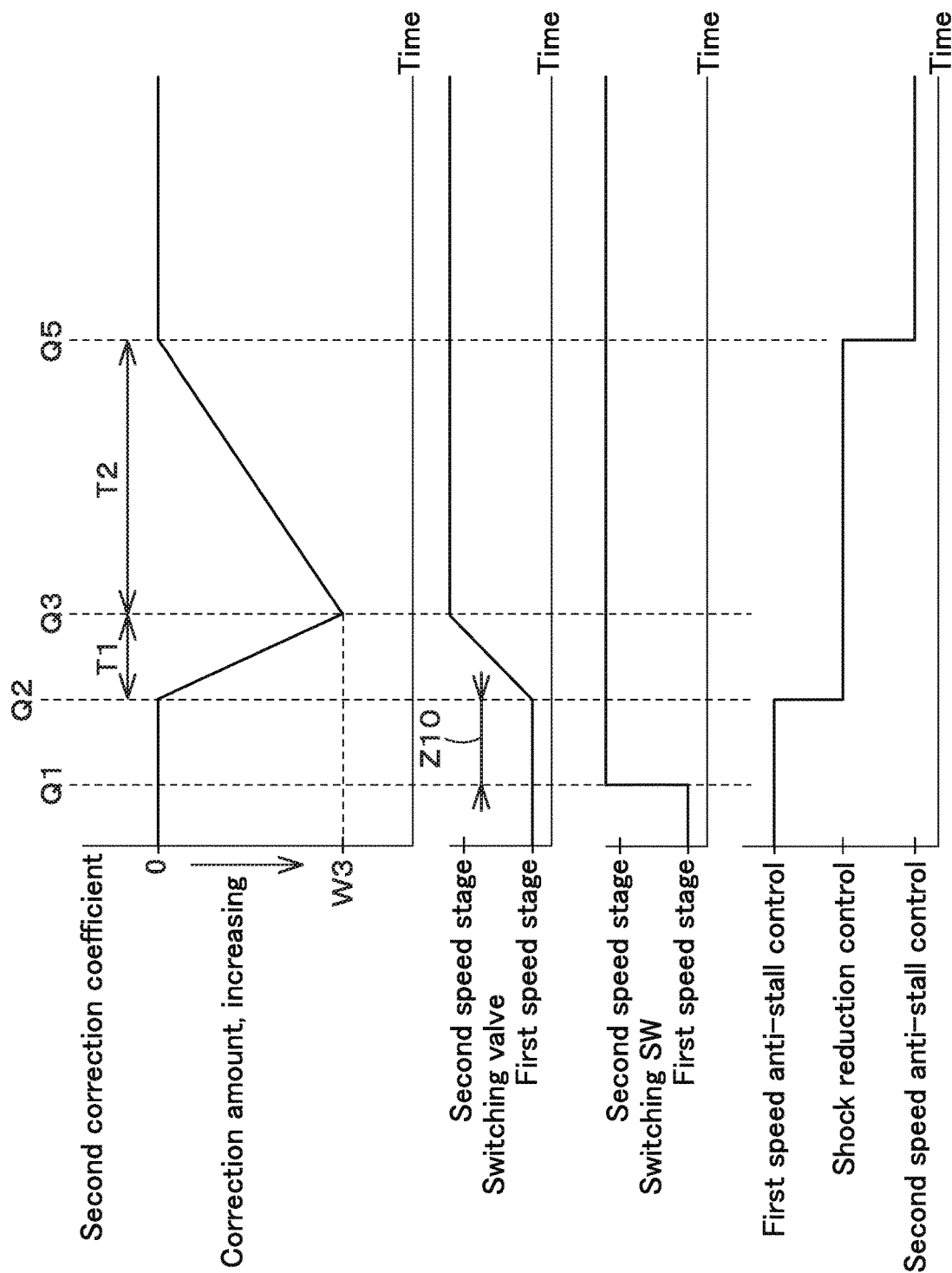

US 11,788,255 B2

WORKING MACHINE

CROSS-REFERENCE TO RELATED APPLICATIONS

This application claims the benefit of priority to Japanese Patent Application No. 2020-112965 filed on Jun. 30, 2020, to Japanese Patent Application No. 2020-137178 filed on Aug. 15, 2020, and to Japanese Patent Application No. 2021-082588 filed on May 14, 2021. The entire contents of this application are hereby incorporated herein by reference.

BACKGROUND OF THE INVENTION

1. Field of the Invention

The present invention relates to a working machine such as a skid steer loader, a compact track loader, and a backhoe.

2. Description of the Related Art

Japanese unexamined patent application publication No. 2013-036274 discloses a technique for preventing engine stall in a working machine such as a skid steer loader and a compact track loader.

The working machine disclosed in Japanese unexamined patent application publication No. 2013-036274 has an engine, an HST pump to be driven by a power of the engine, a traveling operation device configured to operate the HST pump, a pressure control valve configured to control a traveling primary pressure that is a pressure on a primary side of the traveling operation device, and a controller configured to control the pressure control valve.

The controller controls the pressure control valve based on a no-load characteristic line adopted when no load is applied to the engine and a dropping characteristic line adopted when a predetermined load or larger is applied to the engine. The working device disclosed in Japanese unexamined patent application publication No. 2013-036274 describes that the engine stall is prevented through control of the pressure control valve.

In other words, the working machine disclosed in Japanese unexamined patent application publication No. 2013-036274 controls the pressure control valve to rapidly decrease the traveling primary pressure when a traveling load exceeding a predetermined level is applied to the working device, thereby minimizing the decrease in an engine revolving speed as much as possible.

Japanese unexamined patent application publication No. 2017-179922 discloses a technique for reducing and increasing speed in the working machine. A hydraulic system for the working device disclosed in Japanese unexamined patent application publication No. 2017-179922 has a hydraulic pump configured to supply hydraulic fluid, a hydraulic switching valve switchable among positions according to a pressure of the hydraulic fluid, and a traveling hydraulic device configured to change a speed stage according to the position shift of the hydraulic switching valve.

In addition, Japanese unexamined patent application publication No. 2018-62848 discloses a technique for preventing the engine stall of the prime mover in the working machine. The hydraulic system for the working machine disclosed in Japanese unexamined patent application publication No. 2018-62848 has a prime mover, a setting member configured to set a target rotation speed of the prime mover, a hydraulic pump configured to be operable by a driving force of the prime mover and to supply hydraulic fluid, an actuation valve to which the hydraulic fluid supplied from the hydraulic pump is delivered, a storage configured to store a plurality of first control characteristics having different gradients each corresponding to the target rotation speeds that are characteristics showing relationships between pressures of the hydraulic fluid of the actuation valve and actual rotation speeds of the prime mover when a load of the prime mover is equal to or larger than a predetermined level, and a controller controls the actuation valve based on the first control characteristics having different gradients each corresponding to the target rotation speeds, when the load on the prime mover is equal to or larger than the predetermined level.

SUMMARY OF THE INVENTION

In one aspect of the present invention, a working machine comprises a prime mover, a traveling pump driven by a power of the prime mover to deliver operation fluid, a traveling motor rotated by the operation fluid delivered from the traveling pump and to have a rotation speed stage shiftable between a first speed stage and a second speed stage higher than the first speed stage, a traveling switching valve shiftable between a first state where the rotation speed stage of the traveling motor is set to the first speed stage and a second state where the rotation speed stage of the traveling motor is set to the second speed stage, an actuation valve configured to change a pilot pressure of a pilot fluid to control a flow of operation fluid delivered from the traveling pump, and a controller configured to control the pilot pressure of the pilot fluid output from the actuation valve so that a value of the pilot pressure differs depending on whether the set rotation speed stage of the traveling motor is the first speed stage or the second speed stage.

The controller controls the pilot pressure based on whether the set rotation speed stage of the traveling motor is the first speed stage or the second speed stage.

When the rotation speed stage of the traveling motor is set to the first speed stage, the controller controls, based on a rotation speed of the prime mover, a first-speed pilot pressure that is the pilot pressure corresponding to the traveling motor having the rotation speed stage set to the first speed stage. When the rotation speed stage of the traveling motor is set to the second speed stage, the controller controls, based on the rotation speed of the prime mover, a second-speed pilot pressure that is the pilot pressure corresponding to the traveling motor having the rotation speed stage set to the second speed stage.

The controller controls the second-speed pilot pressure to be lower than the first-speed pilot pressure.

The working machine comprises an accelerator configured to determine a target rotation speed of the prime mover, and a rotation detector configured to detect an actual rotation speed of the prime mover. The controller controls the pilot pressure according to a dropping rotation speed that is a difference between the target rotation speed and the actual rotation speed.

The controller adjusts the pilot pressure when the dropping rotation speed is equal to or greater than a first threshold.

The controller determines the pilot pressure based on the actual rotation speed when the dropping rotation speed is equal to or greater than a second threshold.

When the rotation speed stage of the traveling motor is set to the first speed stage, the controller controls, based on an actual rotation speed of the prime mover, a first-speed pilot pressure, which is the pilot pressure corresponding to the traveling motor having the rotation speed stage set to the first speed stage. When the rotation speed stage of the traveling motor is set to the second speed stage, the controller controls, based on the actual rotation speed of the prime mover, a second-speed pilot pressure, which is the pilot pressure corresponding to the traveling motor having the rotation speed stage set to the second speed stage, to be lower than the first-speed pilot pressure.

The working machine comprises an accelerator configured to determine a target rotation speed of the prime mover, and a rotation detector configured to detect an actual rotation speed of the prime mover. The controller includes a storage storing a first line determining the first-speed pilot pressure based on the actual rotation speed when the set rotation speed stage of the traveling motor is the first speed stage, a second line determining the second-speed pilot pressure based on the actual rotation speed when the set rotation speed stage of the traveling motor is the second speed stage, and a third line determining the first-speed pilot pressure and the second-speed pilot pressure based on the actual rotation speed regardless of whether the set rotation speed stage of the traveling motor is the first speed stage or the second speed stage, and a determination unit configured to determine the pilot pressure based on any one of the first line, the second line, and the third line stored on the storage.

The determination unit determines the pilot pressure based on either the first line or the second line when a dropping rotation speed is equal to or greater than a third threshold, the dropping rotation speed being a difference between the target rotation speed determined by the accelerator and the actual rotation speed detected by the rotation detector.

The controller controls the pilot pressure to reduce an operation amount of operating the actuation valve before or after the rotation speed stage of the traveling motor is shifted to either the first speed stage or the second speed stage.

The controller reduces a rotation speed of the prime mover before or after the rotation speed stage of the traveling motor is shifted to either the first speed stage or the second speed stage.

The working machine comprises an accelerator configured to determine a target rotation speed of the prime mover, and a rotation detector configured to detect an actual rotation speed of the prime mover. The controller controls the pilot pressure in a PI control or a PID control based on a dropping rotation speed that is a difference between the target rotation speed and the actual rotation speed.

In the PI control or the PID control, the controller uses a control gain that differs depending on whether the set rotation speed stage of the traveling motor is the first speed stage or the second speed stage.

In the PI control or the PID control, the controller uses a proportional gain that differs depending on whether the set rotation speed stage of the traveling motor is the first speed stage or the second speed stage.

In the PI control or the PID control, the controller uses a differential gain that differs depending on whether the set rotation speed stage of the traveling motor is the first speed stage or the second speed stage.

In another aspect of the present invention, a working machine comprises a prime mover, a traveling pump driven by a power of the prime mover and to deliver operation fluid, a traveling motor rotated by the operation fluid delivered from the traveling pump to have a rotation speed stage shiftable between a first speed stage and a second speed stage higher than the first speed stage, a machine body on which the prime mover, the traveling pump, and the traveling motor are mounted, a traveling switching valve shiftable between a first state where the rotation speed stage of the traveling motor is set to the first speed stage and a second state where the rotation speed stage of the traveling motor is set to the second speed stage, an actuation valve having a variable opening to change a pilot pressure of a pilot fluid to control a flow of the operation fluid delivered from the traveling pump, and a controller to control the opening of the actuation valve. The controller is capable of performing an anti-stall control to reduce the opening of the actuation valve in correspondence to a load on the prime mover by outputting a first control signal to the actuation valve, and performing a shock-reduction control to reduce the opening of the actuation valve in correspondence to the shift of the traveling switching valve from the second state to the first state by outputting a second control signal to the actuation valve. The controller selectively outputs either the first control signal or the second control signal to reduce the opening of the actuation valve.

The actuation valve is configured so that, in the anti-stall control, the opening increases according to increase of a value of the first control signal and reduces according to reduction of the value of the first control signal, and so that, in the shock-reduction control, the opening increases according to increase of a value of the second control signal and reduces according to reduction of the value of the second control signal. The controller selects either one having the smaller value of the first control signal and the second control signal to reduce the opening of the actuation valve.

The working machine comprises an operation member operably connected to the controller to control the opening of the actuation valve. The controller determines a relationship between an operation amount of the operation member and the pilot pressure based on a dropping amount that is a difference between an actual rotation speed of the prime mover and a target rotation speed of the prime mover.

The working machine comprises a storage storing a first control map that defines a relationship between the value of the first control signal and a rotation speed of the prime mover. The controller determines the value of the first control signal based on the first control map.

The working machine comprises a storage storing a second control map that defines a relationship between the value of the first control signal and a traveling speed of the machine body. The controller determines the value of the first control signal based on the second control map.

In the anti-stall control, the controller determines the value of the first control signal based on a dropping amount that is a difference between an actual rotation speed of the prime mover and a target rotation speed of the prime mover. In the shock-reduction control, the controller determines the value of the second control signal when an automatic deceleration control for shifting the traveling switching valve from the second state to the first state is performed.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5A is a view showing a relationship between a control amount of an operation valve, switching of the traveling motor, and an anti-stall control in accelerating a traveling motor from a first speed stage to a second speed stage according to the first embodiment.

FIG. 5B is a view showing a relationship between a control amount of an operation valve, switching of the traveling motor, and the anti-stall control in speed-reducing the traveling motor from the second speed stage to the first speed stage according to the first embodiment.

FIG. 5E is a view showing a relationship between an actual rotation speed and the speed-shift of the traveling motor in the anti-stall control in reducing the traveling motor according to the first embodiment.

FIG. 7A is a view showing operational directions and command values of the operation device according to the second embodiment.

FIG. 9A is a view showing a relationship between a second correction coefficient and the speed-shift of a traveling motor, and an anti-stall control in accelerating the traveling motor from a first speed stage to a second speed stage according to the second embodiment.

DETAILED DESCRIPTION OF THE PREFERRED EMBODIMENTS

Figure 1:
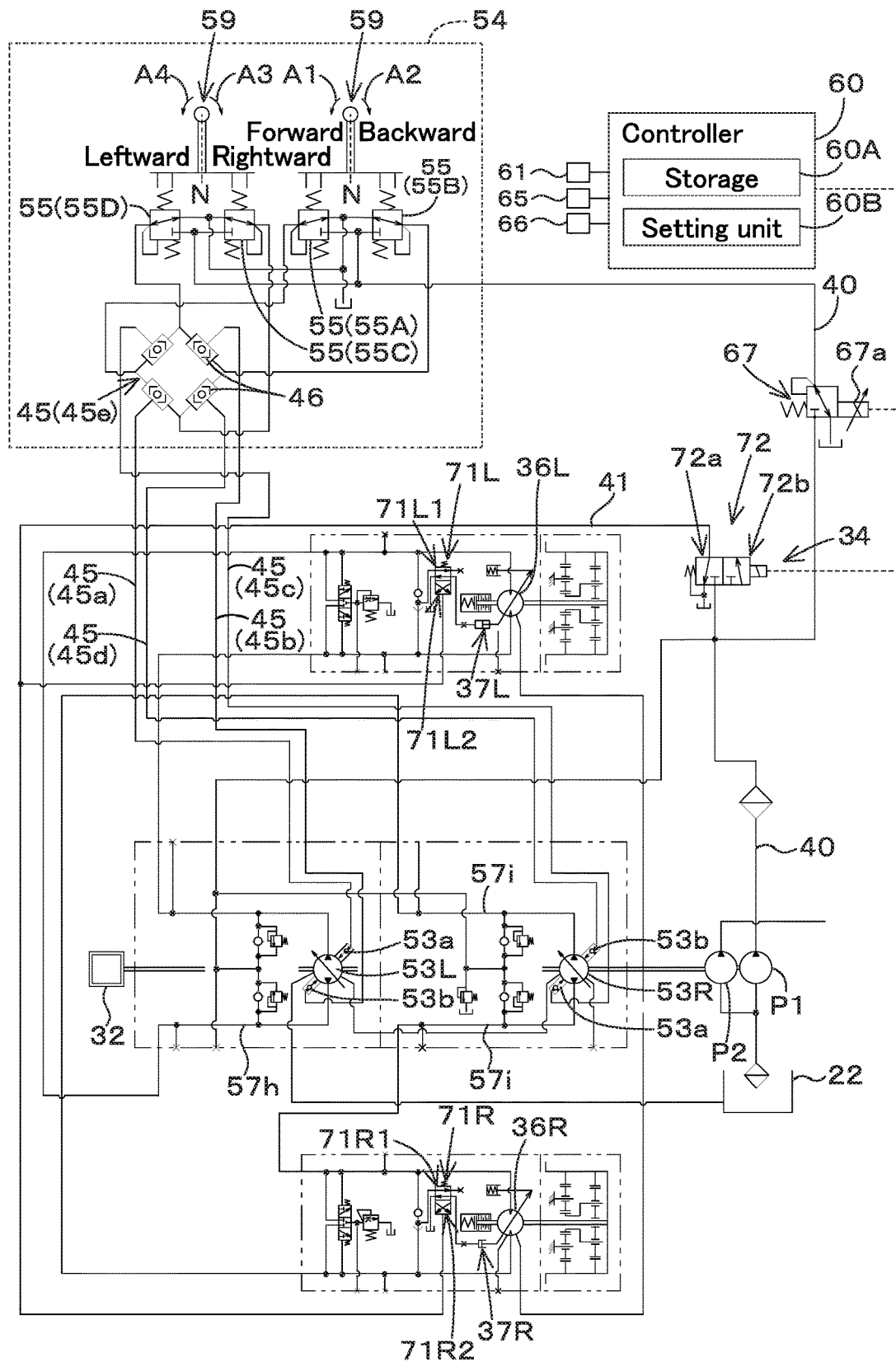
FIG. 1 is a view showing a hydraulic system (a hydraulic circuit) for a working machine according to a first embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to drawings as appropriate, a hydraulic system for a hydraulic system and a working machine having the system according to preferred embodiments of the present invention will be described below.

First Embodiment

A first embodiment of the present invention will be described below.

Figure 17:
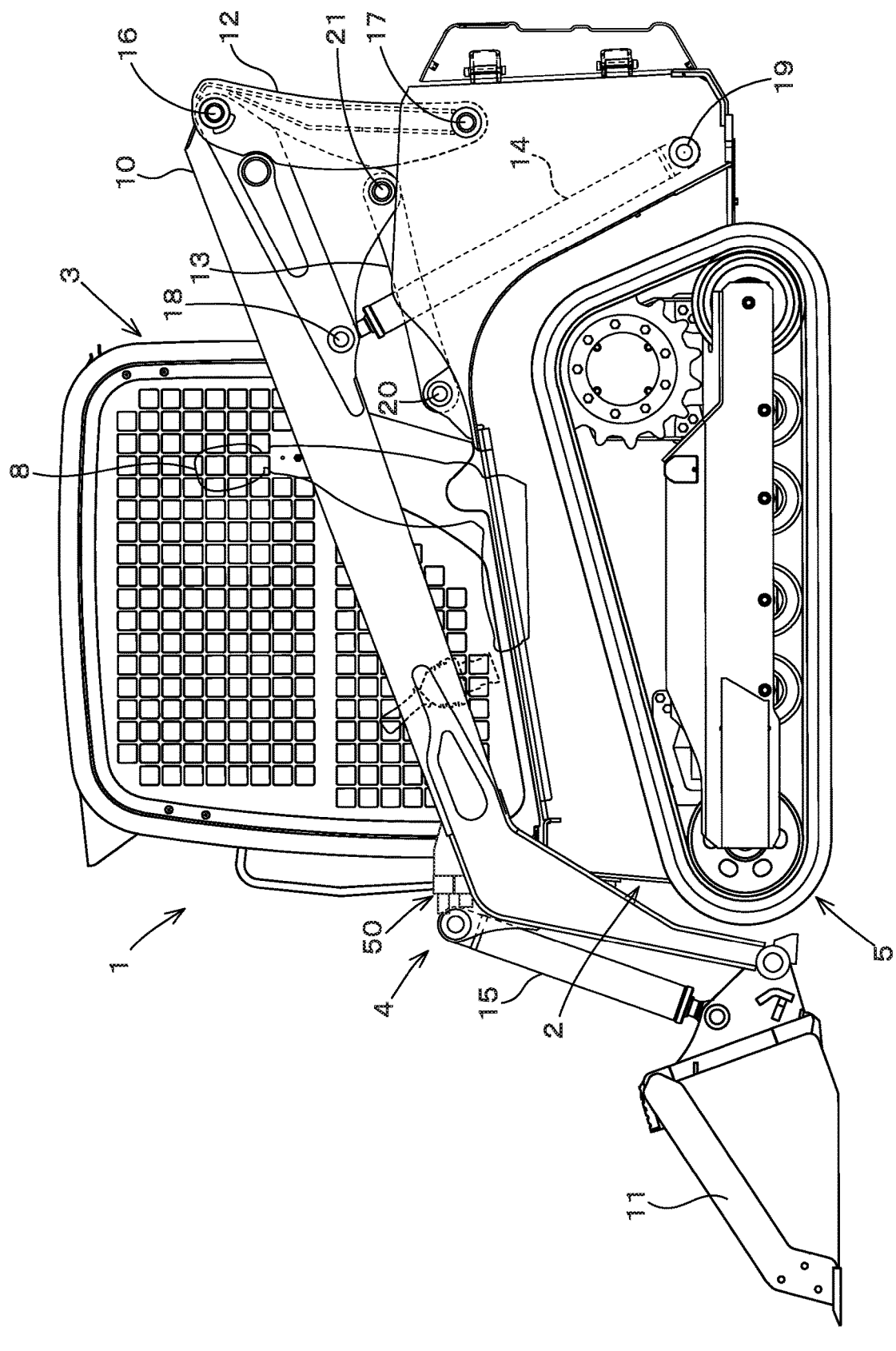
FIG. 17 is a side view showing a track loader that is an example of the working machine according to the first to third embodiments.

Referring to FIG. 17, a working machine 1 according to the embodiment will be explained. FIG. 17 shows a side view of the working machine 1 according to the embodiment. FIG. 17 shows a compact track loader as an example of the working machine 1. However, the working machine 1 is not limited to the compact track loader. The working machine 1 may be other types of loader working machines, such as a skid steer loader, and may be a working machine other than the loader working machine, for example.

As shown in FIG. 17, the working machine 1 has a machine body 2, a cabin 3, a working device 4, and traveling devices 5. In the embodiment, a forward direction of a driver siting on a driver seat 8 of the working device 1 (a left side in FIG. 17) is referred to as the front, a rearward direction of the driver (a right side in FIG. 17) is referred to as the rear, a leftward direction of the driver (a front surface side of FIG.

17) is referred to as the left, and a rightward direction of the driver (a back surface side of FIG. 17) is referred to as the right. In the embodiment, a horizontal direction, which is orthogonal to a fore-and-aft direction, is referred to as a machine width direction. A direction from the center of the machine body 2 to the right or left is referred to as a machine outward direction. In other words, the machine outward direction is the machine width direction and separates away from the machine body 2. A direction opposite to the machine outward direction is referred to as a machine inward direction. In other words, the machine inward direction is the machine width direction and approaches the machine body 2.

The cabin 3 is mounted on the machine body 2. The cabin 3 incorporates the driver seat 8. The working device 4 is attached to the machine body.

The traveling devices 5 are arranged on the outside of the machine body 2. The traveling devices 5 include a first traveling device 5L provided on a left portion of the machine body 2 and a second traveling device 5R provided on a right portion of the machine body 2.

A prime mover 32 is mounted inside a rear portion of the machine body 2.

The working device 4 has a pair of booms 10, a working tool 11, a pair of lift links 12, a pair of control links 13, a pair of boom cylinders 14, and a pair of bucket cylinders 15.

The booms 10 are arranged on right and left sides of the cabin 3 and swingable up and down. The working tool 11 is, for example, a bucket. The bucket 11 is vertically swingably arranged at tip portions (that is, front end portions) of the booms 10.

The lift links 12 and the control links 13 support base portions (that is, rear portions) of the booms 10 so that the booms 10 can be swung up and down. The boom cylinders 14 are telescopically moved to lift and lower the booms 10. The bucket cylinders 15 are telescopically moved to swing the bucket 11.

The front portions of the right and left booms 10 are connected to each other by a deformed connecting pipe. The base portions (that is, rear portions) of the booms 10 are connected to each other by a circular connecting pipe.

Pairs of the lift link 12, control link 13, and boom cylinder 14 are arranged respectively right and left on the machine body 2, corresponding to the right and left booms 10.

The lift links 12 are extended vertically upward from rear portions of the base portions of the booms 10. Upper portions (that is, one ends) of the lift links 12 are supported turnably around a lateral axis by a pair of pivot shafts 16 near the rear portions of the base portions of the booms 10. Lower portions (that is, the other ends) of the lift links 12 are supported turnably around the lateral axis by a pair of pivot shafts 17 near the rear portion of the machine body 2. The pivot shafts 17 are provided below the pivot shafts 16.

Upper portions of the boom cylinders 14 are supported turnably around the lateral axis by a pair of pivot shafts 18. The pivot shafts 18 are provided at the base portions of the booms 10, that is, at front portions of the base portions. Lower portions of the boom cylinders 14 are supported, by a pair of pivot shafts 19, turnably around the lateral axis on a rear lower portion inside the machine body 2. Specifically, the pivot shafts 19 are provided on a lower portion of the rear portion of the machine body 2 and below the pivot shafts 18.

The control links 13 are provided in front of the lift links 12. One ends of the control links 13 are supported turnably around the lateral axis by a pair of pivot shafts 20. The pivot shafts 20 are provided, in the machine body 2, on positions forward of the lift links 12. The other ends of the control links 13 are supported turnably around the lateral axis by a pair of pivot shafts 21. The pivot shafts 21 are provided, in the rear portions of the booms 10, forward of and above the pivot shafts 17.

By extending and contracting the boom cylinders 14, the booms 10 is swung up and down around the pivot shafts 16 with the base portions of the booms 10 being supported by the lift links 12 and the control links 13, thereby lifting and lowering the tip end portions of the booms 10. The control links 13 are swung up and down around the pivot shafts 20 by the vertical swinging of the booms 10. The lift links 12 are swung back and forth around the pivot shafts 17 by the vertical swinging of the control links 13.

A working tool other than the bucket 11 can be attached to the front portions of the booms 10. The other working tool is, for example, an attachment (that is, an auxiliary attachment) such as a hydraulic crusher, a hydraulic breaker, an angle broom, an earth auger, a pallet fork, a sweeper, a mower or a snow blower.

A connector member 50 is provided at the front portion of the left boom 10. The connector member 50 is a device configured to connect a hydraulic equipment attached to the auxiliary attachment to a first piping member such as a pipe provided on the left boom 10. Specifically, the first piping member can be connected to one end of the connector member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are provided respectively near the front portions of the booms 10. The bucket cylinders 15 are extended and contracted to swing the bucket 11.

In the embodiment, the first traveling device 5L provided left and the second traveling device 5R provided right which constitute the traveling devices 5 respectively employ crawler type (including semi-crawler type) traveling devices. Instead of the crawler type, wheel-type traveling devices having front wheels and rear wheels may also be adopted.

The prime mover 32 is an internal combustion engine such as a diesel engine, gasoline engine, an electric motor, or the like. In the embodiment, the prime mover 32 is the diesel engine, but is not limited thereto.

Referring to FIG. 1, a hydraulic system for the working machine 1 according to the embodiment will be described. FIG. 1 is a view showing the hydraulic system (that is, a hydraulic circuit) for the working machine 1 according to the embodiment. The hydraulic system for this working machine 1 is configured to drive the traveling devices 5.

The hydraulic system for the working machine 1 has a first traveling pump 53L, a second traveling pump 53R, a first traveling motor 36L, and a second traveling motor 36R.

The first traveling pump 53L and the second traveling pump 53R are pumps to be driven by the power of prime mover 32. Specifically, each of the first traveling pump 53L and the second traveling pump 53R is a variable displacement axial pump with a swash plate and is driven by the power of prime mover 32. Each of the first traveling pump 53L and the second traveling pump 53R includes a forward-traveling pressure-receiving portion 53a and a backward-traveling pressure-receiving portion 53b each of which receives a pilot pressure. In each of the first and second traveling pumps 53L and 53R, an angle of the swash plate is changed by the pilot pressures applied to the pressure-receiving portions 53a and 53b. By changing the angle of the swash plate, delivery (output) amount and direction of operation fluid from each of the first traveling pump 53L and the second traveling pump 53R is changed.

The first traveling pump 53L and the first traveling motor 36L are connected by a connecting fluid line 57h, and operation fluid delivered from the first traveling pump 53L is supplied to the first traveling motor 36L. The second traveling pump 53R and the second traveling motor 36R are connected by a connecting fluid line 57i, and the operation fluid delivered from the second traveling pump 53R is supplied to the second traveling motor 36R.

The first traveling motor 36L is a motor configured to transmit a power to a drive shaft of the first traveling device 5L provided on the left portion of the machine body 2. The first traveling motor 36L is capable of rotating, using operation fluid supplied from the first traveling pump 53L. By changing a flow rate of operation fluid to the first traveling motor 36L, a rotation speed of the first traveling motor 36L can be changed. A swash plate switching cylinder 37L is connected to the first traveling motor 36L. By extending and contracting the swash plate switching cylinder 37L in one direction or the other direction, a rotation speed of the first traveling motor 36L can be changed.

That is, when the swash plate switching cylinder 37L is contracted, the rotation speed of the first traveling motor 36L is set to a low speed stage (referred to as a first speed stage). When the swash plate switching cylinder 37L is extended, a rotation speed of the first traveling motor 36L is set to a high speed stage (referred to as a second speed stage). That is, a rotation speed of the first traveling motor 36L can be changed between the first speed stage that is a low speed stage and the second speed stage that is a high speed stage.

The second traveling motor 36R is a motor configured to transmit a power to a drive shaft of the second traveling device 5R provided on the right portion of the machine body 2. The second traveling motor 36R is capable of rotating, using operation fluid supplied from the second traveling pump 53R. By changing a flow rate of operation fluid to the second traveling motor 36R, a rotation speed of the second traveling motor 36R can be changed. A swash plate switching cylinder 37R is connected to the second traveling motor 36R. By extending and contracting the swash plate switching cylinder 37R in one direction or the other direction, a rotation speed stage of the second traveling motor 36R can be changed.

That is, when the swash plate switching cylinder 37R is contracted, the rotation speed stage of the second traveling motor 36R is set to a low speed stage (referred to as a first speed stage). When the swash plate switching cylinder 37R is extended, a rotation speed stage of the second traveling motor 36R is set to a high speed stage (referred to as a second speed stage). That is, a rotation speed stage of the second traveling motor 36R is shiftable between the first speed stage that is a low speed stage and the second speed stage that is a high speed stage.

As shown in FIG. 1, the hydraulic system for the working device 1 has a traveling switching valve 34. The traveling switching valve 34 is configured to take either a position (referred to as a first state) for shifting the rotation speed stage of each of the traveling motors (that is, the traveling motor 36L and the traveling motor 36R) to the first speed stage or a position (referred to as a second) for shifting the rotation speed stage of each traveling motor to the second speed stage. The traveling switching valve 34 includes first switching valves 71L and 71R and a second switching valve 72.

The first switching valve 71L is constituted of a two-position switching valve connected via a fluid line to the swash plate switching cylinder 37L of the first traveling motor 36L, and has two positions, a first position 71L1 and a second position 71L2. The first switching valve 71L can be arbitrarily switched to one of the two positions. The first switching valve 71L set at the first position 71L1 contracts the swash plate switching cylinder 37L, and the first switching valve 71L set at the second position 71L2 extends the swash plate switching cylinder 37L.

The first switching valve 71R is constituted of a two-position switching valve connected via a fluid line to the swash plate switching cylinder 37R of the second traveling motor 36R, and has two positions, a first position 71R1 and a second position 71R2. The first switching valve 71R can be arbitrarily switched to one of the two positions. The first switching valve 71R set at the first position 71R1 contracts the swash plate switching cylinder 37R, and the first switching valve 71R set at the second position 71R2 extends the swash plate switching cylinder 37R.

The second switching valve 72 is a solenoid valve that switches the first switching valve 71L and the first switching valve 71R, and is constituted of a two-position switching valve having two positions, i.e., a first position 72a and a second position 72b. The second switching valve 72 is shifted to either one of the two positions depending on whether it is excited or unexcited. The second switching valve 72, the first switching valve 71L, and the first switching valve 71R are connected by a fluid line 41. The second switching valve 72, when switched to the first position 72a, switches the first switching valve 71L and the first switching valve 71R to the respective first positions 71L1 and 71R1, and the second switching valve 72, when switched to the second position 72b, switches the first switching valve 71L and the first switching valve 71R respectively to the second positions 71L2 and 71R2.

That is, the traveling switching valve 34 is set in the first state to shift the rotation speed stage of each of the two traveling motors (that is, the traveling motor 36L and the traveling motor 36R) to the first speed stage when the second switching valve 72 is at the first position 72a, the first switching valve 71L is at the first position 71L1, and the first switching valve 71R is at the first position 71R1. The traveling switching valve 34 is set in the second state to shift the rotation speed stage of each of the two traveling motors (that is, the traveling motor 36L and the traveling motor 36R) to the second speed stage when the second switching valve 72 is at the second position 72b, the first switching valve 71L is at the second position 71L2, and the first switching valve 71R is at the second position 71R2.

Accordingly, the traveling switching valve 34 allows the two traveling motors (that is, the traveling motor 36L and the traveling motor 36R) to be switched between the first speed stage that is a low speed stage and the second speed stage that is a high speed stage.

The hydraulic system for the working machine has a first hydraulic pump P1, a second hydraulic pump P2, and an operation device 54. The first hydraulic pump P1 is a pump to be driven by power of the prime mover 32 and is constituted of a constant displacement type gear pump. The first hydraulic pump P1 is configured to deliver operation fluid stored in the tank 22. Specifically, the first hydraulic pump P1 delivers operation fluid that is mainly used for controlling the hydraulic system.

For convenience of explanation, the tank 22 that stores the operation fluid may be referred to as an operation fluid tank. Of the operation fluid delivered from the first hydraulic pump P1, the operation fluid used for control is referred to as a pilot fluid, and a pressure of the pilot fluid is referred to as a pilot pressure.

The second hydraulic pump P2, is a pump to be driven by power of the prime mover 32, and is constituted of a constant displacement gear pump. The second hydraulic pump P2, is configured to deliver operation fluid stored in the tank 22, and for example, supplies the operation fluid to a fluid line of the working system. The second hydraulic pump P2, supplies operation fluid, for example, to the boom cylinders 14 that operate the booms 10, the bucket cylinders 15 that operate the bucket, and the control valves (that is, flow control valves) that control and operate an auxiliary hydraulic actuator.

The operation device 54 is configured to operate the two traveling pumps (that is, the first traveling pump 53L and the second traveling pump 53R), and is capable of changing the angles of swash plates (referred to as swash plate angles) of the traveling pumps. The operation device 54 includes a traveling operation member 59 and a plurality of operation valves 55.

The traveling operation member 59 is an operation lever that is supported by the operation valves 55 and swings in a lateral direction (that is, the machine width direction) or the fore-and-aft direction. That is, the traveling operation member 59 is swingable to the right and to the left from the neutral position N, and swingable to the front and to the rear from the neutral position N. In other words, the operation lever 59 is swingable in at least four directions from the neutral position N. For convenience of explanation, the forward and backward directions, that is, the fore-and-aft direction, may be referred to as a first direction. The rightward and leftward directions, that is, the lateral direction (that is, the machine width direction), may be referred to as a second direction.

The plurality of operation valves 55 are operated by the single traveling operation member 59. FIG. 1 shows two operation levers 59; one of the two operation levers 59 shows a configuration of the single operation lever 59 seen in the fore-and-aft direction and the other one of the two operation levers 59 shows a configuration of the single operation lever 59 seen in the lateral direction. The plurality of operation valves 55 are actuated based on swinging of the operation lever 59. A delivery fluid line 40 is connected to the plurality of operation valves 55, and operation fluid (that is, pilot fluid) from the first hydraulic pump P1 can be supplied through the delivery fluid line 40. The plurality of operation valves 55 include an operation valve 55A, operation valve 55B, operation valve 55C, and operation valve 55D.

When the operation lever 59 is swung forward (that is, in one direction) in the fore-and-aft direction (that is, the first direction) (that is, when a forward operation is performed), the operation valve 55A changes a pressure of operation fluid to be output according to an operation amount (that is, a swing amount) of the forward operation. When the operation lever 59 is swung backward (that is, the first direction) (that is, in the other direction) in the fore-and-aft direction (that is, when a backward operation is performed), the operation valve 55B changes a pressure of operation fluid to be output according to an operation amount (that is, a swing amount) of the backward operation.

When the operation lever 59 is swung rightward (that is, in one direction) in the lateral direction (that is, the second direction) (that is, when a rightward operation is performed), the operation valve 55C changes a pressure of operation fluid to be output according to an operation amount (that is, a swing amount) of the rightward operation. When the operation lever 59 is swung leftward (that is, in the other direction) in the lateral direction (that is, the second direction) (that is, when a leftward operation is performed), the operation valve 55D changes a pressure of operation fluid to be output according to an operation amount (that is, a swing amount) of the leftward operation.

The plurality of operation valves 55 and the two traveling pumps (that is, the first traveling pump 53L and the second traveling pump 53R) are connected by the traveling fluid line 45. In other words, the two traveling pumps (that is, the first traveling pump 53L and the second traveling pump 53R) are hydraulic equipment that are configured to be operated by operation fluid output from the operation valves 55 (that is, the operation valve 55A, operation valve 55B, operation valve 55C, and operation valve 55D).

The traveling fluid line 45 has a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to a forward-traveling pressure-receiving portion 53a of the first traveling pump 53L. The second traveling fluid line 45b is a fluid line connected to a backward-traveling pressure-receiving portion 53b of the first traveling pump 53L.

The third traveling fluid line 45c is a fluid line connected to a forward-traveling pressure-receiving portion 53a of the second traveling pump 53R. The fourth traveling fluid line 45d is a fluid line connected to a backward-traveling pressure-receiving portion 53b of the second traveling pump 53R. The fifth traveling fluid line 45e is a fluid line that connects the operation valves 55, the first traveling fluid line 45a, the second traveling fluid line 45b, the third traveling fluid line 45c, and the fourth traveling fluid line 45d.

When the operation lever 59 is swung forward (in a direction indicated by an arrowed line A1 in FIG. 1), the operation valve 55A is operated, and a pilot pressure is output from the operation valve 55A. This pilot pressure is applied to the forward-traveling pressure-receiving portion 53a of the first traveling pump 53L via the first traveling fluid line 45a and to the forward-traveling pressure-receiving portion 53a of the second traveling pump 53R via the third traveling fluid line 45c. In this manner, the swash plate angles of the first traveling pump 53L and the second traveling pump 53R are changed, the first traveling motor 36L and the second traveling motor 36R rotate normally (referred to as forward rotation), and the working device 1 travels straight forward.

When the operation lever 59 is swung backward (in a direction indicated by an arrowed line A2 in FIG. 1), the operation valve 55B is operated, and a pilot pressure is output from the operation valve 55B. This pilot pressure is applied to the backward-traveling pressure-receiving portion 53b of the first traveling pump 53L via the second traveling fluid line 45b and to the backward-traveling pressure-receiving portion 53b of the second traveling pump 53R via the fourth traveling fluid line 45d. In this manner, the swash plate angles of the first traveling pump 53L and the second traveling pump 53R are changed, the first traveling motor 36L and the second traveling motor 36R rotate reversely (referred to as backward rotation), and the working device 1 travels straight backward.

When the traveling control member 59 is swung to the right (in a direction indicated by an arrowed line A3 in FIG. 1), the control valve 55C is operated, and a pilot pressure is output from the control valve 55C. This pilot pressure is applied to the forward-traveling pressure-receiving portion 53a of the first traveling pump 53L via the first traveling fluid line 45a, and to the backward-traveling pressure-receiving portion 53b of the second traveling pump 53R via the fourth traveling fluid line 45d. In this manner, the swash plate angles of the first traveling pump 53L and the second traveling pump 53R are changed, and the first traveling motor 36L rotates normally and the second traveling motor 36R rotates reversely, and the working device 1 turns to the right.

When the traveling control member 59 is swung to the left (in a direction indicated by an arrowed line A4 in FIG. 1), the control valve 55D is operated, and a pilot pressure is output from the control valve 55D. This pilot pressure is applied to the forward-traveling pressure-receiving portion 53a of the second traveling pump 53R via the third traveling fluid line 45c, and to the backward-traveling pressure-receiving portion 53b of the first traveling pump 53L via the second traveling fluid line 45b. In this manner, the swash plate angles of the first traveling pump 53L and the second traveling pump 53R are changed, and the first traveling motor 36L rotates reversely and the second traveling motor 36R rotates normally, and the working device 1 turns to the left.

When the operation lever 59 is swung in an oblique direction, rotational directions and rotational speeds of the first traveling motor 36L and the second traveling motor 36R are determined by a differential pressure between the pilot pressures applied to the forward-traveling pressure-receiving portion 53a and the backward-traveling pressure-receiving portion 53b, and the working machine 1 turns to the right or the left while traveling forward or backward.

That is, when the operation lever 59 is swung obliquely forward to the left, the working device 1 turns to the left while traveling forward at a speed corresponding to the swing angle (that is, the swing amount) of the operation lever 59. When the operation lever 59 is swung obliquely forward to the right, the working device 1 turns to the right while traveling forward at a speed corresponding to the swing angle (that is, the swing amount) of the operation lever 59.

When the operation lever 59 is swung obliquely backward to the left, the working device 1 turns to the left while traveling backward at a speed corresponding to the swing angle (that is, the swing amount) of the operation lever 59. When the operation lever 59 is swung obliquely backward to the right, the working device 1 turns to the right while traveling backward at a speed corresponding to the swing angle (that is, the swing amount) of the operation lever 59.

A switching device is configured to shift the rotation speed stages of the two traveling motors (that is the first traveling motor 36L and the second traveling motor 36R) between the respective first speed stages and the respective second speed stages. The switching device is, for example, a switch 61 which is electrically connected to the controller 60 and which is manually operable by an operator serves as the switching device. Hereinafter, a term "a rotation speed stage of the traveling motors" means the respective rotation speed stages of the traveling motors each of which is shiftable between the first speed stage and the second speed stage. The switching device (the switch 61) is configured to perform an operation of switching to either the acceleration in which the rotation speed stage of the traveling motors is switched from the first speed stage to the second speed stage (that is, the traveling switching valve 34 is shifted from the first state to the second state) or the deceleration in which the rotation speed stage of the traveling motors is switched from the second speed stage to the first speed stage (that is, the traveling switching valve 34 is shifted from the second state to the first state).

The controller 60 is constituted of a semiconductor such as a CPU and an MPU, electrical and electronic circuits, or the like. The controller 60 switches the traveling switching valve 34 based on the switching operation of the switch 61. The switch 61 is a push switch. The switch 61, for example, outputs, to the controller 60, a command to shift the rotation speed stage of the traveling motors to the second speed stage (a command to shift the traveling switching valve 34 to the second state) when the switch 61 is pressed while the rotation speed stage of the traveling motors is set to the first speed stage. When the switch 61 is pressed while the rotation speed stage of the traveling motors is set to the second speed stage, the switch 61 outputs, to the controller 60, a command to shift the rotation speed stage of the traveling motors to the first speed stage (a command to shift the traveling switching valve 34 to the first state). The switch 61 may be a push switch that can be held at either an ON position or an OFF position. The switch 61 held at the OFF position outputs, to the controller 60, a command to hold the first speed stage set as the rotation speed stage of the traveling motors, and the switch 61 held at the ON position outputs, to the controller 60, a command to hold the second speed stage set as the rotation speed stage of the traveling motors.

When the controller 60 acquires the command for shifting the traveling switching valve 34 to the first state, the controller 60 demagnetizes a solenoid of the second switching valve 72 to shift the traveling switching valve 34 to the first state. When the controller 60 acquires the command for shifting the traveling switching valve 34 to the second state, the controller 60 magnetizes a solenoid of the second switching valve 72 to shift the traveling switching valve 34 to the second state.

As shown in FIG. 1, an accelerator 65 and a rotation detector 66 are connected to the controller 60. The accelerator 65 is a component that determines a target rotation speed of the prime mover 32. The accelerator 65 is provided in the vicinity of the driver seat 8. The accelerator 65 is an acceleration lever that is supported swingably, an acceleration pedal that is supported swingably, an acceleration volume that is supported rotatably, an acceleration slider that is supported slidably, or the like. The accelerator 65 is not limited to the examples described above. The rotation detector 66 is a sensor or the like configured to detects an actual prime mover rotation speed (referred to as an actual rotation speed) of the prime mover 32.

The controller 60 performs a control to prevent the prime mover 32 from stopping, that is, a control to prevent an engine from stalling (that is, the anti-stall control). In this embodiment, the anti-stall control is to reduce the outputs of the two traveling pumps (that is, the first traveling pump 53L and the second traveling pump 53R) when a difference between the actual rotation speeds detected by the rotation detector 66 (referred to as a dropping rotation speed) is equal to or greater than a threshold. For example, in the anti-stall control, the controller 60 prevents the engine stalling by reducing the outputs of the first traveling pump 53L and the second traveling pump 53R when the dropping rotation speed of the prime mover 32 is equal to or greater than the threshold.

The anti-stall control according to the embodiment will be described in detail below.

As shown in FIG. 1, the hydraulic system of the working machine is provided with an actuation valve 67. The actuation valve 67 is a valve configured to change a pilot pressure of pilot fluid that operates the two traveling pumps (that is, the first traveling pump 53L and the second traveling pump 53R). The actuation valve 67 is provided in the delivery fluid line 40 through which the pilot fluid flows, and has a variable opening to change the pilot pressure of the pilot fluid (that is, an operation pilot pressure acting on the pressure receiving portions 53a and 53b) that actuates the two traveling pumps (that is, the first traveling pump 53L and the second traveling pump 53R). For example, the actuation valve 67 is a solenoid proportional valve whose opening degree can be changed according to a control signal (for example, a voltage or a current) of the controller 60.

The controller 60 magnetizes a solenoid 67a of the actuation valve 67 to change a pilot pressure (referred to as a traveling primary pressure) applied from the actuation valve 67 to the operation device 54, and changes a pilot pressure (referred to as an operation pilot pressure) that operates the two traveling pumps (that is, the first traveling pump 53L and the second traveling pump 53R).

In the anti-stall control according to the present embodiment, the controller 60 controls the actuation valve 67 to set an upper limit of pilot pressure (that is, the traveling primary pressure) that differs depending on whether the set rotation speed stage of the traveling motors is the first speed stage or the second speed stage. The controller 60 sets the upper limit of traveling primary pressure based on the prime mover rotation speed and based on whether the set rotation speed stage of the traveling motors is the first speed stage or the second speed stage.

For example, when the rotation speed stage of the traveling motors is set to the first speed stage, the controller 60 sets the upper limit of pilot pressure corresponding to the traveling motors having the rotation speed stage set to the first speed stage (referred to as a first speed pilot pressure) based on the prime mover rotation speed. When the traveling motor is set to the second speed stage, the controller 60 sets the upper limit of pilot pressure corresponding to the traveling motors having the rotation speed stage set to the second speed stage (referred to as a second speed pilot pressure) based on the prime mover rotation speed.

The controller 60 sets an upper limit of the second speed pilot pressure corresponding to the traveling motors having the rotation speed stage set to the second speed stage to a value lower than an upper limit of the first speed pilot pressure corresponding to the traveling motor having the rotation speed stage set to the first speed stage.

Figure 2:
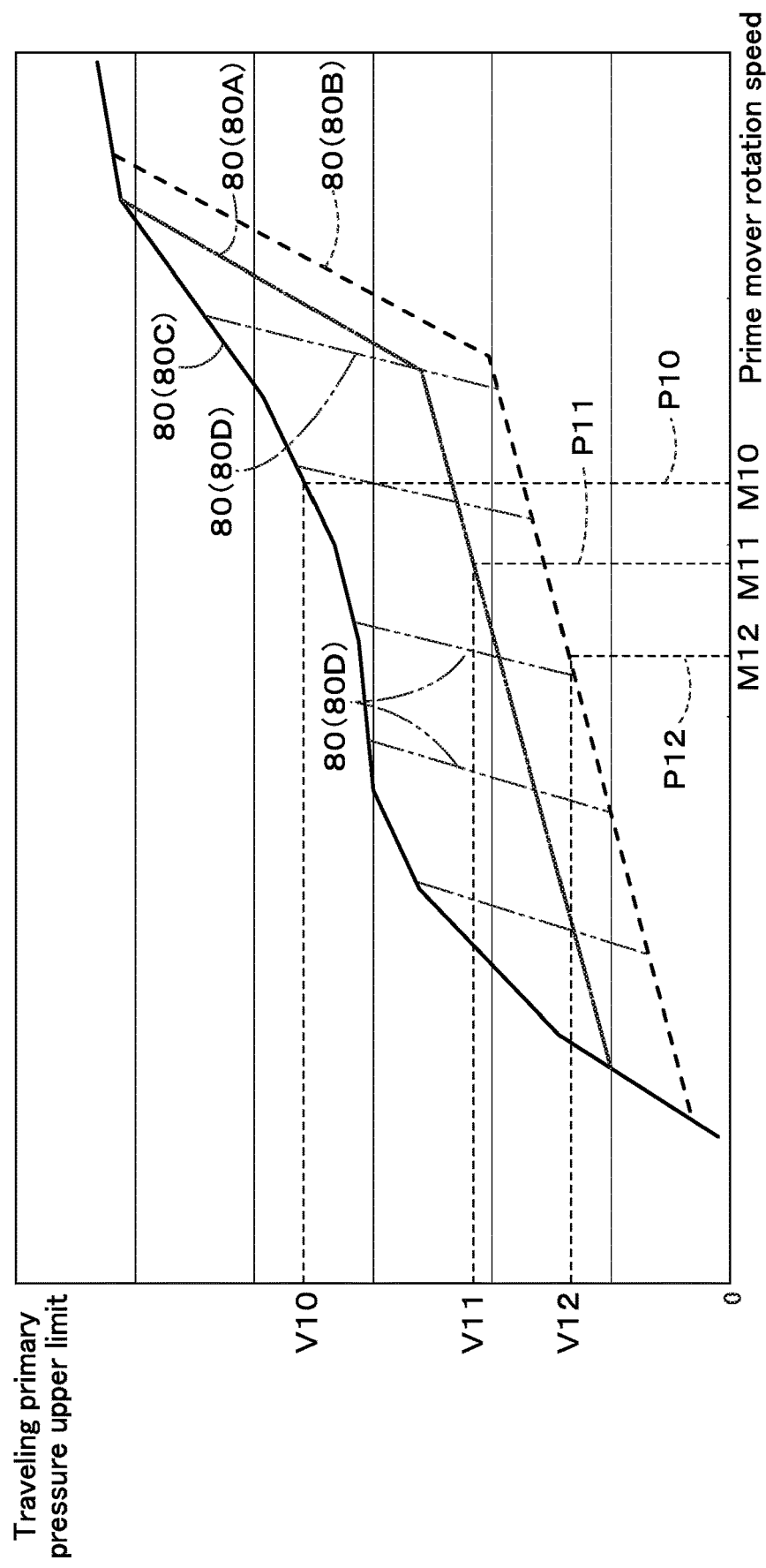
FIG. 2 is a view showing an example of control information for determining an upper limit of a traveling primary pressure according to the first embodiment.

FIG. 2 is a view showing an example of control information used for setting an upper limit of traveling primary pressure.

As shown in FIG. 2, the control information is data that shows a relationship between an upper limit of traveling primary pressure and a prime mover rotation speed. The traveling primary pressure is a pilot pressure of pilot fluid in a fluid line extending from the actuation valve 67 to the plurality of operation valves 55 (that is, the operation valves 55A, 55B, 55C, and 55D) in the delivery fluid line 40. In other words, the traveling primary pressure is a primary pressure of pilot fluid acting on the plurality of operation valves 55 provided to the operation lever 59 that performs the traveling operation.

The control information includes a plurality of lines 80 that indicate a relationship between an upper limit of the traveling primary pressure and a prime mover rotation speed. The plurality of lines 80 includes a first line 80A, a second line 80B, and a third line 80C.

The first line 80A is a line that determines an upper limit of first speed pilot pressure as an upper limit of traveling primary pressure based on an actual rotation speed when the dropping rotation speed, which is a difference between an actual rotation speed and a target rotation speed, is equal to or higher than a threshold and when the rotation speed stage of the traveling motor is set to the first speed stage. The second line 80B is a line that determines an upper limit of second speed pilot pressure as an upper limit of traveling primary pressure based on an actual rotation speed when the dropping rotation speed is equal to or greater than the threshold and when the rotation speed stage of the traveling motor is set to the second speed stage. The second line 80B is shifted to an area where an upper limit of pilot pressure becomes lower in comparison with the first line 80A, and an upper limit of second speed pilot pressure determined by the second line 80B is lower than an upper limit of first speed pilot pressure.

With reference to FIG. 2, when the prime mover rotation speed (that is, an actual rotation speed of prime mover) is an actual rotation speed M10 at a point P10, an upper limit of traveling primary pressure is determined to be a pilot pressure V10 according to the first line 80A. When a prime mover rotation speed is an actual rotation speed M11 at a point P11, an upper limit of traveling primary pressure is determined to be a pilot pressure V11 according to the second line 80B. When a prime mover rotation speed is an actual rotation speed M12 at a time P12, an upper limit of traveling primary pressure is determined to be a pilot pressure V12 according to the third line 80C.

The third line 80C is a line that determines an upper limits of first and second speed pilot pressures based on an actual rotation speed when a dropping rotation speed is less than a threshold. In other words, when the dropping rotation speed is less than the threshold, upper limit values of first and second speed pilot pressures are determined as the same value based on the third line 80C.

However, when the dropping rotation speed is equal to or greater than the threshold, an upper limit of first speed pilot pressure is determined based on the first line 80A, an upper limit of second speed pilot pressure is determined based on the second line 80B, and accordingly both of upper limits are smaller than a value determined based on the third line 80C.

The plurality of lines 80, that is, the control information is stored in a storage 60A provided in the controller 60. The storage 60A is constituted of a non-volatile memory.

The controller 60 is provided with a setting unit 60B. The setting unit 60B is constituted of electrical and electronic circuits provided in the controller 60, computer programs stored in the controller 60, or the like. The setting unit 60B determines and sets an upper limit of traveling primary pressure based on the control information, that is, the plurality of lines 80 (that is, the first line 80A, the second line 80B, and the third line 80C). Specifically, upper limits of traveling primary pressures (that is, the first speed pilot pressure and the second speed pilot pressure) are determined and set based on any one of the first line 80A, the second line 80B, and the third line 80C stored in the storage 60A.

The controller 60 determines and sets an upper limit of traveling primary pressure based on any one of the first line 80A, the second line 80B, and the third line 80C shown in FIG. 2. In practice, in order to realize the determined upper limit of traveling primary pressure, the controller 60 determines and sets an upper limit of operation current to be output to the actuation valve 67 based on the control information of FIG. 3 to be described below.

Figure 3:
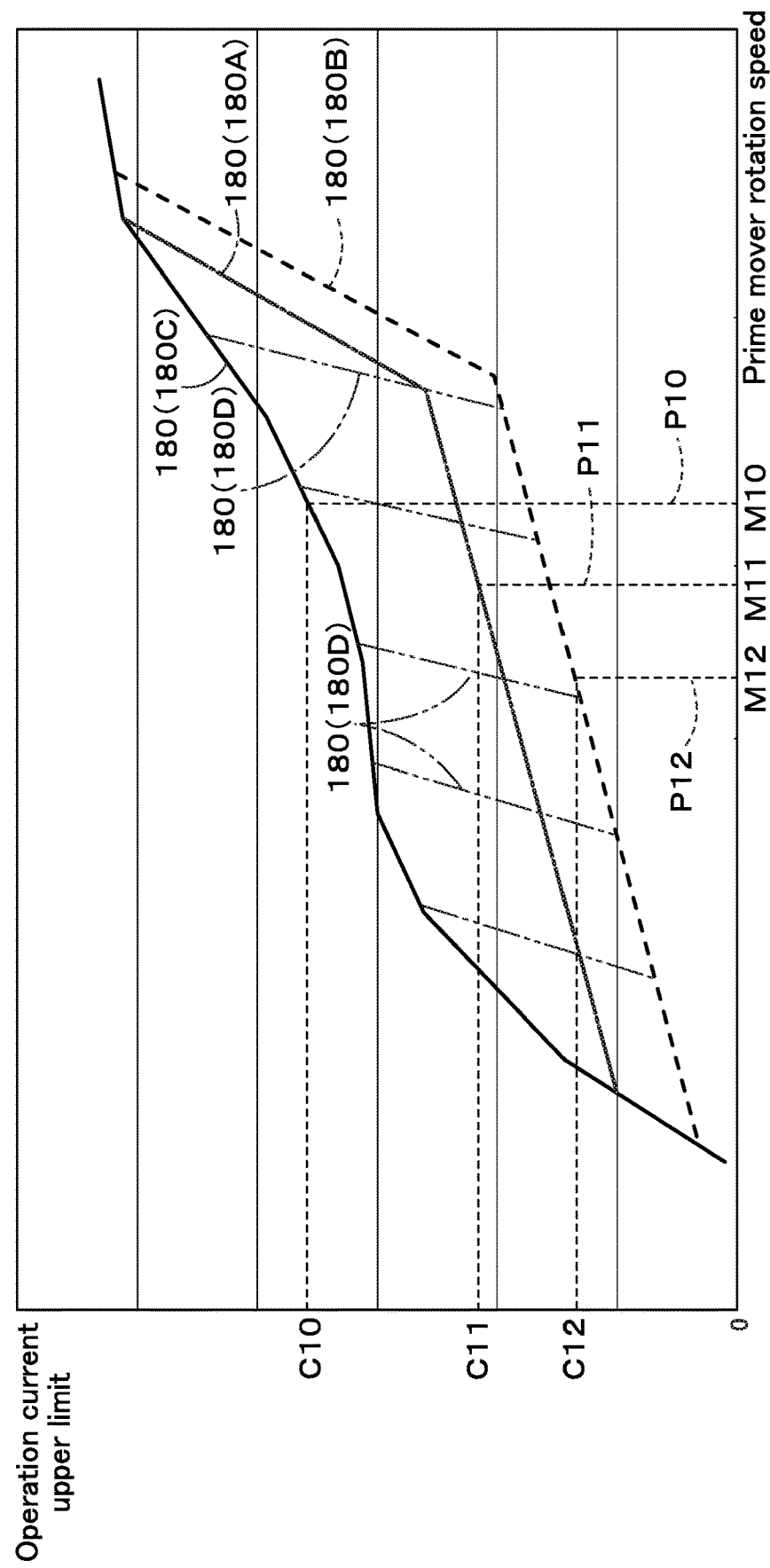
FIG. 3 is a view showing an example of control information for determining an upper limit of an operation current value according to the first embodiment.

FIG. 3 shows an example of the control information for setting an upper limit of operation current to be output to the actuation valve 67 that is configured to change a pilot pressure. Similar to FIG. 2, FIG. 3 shows a relationship between a prime mover rotation speed and an upper limit of operation current. The control information shown in FIG. 3 is data that shows a relationship between an upper limit of operation current and a prime mover rotation speed.

The operation current is a signal current output from the controller 60 to operate the actuation valve 67. The operation current under the anti-stall control is specifically referred to as an anti-stall current.

In the control information shown in FIG. 3, a plurality of lines 180 correspond to the plurality of lines 80 described above. The plurality of lines 180 includes a first line 180A, a second line 180B, and a third line 180C.

The first line 180A corresponds to the first line 80A and represents an upper limit of operation current to obtain an upper limit of traveling primary pressure represented by the first line 80A. The second line 180B corresponds to the second line 80B and represents an upper limit of operation current to obtain an upper limit of traveling primary pressure represented by the second line 80B. The third line 180C corresponds to the third line 80C and represents an upper limit of operation current to obtain an upper limit of traveling primary pressure represented by the third line 80C.

The first line 180A to the third line 180C shown in FIG. 3 draws shapes that tend to be almost the same as the corresponding first line 80A to the third line 80C shown in FIG. 2. The controller 60 controls operations of the actuation valve 67 using an anti-stall current that is smaller than an upper limit of operation current determined based on the first line 180A to third line 180C.

That is, an upper limit of operation current value is set to a value corresponding to an upper limit value of traveling primary pressure shown in FIG. 2. Then, when an operation current based on an operational direction and operation amount of the operation lever 59 exceeds an upper limit of operation current shown in FIG. 3, the controller 60 outputs the upper limit shown in FIG. 3 to the actuation valve 67.

Referring to FIG. 3, according to the first line 180A, when the prime mover rotation speed (that is, an actual rotation speed of prime mover) is an actual rotation speed M10 at a time P10, an upper limit of operation current is determined to be a current value C10 for obtaining a pilot pressure V10 that is an upper limit of traveling primary pressure. According to the second line 180B, when a prime mover rotation speed is an actual rotation speed M11 at a point P11, an upper limit of operation current is determined to be a current value C11 for obtaining a pilot pressure V11 that is an upper limit of traveling primary pressure. According to the third line 80C, when a prime mover rotation speed is an actual rotation speed M12 at a time P12, an upper limit of operation current is determined to be a current value C12 for obtaining a pilot pressure V12 that is an upper limit of traveling primary pressure.

Figure 4:
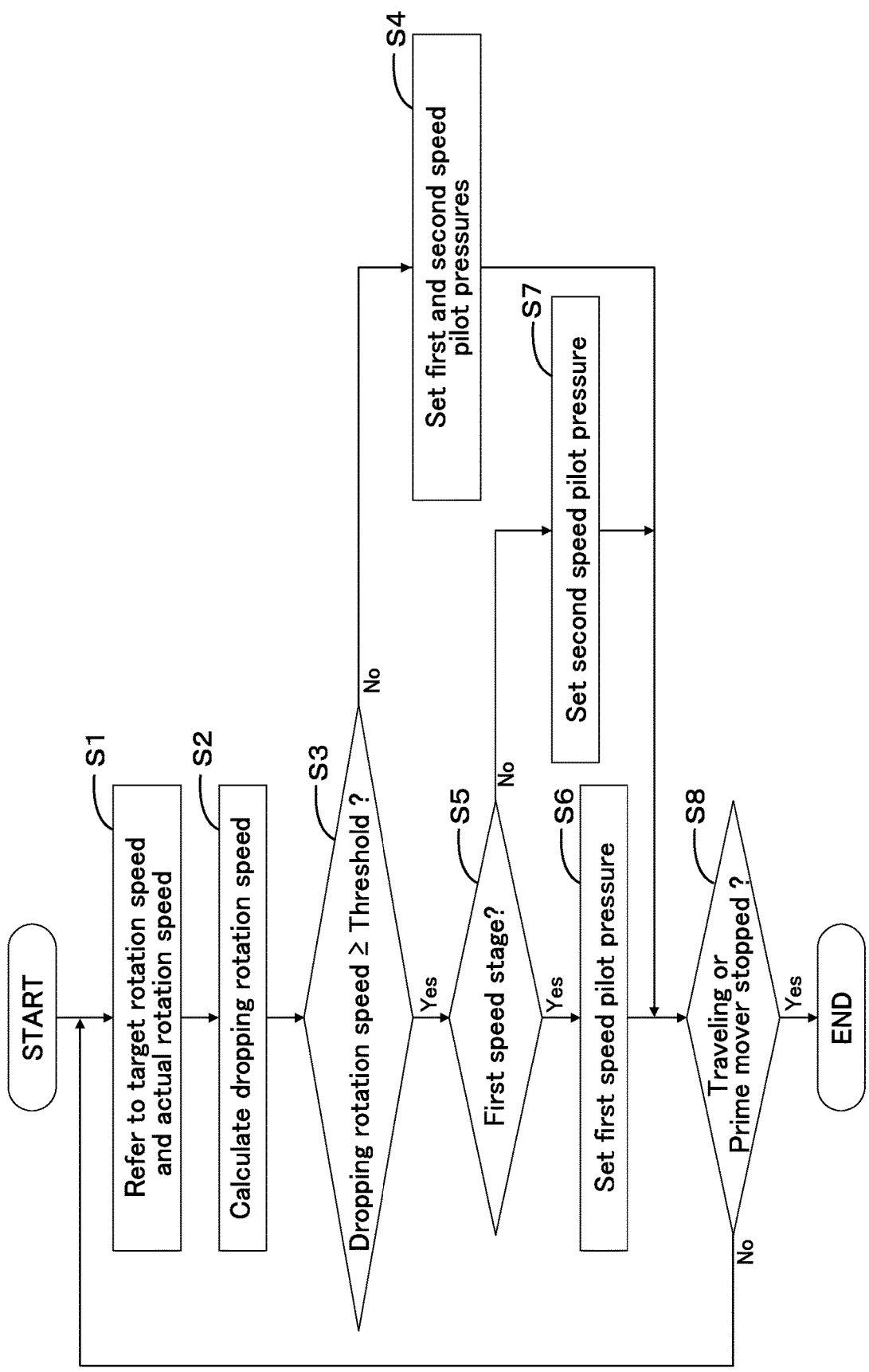
FIG. 4 is a view showing an operation flow of setting a first-speed pilot pressure and a second-speed pilot pressure according to the first embodiment.

FIG. 4 shows an operation flow of determining and setting an upper limits of the first and second speed pilot pressures.

As shown in FIG. 4, the setting unit 60B refers to a target rotation speed set by the accelerator 65 and an actual rotation speed detected by the rotation detector 66 (step S1).

The setting unit 60B acquires a dropping rotation speed by subtracting the actual rotation speed from the target rotation speed (step S2).

The setting unit 60B judges whether the dropping rotation speed is equal to greater than a threshold (step S3).

The setting unit 60B selects the third line 80C when the dropping rotation speed is not equal to or greater than the threshold, that is, when the dropping rotation speed is less than the threshold (step S3, No), and determines and sets upper limits of the pilot pressures (that is, the first speed pilot pressure and the second speed pilot pressure) based on the selected third line 80C (step S4).

At step S4, when the prime mover rotation speed is the actual rotation speed M10 at the point P10 as shown in FIG. 2, the setting unit 60B determines and sets, based on the third line 80C, the upper limits of the first speed pilot pressure and the second speed pilot pressure to the pilot pressure V10 corresponding to the actual rotation speed M10, regardless of whether the traveling motor is at the first speed stage or the second speed stage. That is, when the dropping rotation speed is less than the threshold, the setting unit 60B determines and sets each of the upper limits of the first speed pilot pressure and the second speed pilot pressure according to the actual rotation speed so that the upper limits can be on the third line 80C.

When the dropping rotation speed is equal to or greater that the threshold (step S3, Yes), the setting unit 60B judges whether the traveling motor is at the first speed stage (step S5). When the traveling motor is at the first speed stage (step S5, Yes), the setting unit 60B selects the first line 80A and determines and sets an upper limit of first speed pilot pressure based on the selected first line 80A (step S6).

At step S6, when the prime mover rotation speed is the actual rotation speed M11 at the point P11 as shown in FIG. 2, the setting unit 60B determines and sets, based on the first line 80A, an upper limit of the first speed pilot pressure to the pilot pressure V11 corresponding to the actual rotation speed M11. That is, when the dropping rotation speed is equal to or greater than the threshold and the traveling motors are at the first speed stage, the setting unit 60B determines and sets an upper limit of first speed pilot pressure according to the actual rotation speed so that the upper limit can be on the first line 80A.

When the traveling motors are not at the first speed stage, that is, when the traveling motors are at the second speed stage (step S5, No), the setting unit 60B selects the second line 80B and determines and sets an upper limit of second speed pilot pressure based on the selected second line 80B (step S7).

In step S7, the setting unit 60B determines and sets, based on the second line 80B, an upper limit of second speed pilot pressure to the pilot pressure V12 corresponding to the actual rotation speed M12 when the prime mover rotation speed is the actual rotation speed M12 at the point P12 as shown in FIG. 2. That is, when the dropping rotation speed is equal to greater than the threshold and the traveling motor is at the second speed stage, the setting unit 60B determines and sets an upper limit of second speed pilot pressure according to the actual rotation speed so that the upper limit can be on the second line 80B.

When the dropping amount is changed or when the speed stage of the traveling motors is shifted, the upper limits of the first and second speed pilot pressures are changed, for example, from an upper limit value based on the third line 80C to an upper limit value based on the first line 80A or the second line 80B. In this case, as shown in FIG. 2, the upper limit may be shifted from the upper limit based on the third line 80C to the upper limit based on the first line 80A or the second line 80B via the upper limits of pilot pressures (that is, the first speed pilot pressure and the second speed pilot pressure) determined and set based on the fourth line 80D connecting the first line 80A, the second line 80B and the third line 80C.

Conversely, for example, when shifting from the upper limit based on the first or second line 80A or 80B to the upper limit based on the third line 80C, the upper limit of first or second speed pilot pressure also may be shifted through the upper limit determined and set based on the fourth line 80D.

The setting unit 60B terminates the anti-stall control when the working machine 1 stops traveling or the prime mover 32 is stopped (step S8, Yes), and continues the anti-stall control when the working machine 1 does not stop traveling or the prime mover 32 is not stopped (step S8, No).

The anti-stall control described above is continuously executed while the working machine 1 is traveling or the prime mover 32 is being driven.

The configuration of the working machine 1 that executes the anti-stall control described above is as follows.

The working machine 1 includes the prime mover 32, the traveling pump (that is, at least one of the first traveling pump 53L and the second traveling pump 53R) driven by power of the prime mover 32 to deliver operation fluid, the traveling motor (that is, at least one of the first traveling motor 36L and the second traveling motor 36R) rotated by the operation fluid delivered from the traveling pump (that is, at least one of the first traveling pump 53L and the second traveling pump 53R) to have a rotation speed stage shiftable between the first speed stage and the second speed stage that is higher than the first speed stage, the traveling switching valve 34 shiftable between the first state where the rotation speed stage of the traveling motor (that is, at least one of the first traveling motor 36L and the second traveling motor 36R) is set to the first speed stage and the second state where the rotation speed stage of the traveling motor (that is, at least one of the first traveling motor 36L and the second traveling motor 36R) are set to the second speed stage, the actuation valve 67 configured to change a pilot pressure of pilot fluid that operates the traveling pump (that is, at least one of the first traveling pump 53L and the second traveling pump 53R), and the controller 60 configured to control the pilot pressure of the pilot fluid output from the actuation valve 67 so that a value of the pilot pressure differs depending on whether the set rotation speed stage of the traveling motor is the first speed stage or the second speed stage.

According to this configuration, since the controller 60 differentiates a pilot pressure of pilot fluid of the actuation valve 67 depending on whether the set rotation speed stage of the traveling motor (that is, at least one of the first traveling motor 36L and the second traveling motor 36R) is the first speed stage or the second speed stage, the traveling motor (that is, at least one of the first traveling motor 36L and the second traveling motor 36R) have an output that differs in correspondence to the difference of pilot pressure depending on whether the set rotation speed stage is the first speed stage ort the second speed stage, and accordingly, regardless of whether the rotation speed stage is set to the first speed stage or the second speed stage, the engine stall can be prevented and the workability can be improved.

The controller 60 determines the pilot pressure based on a rotation speed of the prime mover 32 and the set rotation speed stage of the traveling motor that is either the first speed stage or the second speed stage. According to this configuration, since the pilot pressure can be determined according not only to the rotation speed stage of the traveling motor that is either the first or second speed stage but to a rotation speed of the prime mover 32, which represents a state of the prime mover 32, the engine stall can be prevented in correspondence to the state of the prime mover 32 and the rotation speed stage (that is, the first or second speed stage) of the traveling motor, and the workability can be improved.

The controller 60 determines, based on a rotation speed of the prime mover 32, the first speed pilot pressure that is the pilot pressure when the set rotation speed stage of the traveling motor is the first speed stage, and determines, based on the rotation speed of the prime mover 32, the second speed pilot pressure that is the pilot pressure when the set rotation speed stage of the traveling motor is the second speed stage. According to this configuration, it is easy to determine the first speed pilot pressure when the working machine 1 is set at the first speed stage and to determine the second speed pilot pressure when the rotation speed stage of the traveling motor is set to the second speed stage.

The controller 60 determines a value of the second speed pilot pressure to be lower than that of the first speed pilot pressure. According to this configuration, by determining the value of the second speed pilot pressure to be lower than that of the first speed pilot pressure, the engine stalling can be prevented without significantly deteriorating the workability at the second speed stage.

The working machine 1 includes the accelerator 65 configured to determine a target rotation speed of the prime mover 32 and the rotation detector 66 configured to detect an actual rotation speed of the prime mover 32, and the controller 60 determines the pilot pressure when the dropping rotation speed, which is a difference between the target rotation speed and the actual rotation speed, is equal to or greater than a threshold. According to this configuration, a load acting on the prime mover 32 can be easily acquired according to the difference (that is, a dropping rotation speed) between the target rotation speed set by the accelerator 65 and the actual rotation speed detected by the rotation detector 66, and a pilot pressure can be determined according to the load.

The controller 60 has the storage 60A storing the first line 80A for setting the first speed pilot pressure when the difference between the target rotation speed set by the accelerator 65 and the actual rotation speed detected by the rotation detector 66 is equal to or greater than a threshold and when the rotation speed stage of the traveling motor is set to the second speed stage, and a second line 80B for setting the second speed pilot pressure when the difference between the target rotation speed and the actual rotation speed is equal to or greater than the threshold and when the rotation speed stage of the traveling motor is set to the second speed stage, and the third line 80C for setting the first speed pilot pressure and the second speed pilot pressure when the difference between the target rotation speed and the actual rotation speed is less than the threshold, and the setting unit 60 configured to set the pilot pressure based on any one of the first line 80A, the second line 80B and the third line 80C stored in the storage 60A.

According to this configuration, the pilot pressure can be set properly according to the following three conditions based on the first line 80A, the second line 80B and the third line 80C, respectively: when the load acting on the prime mover 32 is light (the difference between the target rotation speed and the actual rotation speed is less than a threshold), when the load acting on the prime mover 32 is heavy (the difference between the target rotation speed and the actual rotation speed is equal to or greater than the threshold) and the rotation speed stage of the traveling motor is set to the first speed stage, and when the load acting on the prime mover 32 is heavy and the rotation speed stage of the traveling motor is set to the second speed stage.

In the working machine 1 having the above-described configuration, the controller 60 may perform a shock reduction control at the same time as the anti-stall control. The shock reduction control is a control to correct a current value (referred to as a control amount) of a control signal (that is, the anti-stall current) output to the actuation valve 67. In detail, the shock reduction control is a control to correct the control signal to be outputted to the actuation valve 67, such as momentarily lowering a control amount of the control signal to the actuation valve 67 in shifting from the first speed stage to the second speed stage or from the second speed stage to the first speed stage.

FIG. 5A is a view showing a relationship among a correction amount to a current value (that is, the control amount) to the actuation valve 67 in accelerating the traveling motors from the first speed stage to the second speed stage, the switching of the traveling motors (that is, the switching valve, the switch SW), the anti-stall control and shock reduction control. A time Z10 in FIG. 5A is a switching time (a delay time) until starting of the switching of the traveling switching valve (that is, the switching valve) 34 from the first state (that is, the first speed stage) to the second state (that is, the second speed stage) after an acceleration command is output by operating the switch (that is, the switch SW) 61.

As shown in FIG. 5A, when the switch 61 is operated at a time point Q1, the controller 60 acquires the acceleration command (referred to as a second speed command) from the switch 61 to switch the speed stage from the first state (that is, the first speed stage) to the second state (that is, the second speed stage).

The controller 60 corrects the current value of the control signal (that is, the anti-stall current) to be output to the actuation valve 67 after the time point Q2. The controller 60 gradually reduces the current value of the anti-stall current by a predetermined value (referred to as a shock reduction value) W3 during a time T1 after the time point Q2. That is, the controller 60 increases the correction amount to the current value of the anti-stall current during the time T1 after the time point Q2. The shock reduction value W3 is a correction amount to the current value for reducing a gear-shifting shock caused in switching from the first speed stage to the second speed stage, and is a value obtained from actual results, experiments, or theoretical simulations.

After the time point Q2, at the time point Q3 where the time T1 has elapsed, the switching of the traveling switching valve 34 to the second speed stage is completed. At the time point Q3, when the correction amount of the control signal reaches the shock reduction value W3, the controller 60 gradually restores the correction amount of the control signal to zero during the time T2 after the time point Q3. That is, the current value of the anti-stall current is gradually restored to the value before the correction, that is, before the time point Q2.

After the time point Q3, that is, after the traveling switching valve 34 is switched from the first state (that is, the first speed stage) to the second state (that is, the second speed stage), the controller 60 shifts to the anti-stall control at the second speed stage (referred to as a second speed anti-stall control) based on the second line 80B shown in FIG. 2.

That is, for example, the controller 60 shifts to the second speed anti-stall control in which the second speed pilot pressure is set according to the second line 80B at the time point Q5 when the correction amount (that is, the current value) of the anti-stall current to the actuation valve 67 is restored to zero.

The time points Q1 and Q2 may be simultaneous (the same) or may be different in very short time, and are not limited thereto. The interval (time) from the time point Q2 to the time point Q3 is set to be shorter than the interval (time) from the time point Q3 to the time point Q5. In other words, the interval (time) from the time point Q3 to the time point Q5 is set to be longer than the interval (time) from the time point Q2 to the time point Q3.

FIG. 5B shows a relationship between a correction amount to a current value (that is, a control amount) to the actuation valve 67 in reducing the traveling motors from the second speed stage to the first speed stage, switching of the traveling motors (that is, the switching valve, the switch SW), the anti-stall control and shock reduction control. A time Z11 in FIG. 5B is a switching time (that is, a delay time) from a time when the deceleration command is output by operating the switch unit (that is, the switch SW) 61 to a time when the switching of the traveling switching valve (that is, a switching valve) 34 from the second state (that is, the second speed stage) to the first state (that is, the first speed stage) starts. The time Z11 is set to be longer than the time Z10 described in FIG. 5A.

As shown in FIG. 5B, when the switch 61 is operated at the time point Q11, the controller 60 acquires a deceleration command (referred to as a first speed command) from the switch 61 to switch from the second state (that is, the second speed stage) to the first state (that is, the first speed stage).

The controller 60 corrects a current value of the anti-stall current to be output to the actuation valve 67 after the time point Q12 at which the time T11 has elapsed from the time point Q11. The controller 60 gradually decreases the current value of the anti-stall current by a predetermined value (referred to as a shock reduction value) W5 during the time T12 after the time point Q12. That is, after the time point Q12 and during the time T12, the controller 60 gradually increases the correction amount to the current value of the anti-stall current more slowly than the increasing between the time point Q2 and the time point Q3 in FIG. 5A. The shock reduction value W5 is a correction amount for the current value to reduce the gear-shifting shock caused in switching from the second speed stage to the first speed stage, and is a value obtained from actual results, experiments, and theoretical simulations.

At the time point Q13 at which the time T12 has elapsed from the time point Q12, the traveling switching valve 34 has not yet been switched to the second speed stage. At the time point Q13, when the correction amount of the control signal reaches the shock reduction value W5, the controller 60 gradually restores the correction amount of the control signal to zero during the time T13 from the time point Q13 to the time point Q15. That is, the current value of the anti-stall current is gradually restored to the value before the correction, that is, before the time point Q12.

After the time point Q13, that is, in a process of gradually restoring the correction amount of the control signal to the actuation valve 67 to zero, the controller 60 switches the traveling switching valve 34 from the second state (that is, the second speed stage) to the first state (that is, the first speed stage). This switching is completed before the correction amount of the control signal has restored to zero, and the correction amount of the control signal is restored to zero a little later after the completion of this switching.

For example, at a time point Q14 when the controller 60 is in a process of gradually restoring the correction amount of the control signal to the actuation valve 67 to zero, the controller 60 shifts to the anti-stall control at the first speed stage (referred to as a first speed anti-stall control) based on the first line 80A shown in FIG. 2.

In the above-described embodiment, the shifting to the first speed anti-stall control is made at the time point Q14 at which the correction amount (that is, the current value) is gradually restored to zero after the time point Q13. However, the controller 60 may shift to the first speed anti-stall control when the correction amount (that is, the current value) of the anti-stall current reaches zero at the time point Q15 after the time point Q13.

The time points Q11 and Q12 may be simultaneous (the same) or may be different in very short time, and are not limited thereto. The interval (time) from the time point Q12 to the time point Q13 is set to be longer than the interval (time) from the time point Q13 to the time point Q14. In other words, the interval (time) from the time point Q13 to the time point Q14 is set to be shorter than the interval (time) from the time point Q12 to the time point Q13.

In the shock reduction control, the controller 60 may vary the correction amount not continuously but in multiple stages. As shown in FIG. 5E, when the controller 60 varies the control amount (that is, the current value) in multiple stages in the shock reduction control, for example, as shown in line L31, the controller 60 increases the correction amount steeply at the time point Q12 and then decreases the correction amount gradually, and after the correction amount (that is, the current value) reaches the shock reduction value W5, the controller 60 may switch the traveling switching valve 34 from the second state (that is, the second speed stage) to the first state (that is, the first speed stage). After the time point Q13, the controller 60 may shift to the first speed anti-stall control in a process of gradually restoring the correction amount (that is, the current value) to zero.

As shown in FIGS. 5A and 5B, a time length for the shock reduction control is longer for the deceleration command (FIG. 5B) than for the acceleration command (FIG. 5A) after the switching operation by the switch 61.

An important point in the configuration described using FIGS. 5A and 5B is that, for the acceleration command, the switching from the first speed stage to the second speed stage is completed in the middle of increasing the correction amount, and, for the deceleration command, the switching from the second speed stage to the first speed stage is completed in the middle of gradually restoring the correction amount to zero. In this manner, the controller 60 completes the acceleration or deceleration command while the control signal to the actuation valve 67 is being corrected in the shock reduction control. In this manner, the shock reduction control completes the acceleration or deceleration command while the traveling primary pressure is being corrected. The controller 60 corrects the control amount for controlling the actuation valve 67 in switching the traveling motors (that is, the first traveling motor 36L and the second traveling motor 36R) to either the first speed stage or the second speed stage.

For example, if the current or voltage to be supplied to the actuation valve 67 is used as the control amount for controlling the actuation valve 67, the current or voltage can be reduced to prevent the engine stalling while reducing the gear shift shock in the gear shifting between the first speed stage and the second speed stage.

In the above-described embodiment, when the acceleration command or the deceleration command is issued under the anti-stall control, the shock reduction control that corrects the control signal to be output to the actuation valve 67 is performed. However, instead of the shock reduction control, as shown in FIGS. 5C and 5D, the same shock reduction effect can be obtained through the control to reduce an actual rotation speed of the prime mover 32.

The controller 60 decreases the actual rotation speed of the prime mover 32 in switching the traveling motors to either the first speed stage or the second speed stage under the anti-stall control. That is, the explanation using FIGS. 5C, 5D, and 5E is established by replacing the actuation valve 67 by the prime mover 32 and the control amount (that is, the current) of the anti-stall current by the actual rotation speed in the above-mentioned explanation using FIGS. 5A and 5B. This replacement describes a configuration, instead of the shock reduction control, to perform a control for reducing an actual rotation speed.

Figure 5C:
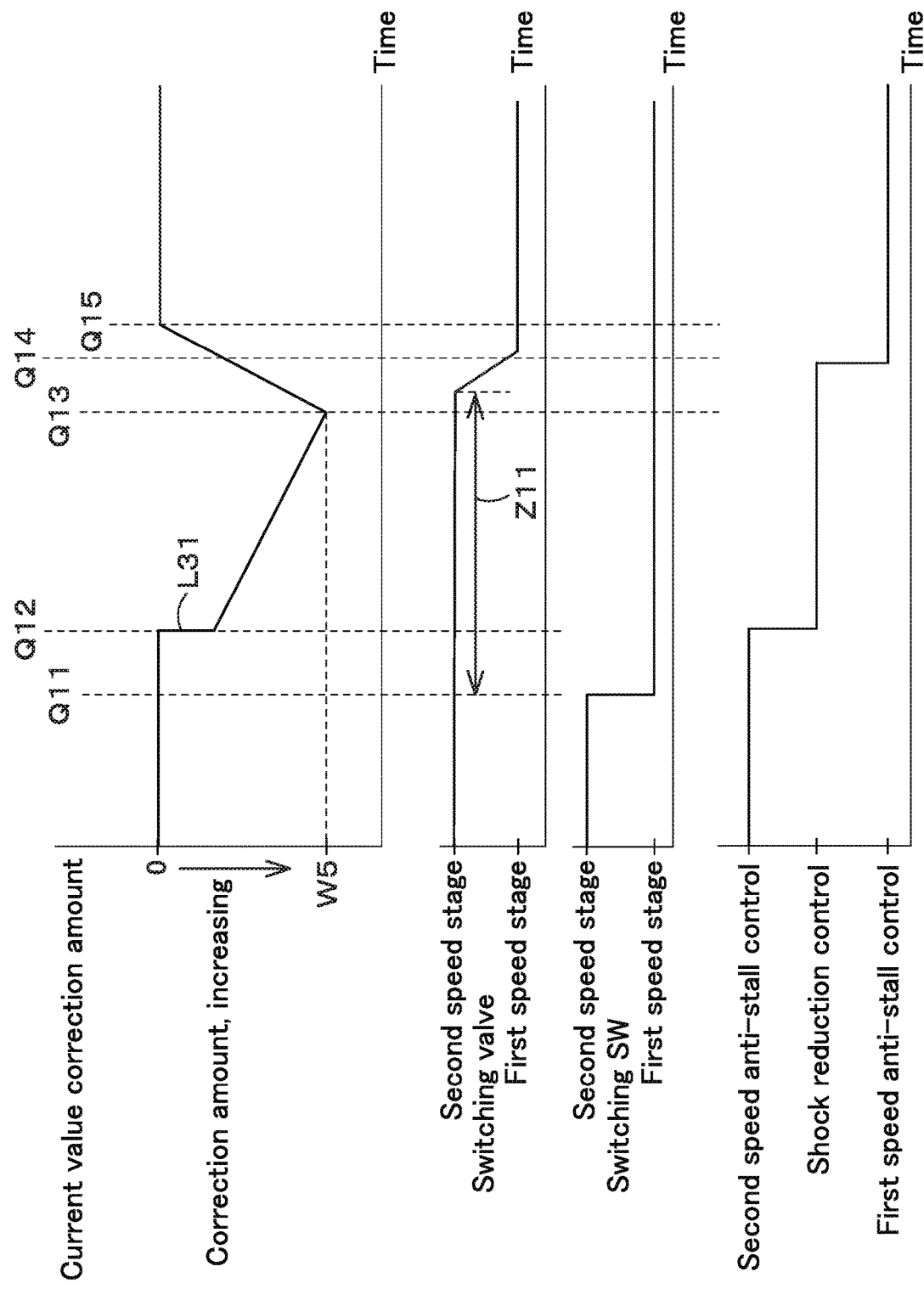
FIG. 5C is a view showing an example of decreasing the control amount of the operation amount in multiple steps in speed-reducing the traveling motor from the second speed stage to the first speed stage according to the first embodiment.
Figure 5D:
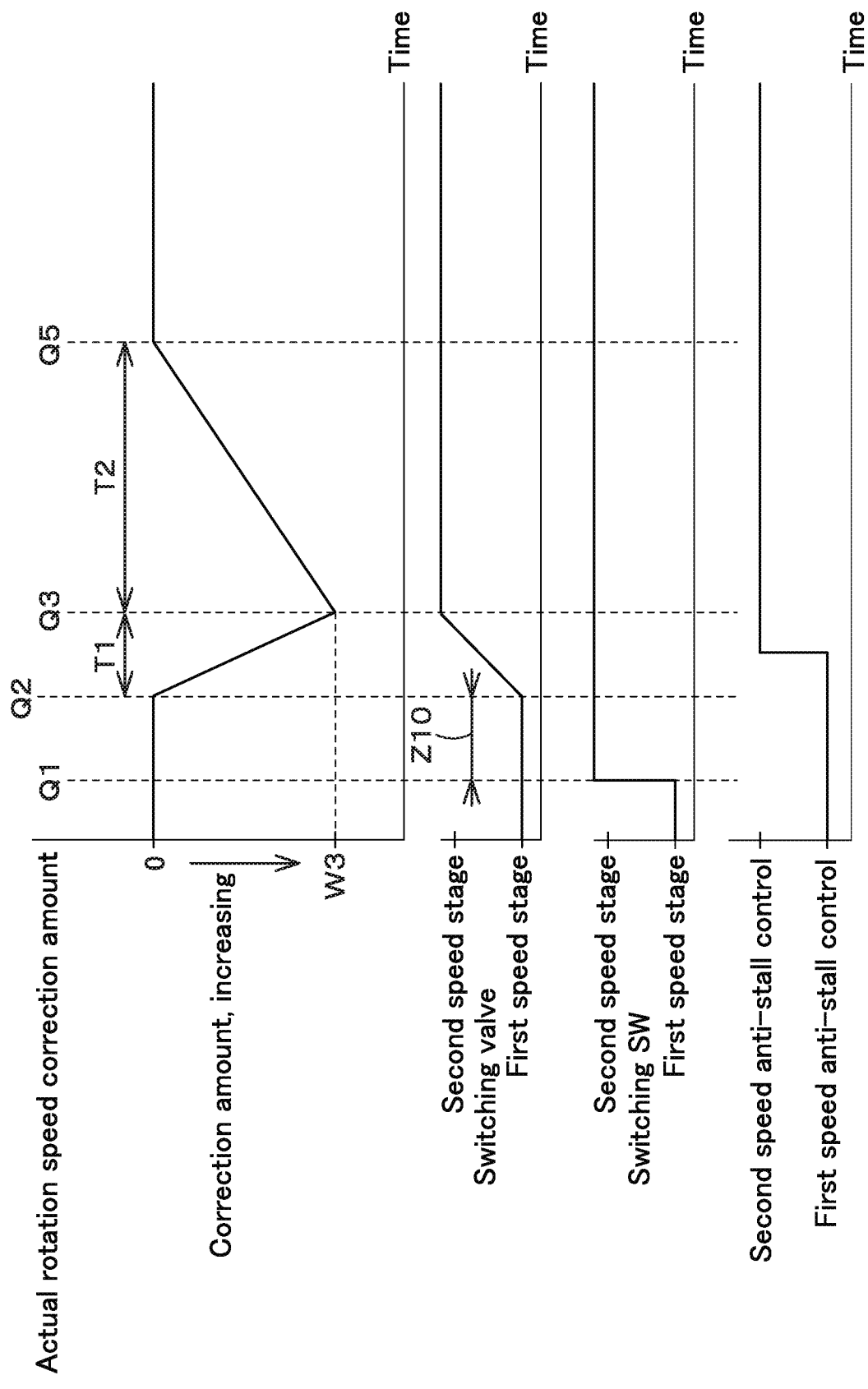
FIG. 5D is a view showing a relationship between an actual rotation speed and the speed-shift of the traveling motor in the anti-stall control in accelerating the traveling motor according to the first embodiment.

As shown in FIG. 5C, the controller 60 gradually decreases the actual rotation speed of the prime mover 32 by a predetermined value W3 during the time T1 from the time point Q2 to the time point Q3. That is, the controller 60 gradually increases the correction amount to the actual rotation speed of the prime mover 32 during the time T1 from the time point Q2 to the time point Q3. After the time point Q2, the controller 60 switches from the first speed anti-stall control to the second speed anti-stall control.

The time Z11 in FIG. 5C is the switching time (that is, the delay time) from the time when the deceleration command is given by operating the switch unit (that is, the switch SW) 61 to the time when the switching of the traveling switching valve (that is, the switching valve) 34 from the second state (that is, the second speed stage) to the first state (that is, the first speed stage) starts. This time Z11 is set to be longer than the time Z10 described in FIG. 5A.

As shown in FIG. 5D, the controller 60 gradually decreases the actual rotation speed of the prime mover 32 by a predetermined value W5 during the time T12 from the time point Q12 to the time point Q13. That is, the controller 60 gradually increases the correction amount to the actual rotation speed of the prime mover 32 during the time T12 from the time point Q12 to the time point Q13. The controller 60 switches from the second speed anti-stall control to the first speed anti-stall control between the time point Q13 and the time point Q15, for example, at the time point Q14.

As shown in FIGS. 5C and 5D, comparing a time required for switching the first speed anti-stall control to the second anti-stall control after the switching operation by the switch 61 starts (referred to as a first control switching time) to a time required for switching the second speed anti-stall control to the first anti-stall control after the switching operation by the switch 61 starts (referred to as a second control switching time), the first control switching time is shorter than the second control switching time.

The controller 60 corrects an actual rotation speed of the prime mover 32 in switching the traveling motors (that is, the first traveling motor 36L and the second traveling motor 36R) to either the first speed stage or the second speed stage.

For example, by reducing an actual rotation speed of the prime mover 32, the pilot pressure supplied to the actuation valve 67 is reduced. This prevents the engine stalling while reducing the gearshift shock in shifting between the first speed stage and the second speed stage.

Second Embodiment

Referring to the drawings, a second embodiment of the present invention will be described below.

In the first embodiment, the operation device 54 is of the hydraulic type that changes a pilot pressure acting on the traveling pumps (that is, the first traveling pump 53L and the second traveling pump 53R) with use of the operation lever 59 and the operation valve 55. However, in the second embodiment, the operation performed by the operation device 54 and the actuation valve 67 according to the first embodiment is realized by employing an electrically-operable joystick, the controller 60, and hydraulic regulators 58 to be described below.

Figure 6A:
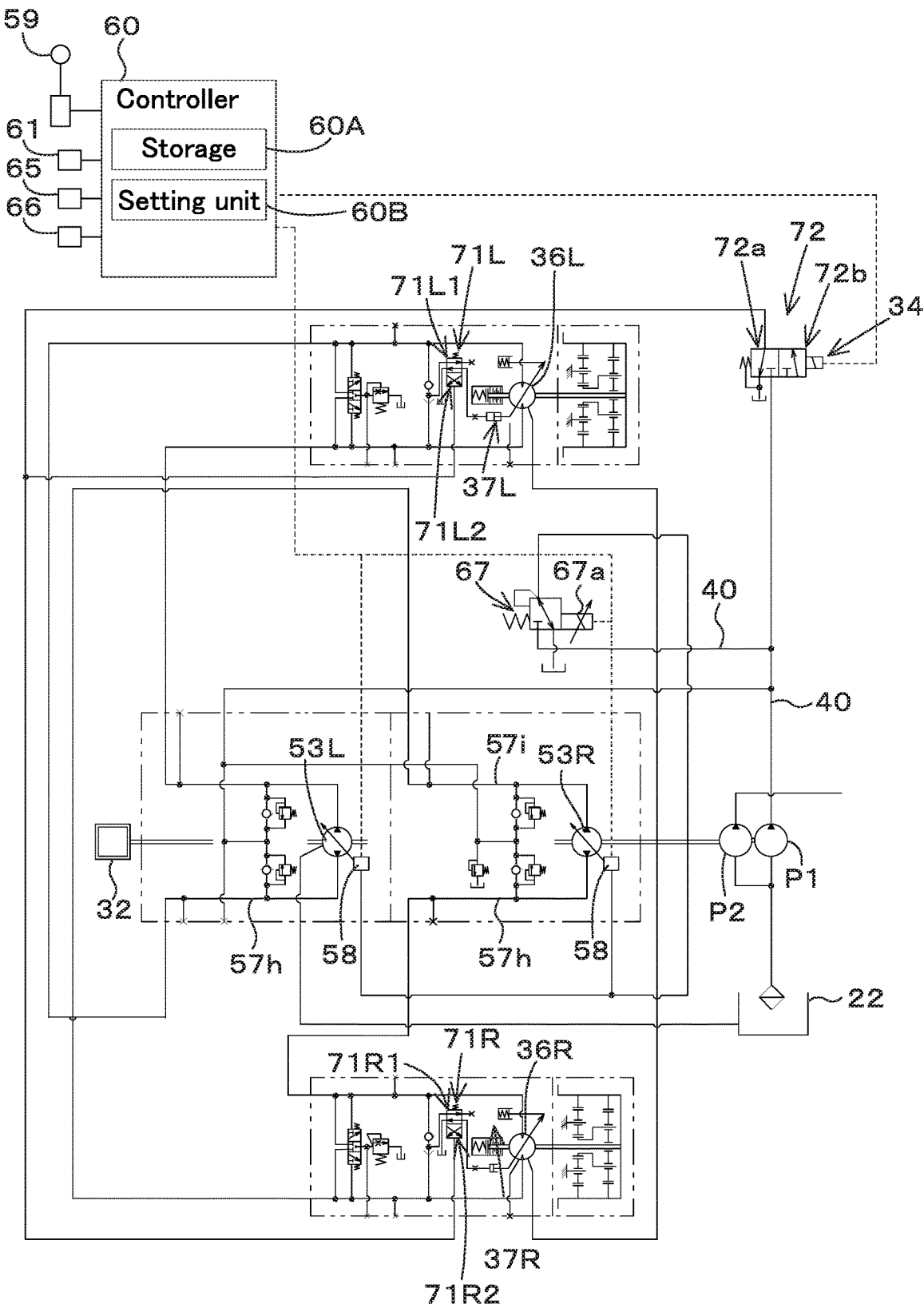
FIG. 6A is a view showing a hydraulic system (a hydraulic circuit) for a working machine provided with an electrically-operable joy stick according to a second embodiment of the present invention.

As shown in FIG. 6A, the operation lever 59 is an operation lever configured to swing in the lateral direction (that is, the machine width direction) or the fore-and-aft direction. The operation lever 59 has a sensor (that is, an operation detector) configured to detect the operation amount (that is, the swing amount) and the operational direction (that is, the swing direction). The operation detector is connected to the controller 60.

The hydraulic regulators 58 that operate the swash plates of the traveling pumps (that is, the first traveling pump 53L and the second traveling pump 53R) are connected to the controller 60. The hydraulic regulators 58 are respectively connected to the swash plate of the first traveling pump 53L and the swash plate of the second traveling pump 53R. Accordingly, the swash plate of the first traveling pump 53L and the swash plate of the second traveling pump 53R can be controlled independently.

When the operation lever 59 is operated forward (corresponding to the direction A1 in FIG. 1), the controller 60 outputs a control signal to the hydraulic regulators 58. In response to the control signal, the hydraulic regulators 58 tilt the swash plates of the first traveling pump 53L and the second traveling pump 53R in the respective directions to deliver the operation fluid from the first and second traveling pumps 53L and 53R in respective flow directions to rotate the first and second traveling motors 36L and 36R in respective normal directions (that is, the forward traveling directions).

When the operation lever 59 is operated backward (corresponding to the direction A2 in FIG. 1), the controller 60 outputs a control signal to the hydraulic regulators 58. In response to the control signal, the hydraulic regulators 58 tilt the swash plates of the first traveling pump 53L and the second traveling pump 53R in the respective directions to deliver the operation fluid from the first and second traveling pumps 53L and 53R in respective flow directions to rotate the first and second traveling motors 36L and 36R in respective reverse directions (that is, the backward traveling directions).

When the operation lever 59 is operated to the right (corresponding to the direction A3 in FIG. 1), the controller 60 outputs a control signal to the hydraulic regulators 58. In response to the control signal, the hydraulic regulators 58 tilt the swash plate of the first traveling pump 53L in the direction to deliver the operation fluid from the first traveling pump 53L in the flow direction to rotate the first traveling motor 36L in the normal direction, and the swash plate of the second traveling pump 53R in the direction to deliver the operation fluid from the second traveling pump 53R in the flow direction to rotate the second traveling motor 36R in the reverse direction.

When the operation lever 59 is operated to the left (corresponding to the direction A4 in FIG. 1), the controller 60 outputs a control signal to the hydraulic regulators 58. In response to the control signal, the hydraulic regulators 58 tilt the swash plate of the first traveling pump 53L in the direction to deliver the operation fluid from the first traveling pump 53L in the flow direction to rotate the first traveling motor 36L in the reverse direction, and the swash plate of the second traveling pump 53R in the direction to deliver the operation fluid from the second traveling pump 53R in the flow direction to rotate the second traveling motor 36R in the normal direction.

Figure 6B:
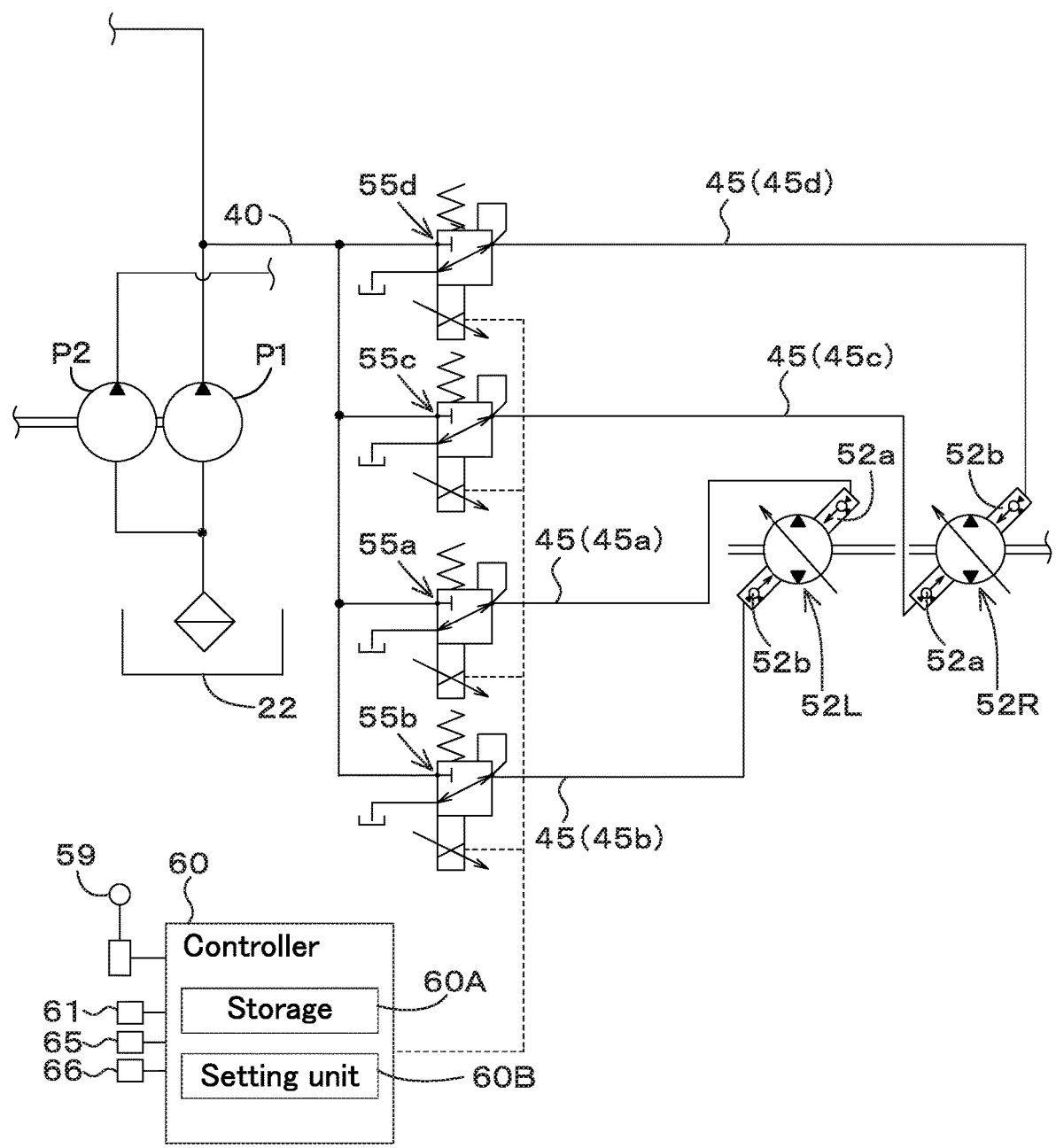
FIG. 6B is a view showing the hydraulic system (the hydraulic circuit) for the working machine in which an operation valve and an actuation valve are integrated (combined) according to the second embodiment.

In FIG. 6A, the hydraulic regulators 58 are connected to the controller 60; instead of this configuration, as shown in FIG. 6B, the operation valves 55 (that is, the operation valves 55A, 55B, 55C, and 55D) constituted of electromagnetic proportional valves may be employed, and the controller 60 may output the control signal to the operation valves 55 (that is, the operation valves 55A, 55B, 55C, and 55D) according to the operation amount and operational direction of the operation lever 59. The operation valves 55 (that is, the operation valves 55A, 55B, 55C, and 55D) are respectively assigned to the operational directions (that is, the direction A1 to the direction A4) of the operation lever 59.

Since the operation valves 55 (that is, the operation valves 55A, 55B, 55C, and 55D) in FIG. 6B are constituted of electromagnetic proportional valves, the operation valves 55 include the functions of the actuation valve 67 also constituted of an electromagnetic proportional valve according to the first embodiment. The controller 60 controls the operation valves 55 to perform the anti-stall control and shock reduction control.

Figure 6C:
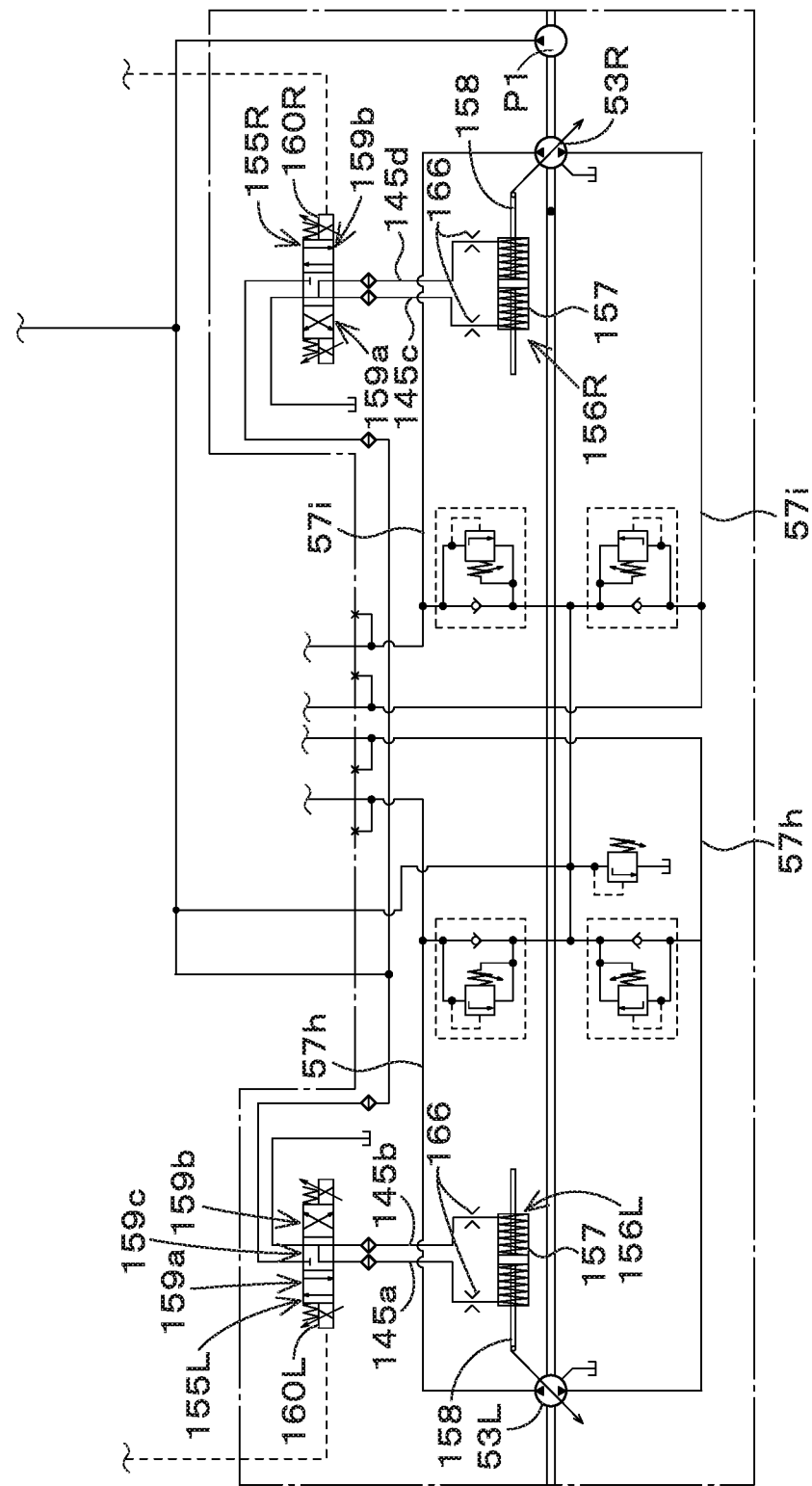
FIG. 6C is a view showing the hydraulic system (the hydraulic circuit) for the working machine different from FIG. 6B according to the second embodiment.

Moreover, instead of the operation valves 55 (that is, the operation valves 55A, 55B, 55C, and 55D) of FIG. 6B, the operation valves 155L and 155R shown in FIG. 6C may be employed, and instead of the hydraulic regulators 58 of FIG. 6B, hydraulic regulators 156L and 156R shown in FIG. 6C may be employed. In the operation valves 155L and 155R as well as in the operation valves 55 (that is, the operation valves 55A, 55B, 55C, and 55D), the switching positions and opening degrees of the valves are controlled according to a control signal output from the controller 60 in response to the operation of the operation lever 59. Since the operation valves 155L and 155R are constituted of electromagnetic proportional valves, the operation valves 155L and 155R include the functions of the actuation valve 67 also constituted of an electromagnetic proportional valve according to the first embodiment. The controller 60 controls the operation valves 155L and 155R to perform the anti-stall control and shock reduction control.

As shown in FIG. 6C, the hydraulic regulators 156L and 156R are respectively connected to the swash plates of the traveling pumps (that is, the first traveling pump 53L and the second traveling pump 53R). Each of the hydraulic regulators 156L and 156R is capable of changing an angle of the swash plate (that is, a swash plate angle) of the traveling pump (that is, the first traveling pump 53L or the second traveling pump 53R), and includes a supply chamber 157 to which operation fluid is supplied and a piston rod 158 provided in the supply chamber 157. The piston rod 158 is connected to the swash plate, and movement (that is, extending and contracting) of the piston rod 158 causes the swash plate to tilt and the swash plate angle to be changed.

The operation valve 155L is a valve that directly operates the hydraulic regulator 156L and controls an amount of operation fluid to be output by the first traveling pump 53L through operation of the hydraulic regulator 156L. The operation valve 155L is constituted of a solenoid proportional valve having a solenoid 160L, and the spool of the operation valve 155L moves based on the control signal output from the controller 60 to the solenoid 160L. This movement of the spool changes an opening degree of the operation valve 155L. The operation valve 155L has a first position 159a, a second position 159b, and a neutral position 159c, and can be switched to any of these positions.

A first port of the operation valve 155L is connected to the supply chamber 157 of the hydraulic regulator 156L by a first traveling fluid line 145a. A second port of the operation valve 155L is connected to the supply chamber 157 of the hydraulic regulator 156L by a second traveling fluid line 145b.

The operation valve 155R is a valve that directly operates the hydraulic regulator 156R and controls an amount of operation fluid to be output by the second traveling pump 53R through operation of the hydraulic regulator 156R. The operation valve 155R is constituted of a solenoid proportional valve having a solenoid 160R, and the spool of the operation valve 155R moves based on the control signal output from the controller 60 to the solenoid 160R. This movement of the spool changes an opening degree of the operation valve 155R. The operation valve 155R has a first position 159a, a second position 159b, and a neutral position 159c, and can be switched to any of these positions.

A first port of the operation valve 155R is connected to the supply chamber 157 of the hydraulic regulator 156R by a third traveling fluid line 145c. A second port of the operation valve 155R is connected to the supply chamber 157 of the hydraulic regulator 156R by a fourth traveling fluid line 145d.

When the operation valve 155L and the operation valve 155R are switched to the first position 159a, the hydraulic regulators 156L and 156R are actuated to tilt the swash plates of the traveling pumps (that is, the first traveling pump 53L and the second traveling pump 53R), and thus the traveling pumps rotate normally. When the operation valve 155L and the operation valve 155R are switched to the second position 159b, the hydraulic regulators 156L and 156R are actuated to tilt the swash plates of the traveling pumps (that is, the first traveling pump 53L and the second traveling pump 53R), and thus the traveling pumps rotate reversely.

When the operation valve 155L is switched to the first position 159a and the operation valve 155R is switched to the second position 159b, the first traveling pump 53L rotates normally, and the second traveling pump 53R rotates reversely. When the operation valve 155L is switched to the second position 159b and the operation valve 155R is switched to the first position 159a, the first traveling pump 53L rotates reversely, and the second traveling pump 53R rotates normally.

Figure 7B:
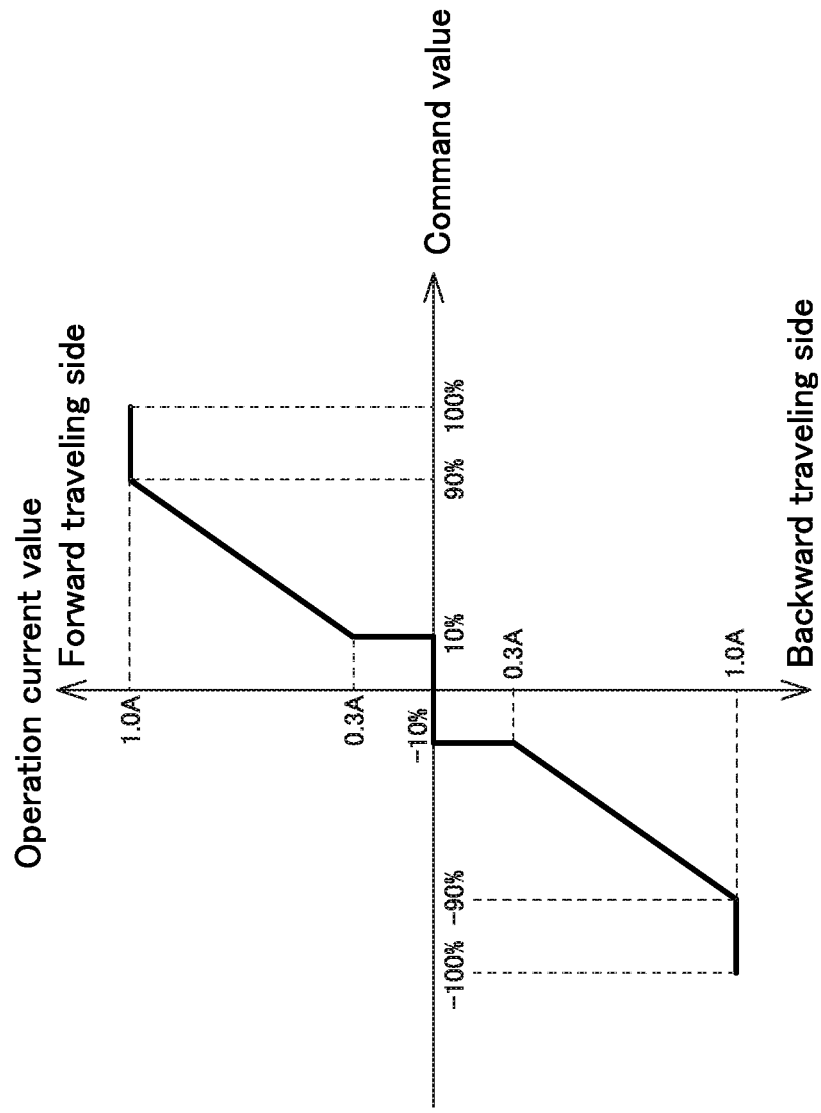
FIG. 7B is a view showing conversion of the command values into electric currents according to the second embodiment.
Figure 8:
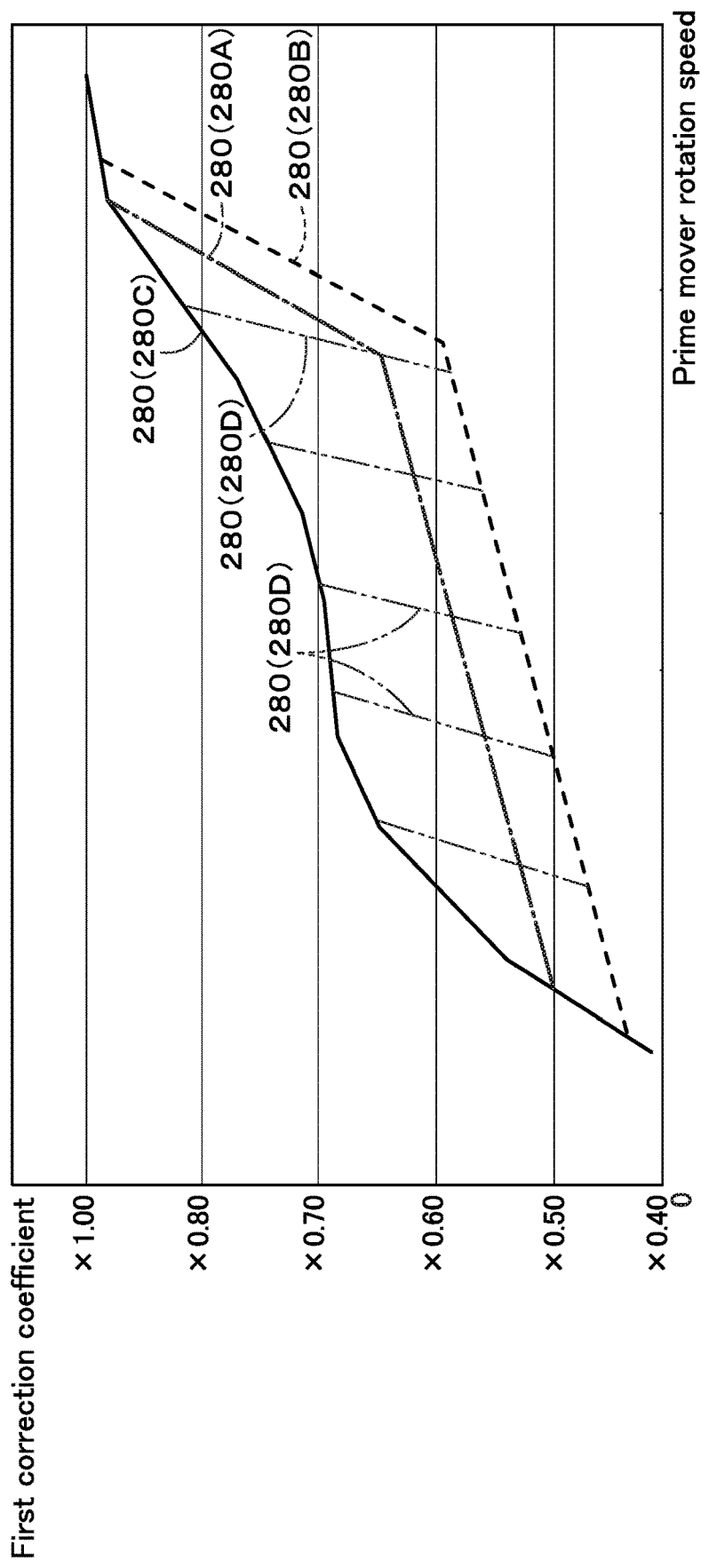
FIG. 8 is a view showing a first correction coefficient.

As described above, in the configuration using the hydraulic regulators 58 shown in FIG. 6A, the configuration using the operation valve 55 shown in FIG. 6B, and the configuration using the operation valves 155L and 155R shown in FIG. 6C, the controller 60 performs the anti-stall controls (that is, the first speed anti-stall control and the second speed anti-stall control) based on the configurations shown in FIGS. 7A, 7B, and 8.

FIG. 7A shows eight operational directions of the operation lever 59 and the command values corresponding to operation amounts in the respective directions. In FIG. 7A, a positive indication means the normal rotation of the traveling pump, a negative indication means the reverse rotation of the traveling pump, and the operation amounts (that is, the command values) are shown in a percentage (%). When the operation amount of the operation lever 59 is the maximum, the indication is ±100%, and when the operation amount is the minimum, the indication is 0%.

That is, the values shown in FIG. 7A are the command values to the first traveling pump 53L and the command values to the second traveling pump 53R. For example, the indication (100%, 100%) shows that the command value of forward traveling to the first traveling pump 53L is 100% and the command value of forward traveling to the second traveling pump 53R is also 100%. For example, the indication (100%, −100%) provided when the operation lever 59 is swung to the right shows that the command value for backward traveling to the second traveling pump 53R is −100% and the command value of forward traveling to the first traveling pump 53L is 100%.

FIG. 7B shows, in amperes (A), the current values corresponding to the command values of the operating lever 59 (that is, the operation current value output to the hydraulic regulators 58, the operation valves 55, or the operation valves 155L and 155R).

FIG. 8 shows a graph representing a relationship between the correction value (referred to as a first correction coefficient) applied to the command value (that is, the current) of the operation lever 59 and the actual rotation speed of the prime mover 32 in order to control the traveling pumps in the anti-stall controls (that is, the first speed anti-stall control and the second speed anti-stall control). The value of the first correction coefficient is large, close to "1" when the actual rotation speed becomes high, but decreases toward "0.5 to 0.4" when the actual rotation speed becomes low.

Since the hydraulic regulators 58, the operation valves 55, and the operation valves 155L and 155R are operated by the operation current values corresponding to the command values shown in FIG. 7B, the operation current values shown in FIG. 7B perform a function corresponding to the traveling primary pressure in the first embodiment. In the first embodiment, for the purpose of executing the anti-stall controls by controlling the traveling primary pressure as shown in FIG. 2, an upper limit of operation current that is a control signal to be output to the actuation valve 67 is set based on the control information shown in FIG. 3.

In this embodiment, as the anti-stall controls, a correction coefficient (referred to as a first correction coefficient) according to an actual rotation speed of the prime mover 32 is extracted from the graph shown in FIG. 8, and the extracted first correction coefficient is multiplied by the operation current value shown in FIG. 7B to correct the operation current value. In FIG. 8, the first line 280A, the second line 280B, the third line 280C, and the fourth line 280D are the correction values (that is, the first correction coefficients) that correct the operation current values in the anti-stall controls.

First, the controller 60 determines the command values according to the operational direction and the operation amount of the operation lever 59, as shown in FIG. 7A. Next, the controller 60 converts the command values into operation current values to be output to the hydraulic regulators 58, the operation valves 55, or the operation valves 155L and 155R, as shown in FIG. 7B. That is, the controller 60 determines current values (referred to as the operation current values) of the operation currents that are control signals to be output respectively to the hydraulic regulators 58, the operation valves 55, or the operation valves 155L and 155R, based on the operational direction and the operation amount of the operation lever 59, as shown in FIGS. 7A and 7B.

When the anti-stall controls (that is, the first speed anti-stall control and the second speed anti-stall control) are executed, the controller 60 multiplies, as the anti-stall control, the correction value (that is, the first correction coefficient) shown in FIG. 8 by the operation current values determined based on the configuration shown in FIGS. 7A and 7B. The controller 60 uses the operation current value determined by the multiplication of the first correction coefficient as the anti-stall current value that is the operation current value in the anti-stall control, and outputs the currents corresponding to the determined operation current values to the hydraulic regulators 58, the operation valves 55, or the operation valves 155L and 155R.

The current values determined and output as described above are substantially equivalent to the control information shown in FIG. 3 of the first embodiment. Accordingly, the same anti-stall controls as in the first embodiment can be performed in this embodiment which employs the operation lever 59 constituted of a joystick.

In this embodiment, the controller 60 obtains an anti-stall current value that is an operation current in the anti-stall control by multiplying the operation current value by a correction value (that is, the first correction coefficient); however, when simply using the current value corresponding to the first correction coefficient shown in FIG. 8 as the upper limit of the current value corresponding to a command value of the operation lever 59, the anti-stall controls also can be realized.

That is, the current value obtained by multiplying the operation current value corresponding to the 100% command value of the operation lever 59 by the first correction coefficient is employed as an upper limit of operation current value on the vertical axis of the graph shown in FIG. 8. Then, the upper limit of the operation current value corresponding to an actual rotation speed of the prime mover 32 may be obtained based on the first line 180A, the second line 180B, the third line 180C, and the fourth line 180D. In this method, the same anti-stall controls as in the first embodiment can be performed.

Moreover, as in the first embodiment, an upper limit of operation current value may be determined based on the control information shown in FIG. 3. In this embodiment, when an operation current value based on the operational direction and the operation amount of the operation lever 59 exceeds the upper limit of operation current shown in FIG. 3, the controller 60 outputs, as the anti-stall current value that is an operation current value in the anti-stall control, the upper limit shown in FIG. 3 to the hydraulic regulators 58, the operation valves 55, or the operation valves 155L and 155R. In this method, the same anti-stall controls as in the first embodiment can be performed.

Figure 9B:
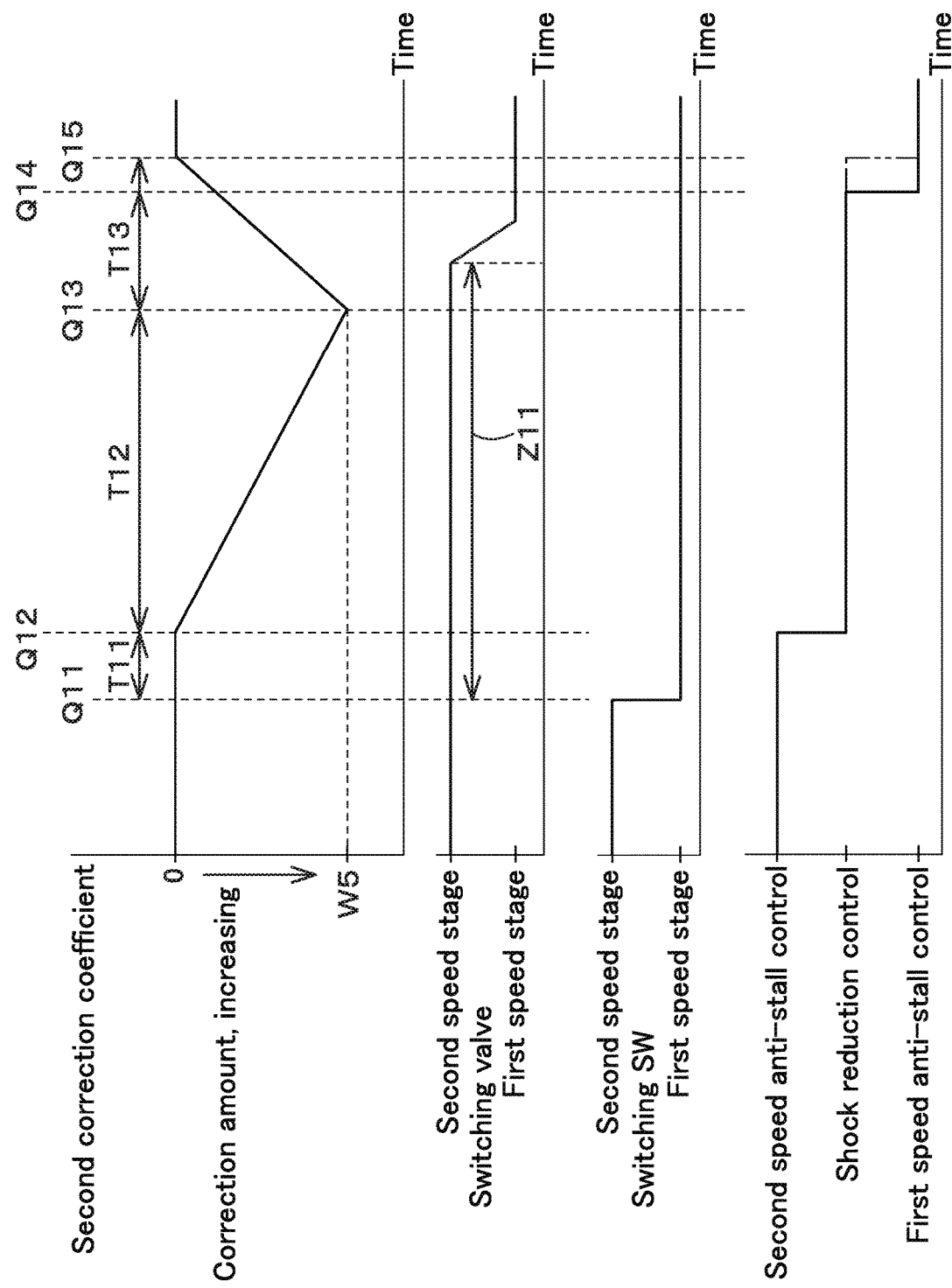
FIG. 9B is a view showing a relationship between the second correction coefficient, and the speed-shift of the traveling motor in the anti-stall control in speed-reducing the traveling motor from the second speed stage to the first speed stage according to the second embodiment.

In performing the shock reduction control similar to that of the first embodiment, the controller 60 multiplies an operation current value by a second correction coefficient to obtain current values (referred to as shock reduction current values) to be output to the hydraulic regulators 58, the operation valves 55, or the operation valves 155L and 155R, as shown in FIGS. 9A and 9B.

FIGS. 9A and 9B respectively correspond to FIGS. 5A and 5B according to the first embodiment. FIGS. 9A and 9B ae views showing a current value correction amount replaced by the second correction coefficient in FIGS. 5A and 5B. By multiplying the anti-stall current value by the second correction coefficient that varies as shown in FIGS. 9A and 9B, the shock in acceleration and deceleration of the traveling motors can be reduced.

In more detail, as shown in FIG. 9A, the controller 60 multiplies the operation current value by the correction value (that is, the first correction coefficient) in the first speed anti-stall control that is the anti-stall control at the first speed stage before the time point Q2. At this time, a value of the second correction coefficient is, for example, 1. By reducing a value of the second correction coefficient, a correction amount to the operation current value is increased.

In the working machine 1 according to the present embodiment, the controller 60 may execute the shock reduction control simultaneously with the anti-stall control. The shock reduction control is a control that corrects a current value (that is, an operation current value) of the anti-stall current that is a control signal to be output to the hydraulic regulators 58, the operation valves 55, or the operation valves 155L and 155R.

In detail, the shock reduction control is a control to correct an operation current value to be output to the hydraulic regulators 58, the operation valves 55, or the operation valves 155L and 155R, such as instantaneously reducing a current value (that is, a control amount) of the anti-stall current that is a control signal to be output to the hydraulic regulators 58, the operation valves 55, or the operation valves 155L and 155R in shifting the speed stage from the first speed stage to the second speed stage or from the second speed stage to the first speed stage.

FIG. 9A is a view showing a relationship between a correction amount to a current value (that is, an operation current value) of the anti-stall current to be output to the hydraulic regulators 58, the operation valves 55, or the operation valves 155L and 155R in accelerating the traveling motors from the first speed stage to the second speed stage, the switching of the traveling motors (that is, the switching valve or the switch SW), the anti-stall control and shock reduction control. The time Z10 in FIG. 9A is a switching time (a delay time) until starting of the switching of the traveling switching valve (that is, the switching valve) 34 from the first state (that is, the first speed stage) to the second state (that is, the second speed stage) after an acceleration command is output by operating the switch unit (that is, the switch SW) 61.

As shown in FIG. 9A, when the switch 61 is operated at a time point Q1, the controller 60 acquires the acceleration command (referred to as a second speed command) from the switch 61 to switch the speed stage from the first state (that is, the first speed stage) to the second state (that is, the second speed stage).

The controller 60 corrects the anti-stall current to be output to the hydraulic regulators 58, the operation valves 55, or the operation valves 155L and 155R after the time point Q2. The controller 60 gradually reduces the current value of the anti-stall current by a predetermined value (referred to as a shock reduction value) W3 during a time T1 after the time point Q2. That is, the controller 60 increases the correction amount to the current value of the anti-stall current during the time T1 after the time point Q2. The shock reduction value W3 is a correction amount to the current value for reducing a gear-shifting shock caused in switching from the first speed stage to the second speed stage, and is a value obtained from actual results, experiments, or theoretical simulations. The shock reduction value, which is a correction value to the anti-stall current, varies between zero and the predetermined value W3.

After the time point Q2, at the time point Q3 where the time T1 has elapsed, the switching of the traveling switching valve 34 to the second speed stage is completed. At the time point Q3, when the correction amount of the control signal reaches the shock reduction value W3, the controller 60 gradually restores the correction amount of the control signal to zero during the time T2 after the time point Q3. That is, the anti-stall current is gradually restored to the value before the correction, that is, before the time point Q2.

After the time point Q3, that is, after the traveling switching valve 34 is switched from the first state (that is, the first speed stage) to the second state (that is, the second speed stage), the controller 60 shifts to the anti-stall control at the second speed stage (referred to as a second speed anti-stall control) based on the second line 180B shown in FIG. 8.

That is, for example, the controller 60 shifts to the second speed anti-stall control in which the second speed pilot pressure is set according to the second line 180B at the time point Q5 when the correction amount (that is, the current value) of the anti-stall current to the hydraulic regulators 58, the operation valves 55, or the operation valves 155L and 155R is restored to zero.

The time points Q1 and Q2 may be simultaneous (the same) or may be different in very short time, and are not limited thereto. The interval (time) from the time point Q2 to the time point Q3 is set to be shorter than the interval (time) from the time point Q3 to the time point Q5. In other words, the interval (time) from the time point Q3 to the time point Q5 is set to be longer than the interval (time) from the time point Q2 to the time point Q3.

FIG. 9B shows a relationship between a correction amount to an anti-stall current value to the hydraulic regulators 58, the operation valves 55, or the operation valves 155L and 155R in reducing the traveling motors from the second speed stage to the first speed stage, switching of the traveling motors (that is, the switching valve, the switch SW), the anti-stall control and shock reduction control. A time Z11 in FIG. 9B is a switching time (that is, a delay time) from a time when the deceleration command is output by operating the switch unit (that is, the switch SW) 61 to a time when the switching of the traveling switching valve (that is, a switching valve) 34 from the second state (that is, the second speed stage) to the first state (that is, the first speed stage) starts. The time Z11 is set to be longer than the time Z10 described in FIG. 9A.

As shown in FIG. 9B, when the switch 61 is operated at the time point Q11, the controller 60 acquires a deceleration command (referred to as a first speed command) from the switch 61 to switch from the second state (that is, the second speed stage) to the first state (that is, the first speed stage).

The controller 60 corrects a current value of the anti-stall current to be output to the hydraulic regulators 58, the operation valves 55, or the operation valves 155L and 155R after the time point Q12 at which the time T11 has elapsed from the time point Q11. The controller 60 gradually decreases the current value of the anti-stall current by a predetermined value (referred to as a shock reduction value) W5 during the time T12 after the time point Q12. That is, after the time point Q12 and during the time T12, the controller 60 gradually increases the correction amount to the current value of the anti-stall current more slowly than the increasing between the time point Q2 and the time point Q3 in FIG. 9A. The shock reduction value W5 is a correction amount for the current value to reduce the gear-shifting shock caused in switching from the second speed stage to the first speed stage, and is a value obtained from actual results, experiments, and theoretical simulations. The shock reduction value, which is a correction value to the anti-stall current value, varies between zero and the predetermined value W5.

At the time point Q13 at which the time T12 has elapsed from the time point Q12, the traveling switching valve 34 has not yet been switched to the second speed stage. At the time point Q13, when the correction amount of the control signal reaches the shock reduction value W5, the controller 60 gradually restores the correction amount of the control signal to zero during the time T13 from the time point Q13 to the time point Q15. That is, the current value of the anti-stall current is gradually restored to the value before the correction, that is, before the time point Q12.

After the time point Q13, that is, in a process of gradually restoring the correction amount of the anti-stall current output to the hydraulic regulators 58, the operation valves 55, or the operation valves 155L and 155R to zero, the controller 60 switches the traveling switching valve 34 from the second state (that is, the second speed stage) to the first state (that is, the first speed stage). This switching is completed before the correction amount of the anti-stall current value has restored to zero, and the correction amount of the anti-stall current value is restored to zero a little later after the completion of this switching.

For example, at a time point Q14 when the controller 60 is in a process of gradually restoring the correction amount of the control signal to the hydraulic regulators 58, the operation valves 55, or the operation valves 155L and 155R to zero, the controller 60 shifts to the anti-stall control at the first speed stage (referred to as a first speed anti-stall control) based on the first line 180A shown in FIG. 8.

In the above-described embodiment, the shifting to the first speed anti-stall control is made at the time point Q14 at which the correction amount (that is, the current value) is gradually restored to zero after the time point Q13. However, the controller 60 may shift to the first speed anti-stall control when the correction amount (that is, the current value) of the anti-stall current reaches zero at the time point Q15 after the time point Q13.

The time points Q11 and Q12 may be simultaneous (the same) or may be different in very short time, and are not limited thereto. The interval (time) from the time point Q12 to the time point Q13 is set to be longer than the interval (time) from the time point Q13 to the time point Q14. In other words, the interval (time) from the time point Q13 to the time point Q14 is set to be shorter than the interval (time) from the time point Q12 to the time point Q13.

Figure 9C:
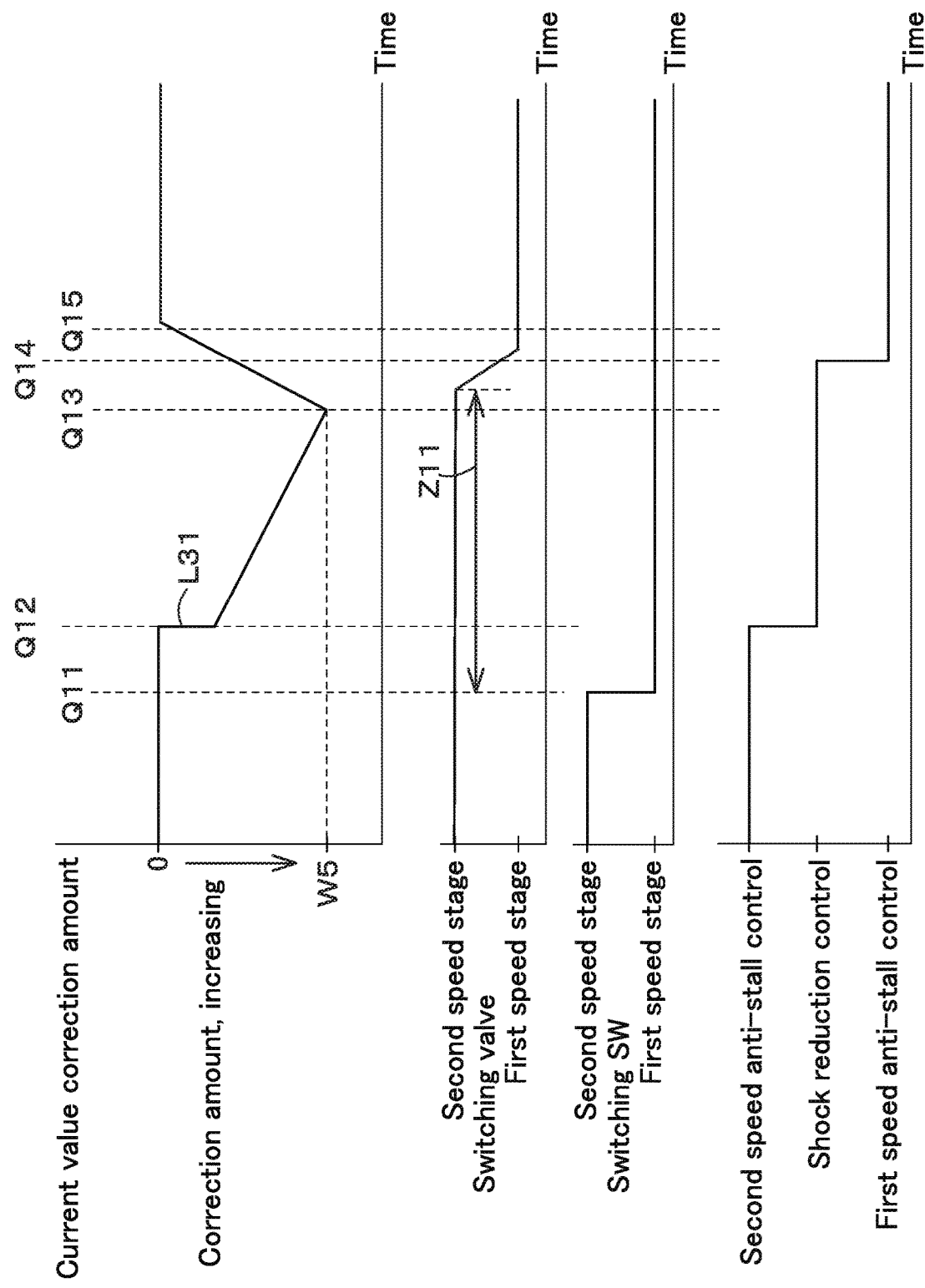
FIG. 9C is a view showing a relationship between the second correction coefficient and the speed-shift of the traveling motor, and the anti-stall control in speed-reducing the traveling motor from the second speed stage to the first speed stage according to the second embodiment.

In the shock reduction control, the controller 60 may vary the correction amount not continuously but in multiple stages. As shown in FIG. 9C, when the controller 60 varies the control amount (that is, the current value) in multiple stages in the shock reduction control, for example, as shown in line L131, the controller 60 increases the correction amount steeply at the time point Q12. Then the controller 60 may gradually decrease the correction amount, and after the correction amount (that is, the current value) reaches the shock reduction value W5, and may switch the traveling switching valve 34 from the second state (that is, the second speed stage) to the first state (that is, the first speed stage). After the time point Q13, the controller 60 may shift to the first speed anti-stall control in a process of gradually restoring the correction amount (that is, the current value) to zero.

The time Z11 in FIG. 9C is the switching time (that is, the delay time) from the time when the deceleration command is given by operating the switch unit (that is, the switch SW) 61 to the time when the switching of the traveling switching valve (that is, the switching valve) 34 from the second state (that is, the second speed stage) to the first state (that is, the first speed stage) starts. This time Z11 is set to be longer than the time Z10 described in FIG. 9A.

As shown in FIGS. 9A and 9B, a time length for the shock reduction control is longer for the deceleration command (FIG. 9B) than for the acceleration command (FIG. 9A) after the switching operation by the switch 61.

An important point in the configuration described using FIGS. 9A to 9C is that, for the acceleration command, the switching from the first speed stage to the second speed stage is completed in the middle of increasing the correction amount, and, for the deceleration command, the switching from the second speed stage to the first speed stage is completed in the middle of gradually restoring the correction amount to zero. In this manner, the controller 60 completes the acceleration or deceleration command while the control signal to the hydraulic regulators 58, the operation valves 55, or the operation valves 155L and 155R is being corrected in the shock reduction control. In this manner, the shock reduction control completes the acceleration or deceleration command while the traveling primary pressure is being corrected.

In the second embodiment, methods of correcting the operation current value and the anti-stall current value in various ways are explained. This methods of correcting the operation current value and anti-stall current value can be summarized as follows.

That is, since the above-mentioned corrections are made to the operation current value and the anti-stall current value under the anti-stall control, the current value of the anti-stall current to be output to the hydraulic regulators 58, the operation valves 55, or the operation valves 155L and 155R is not necessarily the same as the operation current value shown in FIG. 7B based on the command value of the operation lever 59, and behaves differently. For example, as shown in FIG. 9A, when the acceleration command is output, the anti-stall current value is sharply reduced and then the anti-stall current value is increased more slowly than in being reduced. In addition, as shown in FIG. 9B, when the deceleration command is output, the anti-stall current value is reduced slowly, and then the anti-stall current value is increased more rapidly than in being reduced. Moreover, as shown in FIG. 9C, when the deceleration command is output, the anti-stall current value is reduced rapidly by a predetermined current value, and then gradually reduced in a mildly-reducing gradient. After that, the anti-stall current value is increased more steeply than in being reduced.

In this embodiment, the same shock reduction effect can be obtained when, instead of the shock reduction control described above, the actual rotation speed of the prime mover 32 is controlled to be decreased as shown in FIGS. 5C and 5D described in the first embodiment.

The configuration and method of achieving shock reduction through control of reducing the actual rotation speed of the prime mover 32 are the same as the configuration and method described in the first embodiment, and thus descriptions thereof are omitted.

In the above-described first and second embodiments, PI control and PID control may be applied to control a current value to be output according to a target rotation speed and actual rotation speed of the prime mover in outputting control signals (that is, operation currents) to the actuation valve 67, hydraulic regulators 58, operation valves 55, or operation valves 155L and 155R, which are constituted of electromagnetic proportional valves, for example.

For example, the controller 60 may perform a feedback control in the PI control or the PID control to change the operation current values to be output to the actuation valve 67, the hydraulic regulators 58, the operation valves 55, or the operation valves 155L and 155R based on a difference between the target rotation speed and the actual rotation speed. For example, when the difference between the target rotation speed and the actual rotation speed becomes larger, the operation current value is corrected to be smaller than the original value, and when the difference becomes smaller, the operation current value is corrected to be restored to the original value. This kind of feedback control can be realized in the PI control or the PID control, and the control equivalent to the anti-stall control described above can be realized.

In particular, in the PI control and the PID control, the controller 60 sets the proportional gain (that is, the P gain) to a different value at the first speed stage or at the second speed stage. Specifically, two proportional gains, the proportional gain used at the first speed stage and the proportional gain used at the second speed stage, are used. By selectively using these two proportional gains, the controller 60 can perform the feedback control (that is, the anti-stall control) so that the operation current value is corrected in a greater amount at the first speed stage than at the second speed stage, even for the same difference.

The controller 60 can also perform the similar feedback control (that is, the anti-stall control) in the PI control and the PID control, even when a differential gain (that is, a D-gain) is set to a different value at the first speed stage or at the second speed stage, that is, even when two differential gains are selectively used. By selectively using these two differential gains, the feedback control (that is, the anti-stall control) can be performed so that the operation current value is corrected in a greater amount at the first speed stage than at the second speed stage, even for the same difference.

It is obvious that either the PI control or the PID control can be selected according to the characteristics of the control target. In addition, the values of proportional gain, differential gain, and integral gain are not determined independently, but are determined to the values that provide the best feedback control in the combination.

Instead of the PI control and the PID control, the anti-stall current value, which is the operation current value under the anti-stall control, can be determined by calculation using the following Equations (1) to (3). In Equations (1) to (3), the symbol (A) indicates the current value ampere.

$$\text{Anti-stall current value } (A) = \text{operation current } (A) \times \alpha \times (\text{engine target rotation speed} - \text{actual rotation speed}) \quad (1)$$

In Equation (1), the anti-stall current can be determined by multiplying the operation current value provided when the anti-stall control is not being executed by a coefficient α and making it proportional to the difference between the engine target rotation speed and the actual rotation speed.

When a different value is used for the factor α at the first speed stage or at the second speed stage, an appropriate anti-stall current value can be determined in the same manner as the embodiments described above.

$$\text{Anti-stall current value } (A) = 0.3A + (\text{operation current } (A) - 0.3) \times \alpha \times (\text{engine target rotation speed} - \text{actual rotation speed}) \quad (2)$$

Equation (2) may be used when the variation of the command value of the operation lever 59, which is constituted of a joystick, fluctuates up or down by 10% or more. In Equation (2), 0.3 A is firstly introduced as a basic current value. Then, the current value for the correction is obtained by multiplying the value obtained by subtracting the basic 0.3 A from the operation current value by a coefficient α, and further by proportioning the obtained value to the difference between the target engine speed and the actual rotation speed. The anti-stall current can be determined by adding the current value for the correction to the basic current value of 0.3 A.

In Equation (2), when a different value is used for the coefficient α at the first speed stage or at the second speed stage, the appropriate anti-stall current value can be determined in the same way as in the embodiments mentioned above.

Anti-stall current value (A)=operation current (A)—
α×(engine target rotation speed—actual rotation
speed)  (3)

Unlike Equation (2), Equation (3) can be used even when the fluctuation of the command value of the operation lever 59 is less than 10% up or down. In Equation (3), the anti-stall current can be determined by subtracting the current value proportional to the difference between the engine target rotation speed and the actual rotation speed from the operation current value. Equation (3) may provide a negative anti-stall current value when the difference between the engine target rotation speed and the actual rotation speed is extremely large. In this case, the controller 60 determines the anti-stall current value to be zero.

In equation (3), when a different value is used for the factor a at the first speed stage or at the second speed stage, an appropriate anti-stall current value can be determined, as in the embodiments mentioned above.

The switching period of the traveling switching valve 34 and the timing of the acceleration command in the acceleration command shown in FIG. 5A according to the first embodiment and in the acceleration command shown in FIG. 9A according to the second embodiment will be described. In the first and second embodiments, the period during which the traveling switching valve 34 switches from the first speed stage to the second speed stage, that is, the period during which the traveling switching valve 34 switches from the first speed stage to the second speed stage in FIGS. 5A and 9A, is controlled so that the period overlaps at least partially with the period during which the correction amount to the current value and the correction amount to the second correction coefficient increase.

That is, the controller 60 may output the acceleration command at a timing such that the period during which the traveling switching valve 34 switches from the first speed stage to the second speed stage and the period during which the correction amounts increase overlap at least partially. By controlling the overlap of these periods, it is possible to realize smooth acceleration that takes into account the response delay of the traveling switching valves 34 (that is, the first switching valves 71L and 71R and the second switching valve 72) and the swash plate switching cylinders 37L and 37R, and thus the engine stall can be prevented more reliably. When the overlap of these periods is further controlled by taking into account a temperature of operation fluid and configurations of the hydraulic equipment, further smoother acceleration can be achieved, and thus the engine stall can be prevented more reliably.

Similarly in the switching period of the traveling switching valve 34 in the deceleration command shown in FIG. 5B according to the first embodiment and in the deceleration command shown in FIG. 9B according to the second embodiment and the period of the acceleration command, the period during which the traveling switching valve 34 switches from the second speed stage to the first speed stage, that is, the period during which the traveling switching valve 34 switches from the second speed stage to the first speed stage in FIG. 5B and FIG. 9, may be controlled to overlap, at least in part, with the period during which the correction amount to the current value and the correction amount to the second correction coefficient decrease.

That is, the controller 60 may output the deceleration command at a timing such that the period during which the traveling switching valve 34 switches from the second speed stage to the first speed stage and the period during which the correction amount increases overlap at least partially. By controlling the overlap of these periods, it is possible to achieve smooth deceleration that takes into account the response delay of the traveling switching valves 34 (that is, the first switching valves 71L and 71R and the second switching valve 72) and the swash plate switching cylinders 37L and 37R, and to prevent the engine from stalling more reliably. When the overlap of these periods is further controlled by taking into account a temperature of the operation fluid and configurations of the hydraulic equipment, further smoother deceleration can be achieved, and thus the engine stalling can be prevented more reliably.

In the above-described embodiments, the shock reduction control and the actual rotation speed reduction control are executed independently (that is, in combination) with the anti-stall control, but the shock reduction control may be executed while the anti-stall control is stopped. The shock reduction control can also be executed to control signals (that is, operation current values) that are not under anti-stall control.

In the above-described embodiment, the switching device is constituted of a switch 61 configured to be manually or otherwise operated by an operator or the like, but it may be incorporated into the controller 60. When the switching device is incorporated into the controller 60, the switching device is constituted of computer programs, electrical and electronic components (that is, electronic circuits) stored in the controller 60. In this case, the switching device of the controller 60 judges whether to switch between the first speed state and the second speed state based on the detection information from various detection devices, for example, sensors, installed in the working machine 1, and outputs a control signal to the traveling switching valve 34 based on the judgment result. The traveling switching valve 34 switches to the first speed state when acquiring the control signal for the first speed state, and switches to the second speed state when acquiring the control signal for the second speed state.

Any valve may serve as the traveling switching valve 34 if it is a valve that can shift the rotation speed stage (meaning the respective rotation speed stages) of the traveling motors (that is, the first traveling motor 36L and the second traveling motor 36R) between the first state in which the first speed stage is set and the second state in which the second speed stage is set, or may be a proportional valve having a configuration different from a directional switching valve.

The traveling motor may be a motor that has a neutral stage (that is, a neutral position) between the first and second speed stages.

The traveling motors (that is, the first traveling motor 36L and the second traveling motor 36R) may be constituted of axial piston motors or radial piston motors. When the traveling motors are the axial piston motors or the radial piston motors, the traveling motors can be switched to the first speed stage by increasing the motor capacity, and can be switched to the second speed stage by decreasing the motor capacity.

Third Embodiment

Referring to the drawings, a third embodiment of the present invention will be described below. Detailed descriptions of components similar to the components described in the first and second embodiments are omitted by giving the same reference numerals to the similar components.

A hydraulic system for the working machine according to the present embodiment will be explained.

Figure 10:
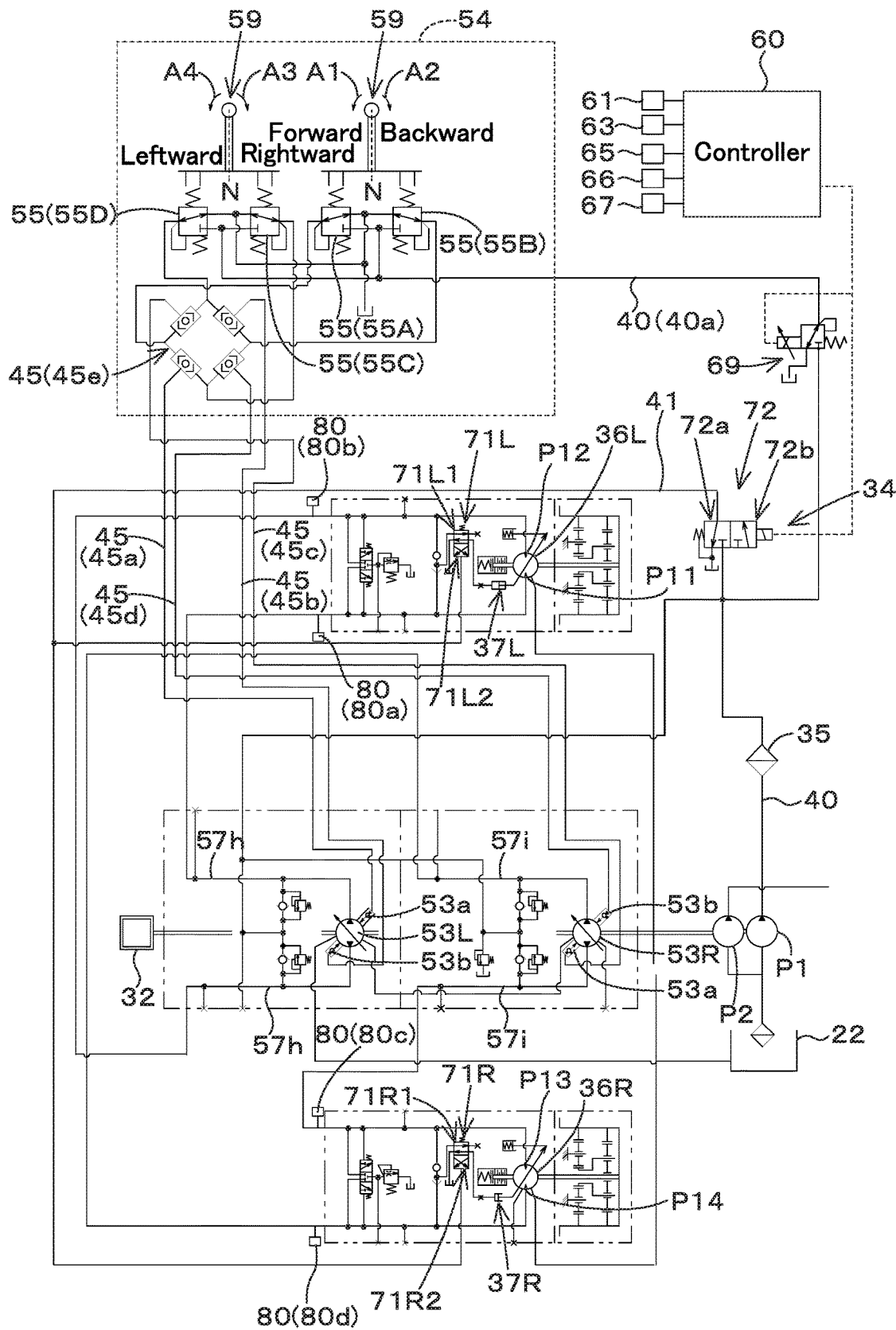
FIG. 10 is a view showing a hydraulic system (a hydraulic circuit) for a working machine according to a third embodiment of the present invention.

As shown in FIG. 10, the hydraulic system for the working machine is configured to drive the traveling devices 5. The hydraulic system for the working machine has the first traveling pump 53L, the second traveling pump 53R, the first traveling motor 36L, and the second traveling motor 36R.

The first traveling pump 53L and the second traveling pump 53R are pumps to be driven by the power of prime mover 32. Specifically, each of the first traveling pump 53L and the second traveling pump 53R is a variable displacement axial pump with a swash plate and is driven by the power of prime mover 32. Each of the first traveling pump 53L and the second traveling pump 53R includes a forward-traveling pressure-receiving portion 53a and a backward-traveling pressure-receiving portion 53b each of which receives a pilot pressure. In each of the first and second traveling pumps 53L and 53R, an angle of the swash plate is changed by the pilot pressures applied to the pressure-receiving portions 53a and 53b. In each of the first and second traveling pumps 53L and 53R, by changing the angle of the swash plate, delivery (output) amount and direction of operation fluid can be changed.

The first traveling pump 53L and the first traveling motor 36L are connected by a connecting fluid line 57h, and operation fluid delivered from the first traveling pump 53L is supplied to the first traveling motor 36L. The second traveling pump 53R and the second traveling motor 36R are connected by a connecting fluid line 57i, and the operation fluid delivered from the second traveling pump 53R is supplied to the second traveling motor 36R.

The first traveling motor 36L is a motor configured to transmit a power to a drive shaft of the first traveling device 5L provided on the left portion of the machine body 2. The first traveling motor 36L is capable of rotating, using operation fluid supplied from the first traveling pump 53L. By changing a flow rate of operation fluid to the first traveling motor 36L, a rotation speed of the first traveling motor 36L can be changed. A swash plate switching cylinder 37L is connected to the first traveling motor 36L. By extending and contracting the swash plate switching cylinder 37L in one direction or the other direction, a rotation speed of the first traveling motor 36L can be changed. That is, when the swash plate switching cylinder 37L is contracted, the rotation speed of the first traveling motor 36L is set to a low speed stage (referred to as a first speed stage). When the swash plate switching cylinder 37L is extended, a rotation speed of the first traveling motor 36L is set to a high speed stage (referred to as a second speed stage). That is, a rotation speed stage of the first traveling motor 36L is shiftable between the first speed stage that is a low speed stage and the second speed stage that is a high speed stage.

The second traveling motor 36R is a motor configured to transmit a power to a drive shaft of the second traveling device 5R provided on the right portion of the machine body 2. The second traveling motor 36R is capable of rotating, using operation fluid supplied from the second traveling pump 53R. By changing a flow rate of operation fluid to the second traveling motor 36R, a rotation speed of the second traveling motor 36R can be changed. A swash plate switching cylinder 37R is connected to the second traveling motor 36R. By extending and contracting the swash plate switching cylinder 37R in one direction or the other direction, a rotation speed of the second traveling motor 36R can be changed. That is, when the swash plate switching cylinder 37R is contracted, the rotation speed of the second traveling motor 36R is set to a low speed stage (referred to as a first speed stage). When the swash plate switching cylinder 37R is extended, a rotation speed of the second traveling motor 36R is set to a high speed stage (referred to as a second speed stage). That is, a rotation speed stage of the second traveling motor 36R is shiftable between the first speed stage that is a low speed stage and the second speed stage that is a high speed stage.

As shown in FIG. 10, the hydraulic system for the working device 1 has a traveling switching valve 34. The traveling switching valve 34 is configured to take either a position (referred to as a first state) for shifting the rotation speed stage of each of the traveling motors (that is, the traveling motor 36L and the traveling motor 36R) to the first speed stage or a position (referred to as a second) for shifting the rotation speed stage of each traveling motor to the second speed stage. The traveling switching valve 34 includes first switching valves 71L and 71R and a second switching valve 72.

The first switching valve 71L is constituted of a two-position switching valve connected via a fluid line to the swash plate switching cylinder 37L of the first traveling motor 36L, and has two positions, a first position 71L1 and a second position 71L2. The first switching valve 71L can be arbitrarily switched to take one of the two positions. The first switching valve 71L contracts the swash plate switching cylinder 37L when taking the first position 71L1, and extends the swash plate switching cylinder 37L when taking the second position 71L2.

The first switching valve 71R is constituted of a two-position switching valve connected via a fluid line to the swash plate switching cylinder 37R of the second traveling motor 36R, and has two positions, a first position 71R1 and a second position 71R2. The first switching valve 71R can be arbitrarily switched to take one of the two positions. The first switching valve 71R contracts the swash plate switching cylinder 37R when taking the first position 71R1, and extends the swash plate switching cylinder 37R when taking the second position 71R2.

The second switching valve 72 is a solenoid valve that switches the first switching valve 71L and the first switching valve 71R, and is constituted of a two-position switching valve having two positions, a first position 72 and a second position 72b. The second switching valve 72 is configured to be magnetized to take any one of the two positions. The second switching valve 72, the first switching valve 71L, and the first switching valve 71R are connected by a fluid line 41. The second switching valve 72 switches the first switching valve 71L and the first switching valve 71R respectively to the first positions 71L1 and 71R1 when switched to the first position 72, and switches the first switching valve 71L and the first switching valve 71R respectively to the second positions 71L2 and 71R2 when switched to the second position 72b.

That is, the traveling switching valve 34 is set in the first state to shift the rotation speed stage of each of the two traveling motors (that is, the traveling motor 36L and the traveling motor 36R) to the first speed when the second switching valve 72 is set at the first position 72, the first switching valve 71L is set at the first position 71L1, and the first switching valve 71R is set at the first position 71R1. The traveling switching valve 34 is set in the second state to shift the rotation speed stage of each of the two traveling motors (that is, the traveling motor 36L and the traveling motor 36R) to the second speed stage when the second switching valve 72 is set at the second position 72b, the first switching valve 71L is set at the second position 71L2, and the first switching valve 71R is set at the second position 71R2.

Accordingly, the traveling switching valve 34 allows the two traveling motors (that is, the traveling motor 36L and the traveling motor 36R) to be switched between the first speed that is a low speed stage and the second speed stage that is a high speed stage.

The switching between the first speed stage and the second speed stage in the traveling motors can be performed by a switching device. The switch 61 is operably connected to the controller 60, and can be operated by an operator or the like. The switching device (that is, the switch 61) can switch between an acceleration position to shift the rotation speed stage of the traveling motors from the first speed stage to the second speed stage (that is, to shift the traveling switching valve 34 from the first state to the second state), and a deceleration position to shift the rotation speed stage of the traveling motors from the second speed stage to the first speed stage (that is, to shift the traveling switching valve 34 from the second state to the first state).

The controller 60 is constituted of a semiconductor such as a CPU and an MPU, electrical and electronic circuits, or the like. The controller 60 switches the traveling switching valve 34 based on the switching operation of the switch 61. The switch 61 is a push switch. The switch 61, for example, outputs, to the controller 60, a command to shift the traveling motors to the second speed stage (a command to shift the traveling switching valve 34 to the second state) when the switch 61 is pressed while the traveling motors are at the first speed stage. When the switch 61 is pressed while the rotation speed stages of the traveling motors are each set to the second speed stage, the switch 61 outputs, to the controller 60, a command to shift each of the traveling motors to the first speed stage (a command to shift the traveling switching valve 34 to the first state). The switch 61 may be a push switch that can be held ON/OFF, and the switch 61 outputs, to the controller 60, a command to hold the traveling motors at the first speed stage when being held OFF, and outputs, to the controller 60, a command to hold the traveling motors at the second speed stage when being held ON.

When the controller 60 acquires the command for shifting the traveling switching valve 34 to the first state, the controller 60 demagnetizes a solenoid of the second switching valve 72 to shift the traveling switching valve 34 to the first state. When the controller 60 acquires the command for shifting the traveling switching valve 34 to the second state, the controller 60 magnetizes a solenoid of the second switching valve 72 to shift the traveling switching valve 34 to the second state.

The hydraulic system for the work machine has the first hydraulic pump P1, the second hydraulic pump P2, and the operation device (that is, the traveling operation device) 54. The first hydraulic pump P1 is a pump to be driven by power of the prime mover 32 and is constituted of a constant displacement type gear pump. The first hydraulic pump P1 is capable of supplying operation fluid stored in the tank 22. In particular, the first hydraulic pump P1 supplies operation fluid that is mainly used for control. For convenience of explanation, the tank 22 storing operation fluid may be referred to as an operation fluid tank. Of the operation fluid supplied from the first hydraulic pump P1, the operation fluid used for control is referred to as a pilot fluid, and a pressure of the pilot fluid is referred to as a pilot pressure.

The second hydraulic pump P2, is a pump to be driven by power of the prime mover 32, and is constituted of a constant displacement gear pump. The second hydraulic pump P2, is configured to supply operation fluid stored in the tank 22, and for example, supplies the operation fluid to a fluid line of the working system. The second hydraulic pump P2, supplies operation fluid, for example, to the boom cylinders 14 that operate the booms 10, the bucket cylinders 15 that operate the bucket, and the control valves (that is, flow control valves) that control and operate an auxiliary hydraulic actuator.

The operation device 54 is configured to operate the two traveling pumps (that is, the first traveling pump 53L and the second traveling pump 53R), and is capable of changing the angles of swash plates (referred to as swash plate angles) of the traveling pumps. The operation device 54 includes a traveling operation member 59 and a plurality of operation valves 55.

The traveling operation member 59 is an operation lever that is supported by the operation valves 55 and swings in a lateral direction (that is, the machine width direction) or the fore-and-aft direction. That is, relative to a neutral position N, the traveling operation member 59 is swingable to the right and to the left from the neutral position N, and swingable to the front and to the rear from the neutral position N. In other words, the operation lever 59 is swingable in at least four directions with reference to the neutral position N. For convenience of explanation, the forward and backward directions, that is, the fore-and-aft direction, may be referred to as a first direction. The rightward and leftward directions, that is, the lateral direction (that is, the machine width direction), may be referred to as a second direction.

The plurality of operation valves 55 are operated by the single traveling operation member 59. The plurality of operation valves 55 are actuated based on swinging of the operation lever 59. A delivery fluid line 40 is connected to the plurality of operation valves 55, and operation fluid (that is, pilot fluid) from the first hydraulic pump P1 can be delivered through the delivery fluid line 40. The plurality of operation valves 55 include an operation valve 55A, operation valve 55B, operation valve 55C, and operation valve 55D.

When the operation lever 59 is swung forward (that is, in one direction) in the fore-and-aft direction (that is, the first direction) (that is, when a forward operation is performed), the operation valve 55A changes a pressure of operation fluid to be output according to an operation amount (that is, a swing amount) of the forward operation. When the operation lever 59 is swung backward (that is, the first direction) (that is, in the other direction) in the fore-and-aft direction (that is, when a backward operation is performed), the operation valve 55B changes a pressure of operation fluid to be output according to an operation amount (that is, a swing amount) of the backward operation. When the operation lever 59 is swung rightward (that is, in one direction) in the lateral direction (that is, the second direction) (that is, when a rightward operation is performed), the operation valve 55C changes a pressure of operation fluid to be output according to an operation amount (that is, a swing amount) of the rightward operation. When the operation lever 59 is swung leftward (that is, in the other direction) in the lateral direction (that is, the second direction) (that is, when a leftward operation is performed), the operation valve 55D changes a pressure of operation fluid to be output according to an operation amount (that is, a swing amount) of the leftward operation.

The plurality of operation valves 55 and the two traveling pumps (that is, the first traveling pump 53L and the second traveling pump 53R) are connected by the traveling fluid line 45. In other words, the two traveling pumps (that is, the first traveling pump 53L and the second traveling pump 53R) are hydraulic equipment that are configured to be operated by operation fluid output from the operation valves 55 (that is, the operation valve 55A, operation valve 55B, operation valve 55C, and operation valve 55D).

The traveling fluid line 45 has a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to a forward-traveling pressure-receiving portion 53a of the first traveling pump 53L. The second traveling fluid line 45b is a fluid line connected to a backward-traveling pressure-receiving portion 53b of the first traveling pump 53L. The third traveling fluid line 45c is a fluid line connected to a forward-traveling pressure-receiving portion 53a of the second traveling pump 53R. The fourth traveling fluid line 45d is a fluid line connected to a backward-traveling pressure-receiving portion 53b of the second traveling pump 53R. The fifth traveling fluid line 45e is a fluid line that connects the operation valves 55, the first traveling fluid line 45a, the second traveling fluid line 45b, the third traveling fluid line 45c, and the fourth traveling fluid line 45d.

When the operation lever 59 is swung forward (in a direction indicated by an arrowed line A1 in FIG. 10), the operation valve 55A is operated, and a pilot pressure is output from the operation valve 55A. This pilot pressure is applied to the forward-traveling pressure-receiving portion 53a of the first traveling pump 53L via the first traveling fluid line 45a and to the forward-traveling pressure-receiving portion 53a of the second traveling pump 53R via the third traveling fluid line 45c. In this manner, the swash plate angles of the first traveling pump 53L and the second traveling pump 53R are changed, the first traveling motor 36L and the second traveling motor 36R rotate normally (referred to as forward rotation), and the working device 1 travels straight forward.

When the operation lever 59 is swung backward (in a direction indicated by an arrowed line A2 in FIG. 10), the operation valve 55B is operated, and a pilot pressure is output from the operation valve 55B. This pilot pressure is applied to the backward-traveling pressure-receiving portion 53b of the first traveling pump 53L via the second traveling fluid line 45b and to the backward-traveling pressure-receiving portion 53b of the second traveling pump 53R via the fourth traveling fluid line 45d. In this manner, the swash plate angles of the first traveling pump 53L and the second traveling pump 53R are changed, the first traveling motor 36L and the second traveling motor 36R rotate reversely (referred to as backward rotation), and the working device 1 travels straight backward.

When the traveling control member 59 is swung to the right (in a direction indicated by an arrowed line A3 in FIG. 10), the control valve 55C is operated, and a pilot pressure is output from the control valve 55C. This pilot pressure is applied to the forward-traveling pressure-receiving portion 53a of the first traveling pump 53L via the first traveling fluid line 45a, and to the backward-traveling pressure-receiving portion 53b of the second traveling pump 53R via the fourth traveling fluid line 45d. In this manner, the swash plate angles of the first traveling pump 53L and the second traveling pump 53R are changed, and the first traveling motor 36L rotates normally and the second traveling motor 36R rotates reversely, and the working device 1 turns to the right.

When the traveling control member 59 is swung to the left (in a direction indicated by an arrowed line A4 in FIG. 10), the control valve 55D is operated, and a pilot pressure is output from the control valve 55D. This pilot pressure is applied to the forward-traveling pressure-receiving portion 53a of the second traveling pump 53R via the third traveling fluid line 45c, and to the backward-traveling pressure-receiving portion 53b of the first traveling pump 53L via the second traveling fluid line 45b. In this manner, the swash plate angles of the first traveling pump 53L and the second traveling pump 53R are changed, and the first traveling motor 36L rotates reversely and the second traveling motor 36R rotates normally, and the working device 1 turns to the left.

When the operation lever 59 is swung in an oblique direction, rotational directions and rotational speeds of the first traveling motor 36L and the second traveling motor 36R are determined by a differential pressure between the pilot pressures applied to the forward-traveling pressure-receiving portion 53a and the backward-traveling pressure-receiving portion 53b, and the working machine 1 turns to the right or the left while traveling forward or backward.

That is, when the operation member 59 is swung to be operated diagonally forward to the left, the working machine 1 turns left while traveling forward at a speed corresponding to the swing angle of the operation member 59. When the operation member 59 is swung to be operated diagonally forward to the right, the working machine 1 turns right while traveling forward at a speed corresponding to the swing angle of the operation member 59. When the operation member 59 is swung to be operated diagonally backward to the left, the working machine 1 turns left while traveling backward at a speed corresponding to the swing angle of the operation member 59. When the operation member 59 is swung to be operated diagonally backward to the right, the working machine 1 turns right while traveling backward at a speed corresponding to the swing angle of the operation member 59.

The controller 60 is connected to an accelerator 65 which sets a target rotation speed of the prime mover 32. The accelerator 65 is provided in the vicinity of the driver seat 8. The accelerator 65 is an acceleration lever supported swingably, an acceleration pedal supported swingably, as acceleration volume supported rotatably, an acceleration slider supported slidably, and the like. The accelerator 65 is not limited to the examples described above. The controller 60 is connected to the rotation detector 67 configured to detect an actual rotation speed of the prime mover 32. The rotation detector 67 allows the controller 60 to know an actual rotation speed of the prime mover 32. Based on an operation amount of the accelerator 65, the controller 60 sets a target rotation speed and controls an actual rotation speed so as to reach the set target rotation speed.

The controller 60 is configured to perform the automatic deceleration control to automatically decelerate from the second state (that is, the second speed stage) to the first state (that is, the first speed stage).

The controller 60 performs the automatic deceleration (that is, the automatic deceleration control) based on pressures in the circulation fluid lines 57h and 57i. A plurality of pressure detectors 80 are connected to the circulation fluid lines 57h and 57i. The plurality of pressure detectors 80 includes a first pressure detector 80a, a second pressure detector 80b, a third pressure detector 80c, and a fourth pressure detector 80d. The first pressure detector 80a is provided in the circulating fluid line 57h near the first port P11 of the first traveling motor 36L, and detects a pressure on the first port P11 side as a first traveling pressure V1. The second pressure detector 80b is provided in the circulating fluid line 57h near the second port P12 of the first traveling motor 36L, and detects a pressure on the second port P12 side as a second traveling pressure V2. The third pressure detector 80c is provided in the circulating fluid line 57i near the third port P13 of the second traveling motor 36R, and detects a pressure on the third port P13 side as a third traveling pressure V3. The fourth pressure detector 80d is provided in the circulating fluid line 57i near the fourth port P14 of the second traveling motor 36R, and detects a pressure on the fourth port P14 side as a fourth traveling pressure V4.

The controller 60A is connected to a mode switch 66 configured to enable or disable the automatic deceleration. For example, the mode switch 66 is a switch configured to be switched ON or OFF, and when it is ON, the mode switch 66 switches the automatic deceleration to be enabled, and when it is OFF, the mode switch 66 switches the automatic deceleration to be disabled.

When the automatic deceleration is enabled, the controller 60 performs the automatic deceleration from the second speed stage to the first speed stage when the first traveling pressure V1, the second traveling pressure V2, the third traveling pressure V3, and the fourth traveling pressure V4 become equal to or greater than a predetermined deceleration threshold, and the controller 60 restores the automatic deceleration from the first speed stage to the second speed stage when the first traveling pressure V1, the second traveling pressure V2, the third traveling pressure V3, and the fourth traveling pressure V4 become equal to or higher than a return threshold. The controller 60 performs the deceleration manually when the automatic deceleration is disabled.

In the above-described embodiment, the automatic deceleration is performed when the traveling pressures (that is, the first traveling pressure V1, the second traveling pressure V2, the third traveling pressure V3, and the fourth traveling pressure V4) is equal to or higher than the deceleration threshold; however, the method of performing the automatic deceleration is not limited thereto.

For example, the controller 60 may perform the automatic deceleration when any one of a first differential pressure $\Delta V1$ obtained by subtracting the second traveling pressure V2 from the first traveling pressure V1, a second differential pressure $\Delta V2$ obtained by subtracting the first traveling pressure V1 from the second traveling pressure V2, a third differential pressure $\Delta V3$ obtained by subtracting the fourth traveling pressure V4 from the third traveling pressure V3, and a fourth differential pressure $\Delta V4$ obtained by subtracting the third traveling pressure V3 from the fourth traveling pressure V4 becomes the deceleration threshold.

In addition, the controller 60 performs a control to prevent the engine stall (that is, the anti-stall control) when a load of the prime mover 32 is high. That is, the controller 60 performs the anti-stall control according to a load of the prime mover 32.

For example, when a dropping amount, which is a difference between a target rotation speed set by the accelerator 65 and an actual rotation speed detected by the rotation detector 67, is equal to or greater than a threshold, the controller 60 performs the anti-stall control because a high load is applied to the prime mover 32. In the anti-stall control, outputs of the traveling pumps (that is, the first traveling pump 53L and the second traveling pump 53R) are reduced by decreasing an opening degree of the actuation valve 69 shown in FIG. 10.

As shown in FIG. 10, the actuation valve 69 is a valve capable of changing a pilot pressure of pilot fluid that operates the traveling pumps (that is, the first traveling pump 53L and the second traveling pump 53R). The actuation valve 69 is provided in the delivery fluid line 40 through which the pilot fluid flows, and changes the opening degree to change a pilot pressure (that is, an operation pilot pressure acting on the pressure receiving portions 53a and 53b) of pilot fluid that operates the traveling pumps (that is, the first traveling pump 53L and the second traveling pump 53R). For example, the actuation valve 69 is an electromagnetic proportional valve whose opening degree can be changed based on a control signal (for example, a voltage or a current) of the controller 60. The actuation valve 69 is a valve whose opening degree increases as a value of the control signal (that is, a control value) increases and decreases as the control value decreases.

The controller 60 outputs a control signal to the actuation valve 69 to magnetize a solenoid of the actuation valve 69 to change a pilot pressure (that is, the traveling primary pressure) applied from the actuation valve 69 toward the operation device 54. In this manner, a pilot pressure to operate the traveling pumps (that is, the first traveling pump 53L and the second traveling pump 53R) is changed.

Figure 11:
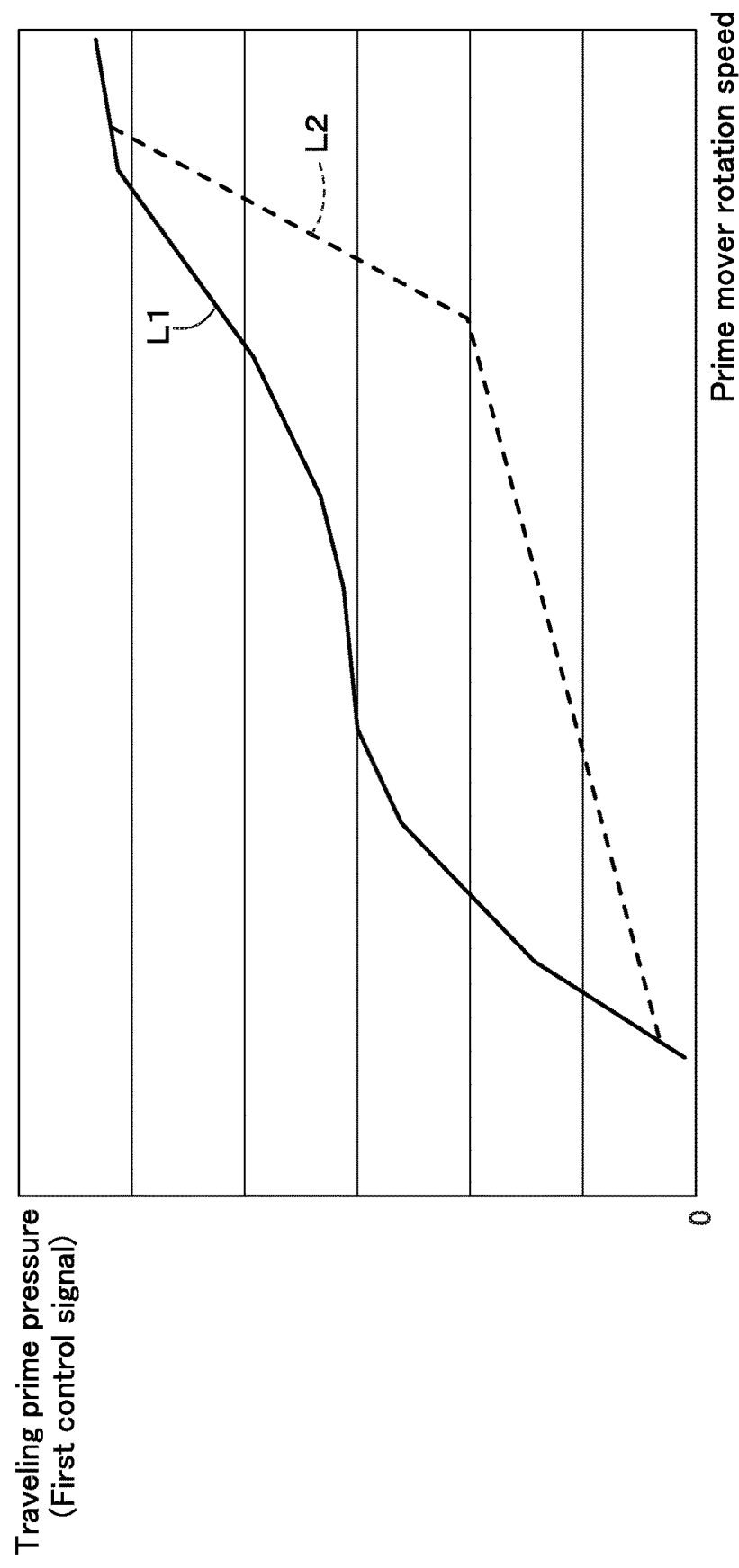
FIG. 11 is a view showing an example of a first control map showing a relation between a traveling primary pressure and a rotation speed of a prime mover in an anti-stall control according to the third embodiment.

FIG. 11 is a view showing an example of a first control map representing the relationship between a traveling primary pressure and a prime mover rotation speed in the anti-stall. In the first control map shown in FIG. 11, since the traveling primary pressure is determined according to an opening degree of the actuation valve 69, there is a correlation between the traveling primary pressure and a magnitude of the control signal (referred to as a first control signal) to be output to the actuation valve 69, and the traveling primary pressure can be replaced by the first control signal (that is, a first control value). That is, the traveling primary pressure on the vertical axis of the first control map can be replaced by the first control signal (that is, the first control value). The first control map is stored in the storage 63.

The controller 60 calculates a dropping amount that is a difference between a target rotation speed set by the accelerator 65 and an actual rotation speed detected by the rotation detector 67. When the dropping amount is less than a threshold, the controller 60 determines a first control value of first control signal according to a rotation speed of the prime mover (that is, a target rotation speed or an actual rotation speed) so that the first control value matches the line L1 of the first control map.

On the other hand, when the dropping amount is equal to or greater than the threshold, the controller 60 determines the first control value of first control signal according to a rotation speed of the prime mover (that is, a target rotation speed or an actual rotation speed) so that the first control value matches the line L2 of the first control map. That is, the controller 60 determines the first control values of current value, voltage value, and the like based on the first control map.

Thus, in the anti-stall control, a pilot pressure (that is, the traveling primary pressure) of operation fluid entering the operation valves 55 can be kept low by determining the first control value based on the line L2 and outputting, to the operation valve 69, the first control signal representing the first control value. As the result, the swash plate angles of the traveling pumps (that is, the first traveling pump 53L and the second traveling pump 53R) are adjusted, a load acting on the prime mover 32 is reduced, and the engine stall can be prevented. Although one line L2 is shown in FIG. 11, there may be multiple lines L2.

In addition, the controller 60 performs the shock reduction control to reduce a gear-shifting shock caused in the automatic deceleration. In the shock reduction control, the controller 60 reduces the gear-shifting shock by outputting a second control signal to the actuation valve 69 and controlling an opening degree of the actuation valve 69. In the shock reduction control, the actuation valve 69 increases the opening degree as the second control signal increases and decreases the opening degree as the second control signal decreases.

Figure 12:
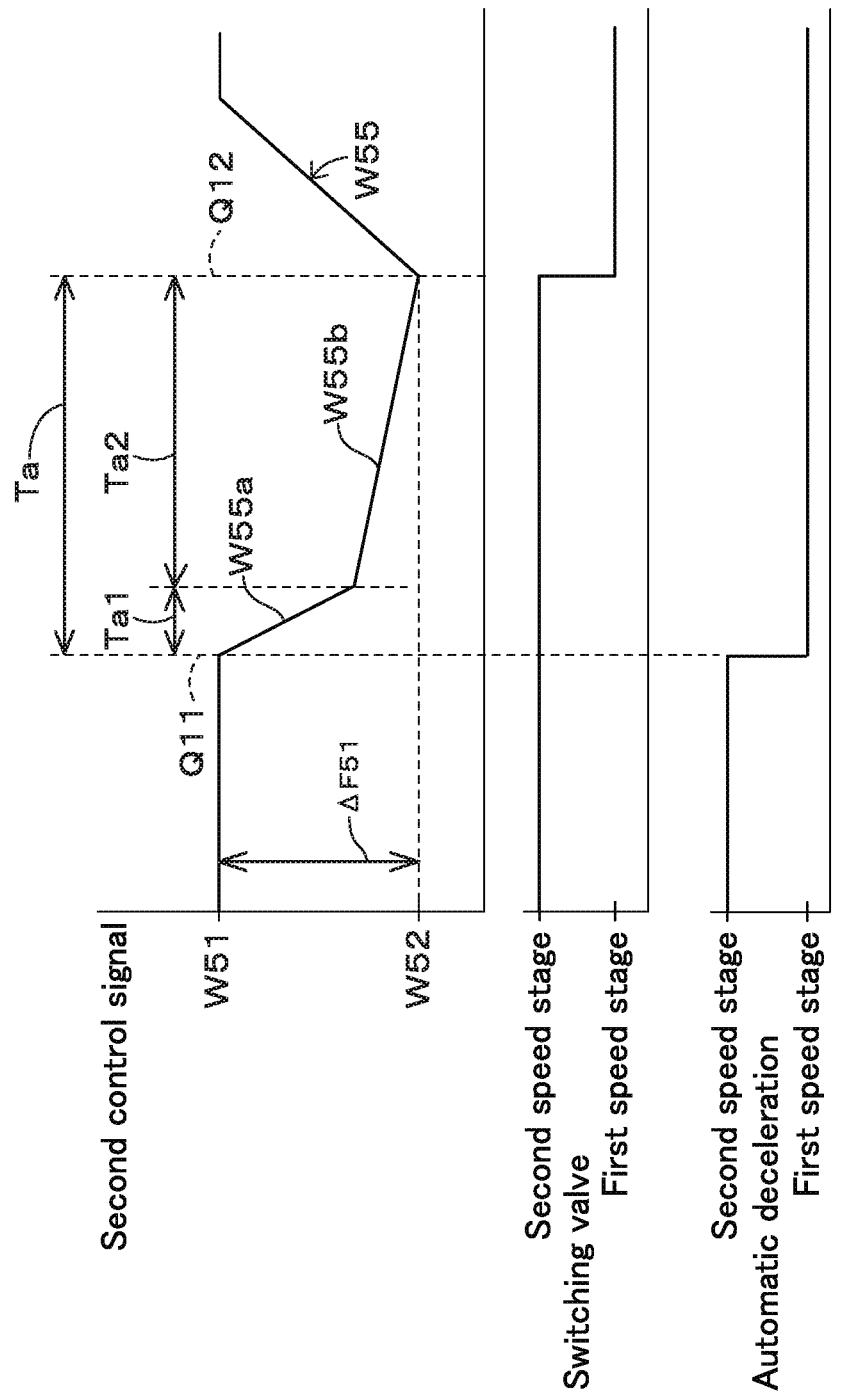
FIG. 12 is a view showing a relationship between switching of the traveling motor and a control value of a second control signal to be output to an actuation valve in a shock-reduction control for automatic reduction according to the third embodiment.

FIG. 12 is a view showing a relationship between a control value of second control signal to be output to the actuation valve 69 and the switching of the traveling motors in the shock reduction control in the automatic deceleration.

As shown in FIG. 12, at a time point Q11, the controller 60 determines a decreasing amount ΔF51 of control value of the second control signal when a command for automatic deceleration is provided, that is, conditions for the automatic deceleration are satisfied. The controller 60 determines the decreasing amount ΔF51 based on a traveling state of the working machine 1. For example, the controller 60 sets the decreasing amount ΔF51 to be larger when the working machine 1 is traveling straight, and sets the decreasing amount ΔF51 to be smaller when the working machine 1 is pivoting to turn. The method of setting the decreasing amount ΔF51 is not limited to the above-mentioned embodiment, and may be set according to a load of the prime mover, that is, a dropping amount which is a difference between an actual rotation speed of the prime mover and a target rotation speed. In this case, the controller 60 sets the decreasing amount ΔF51 to be smaller when a dropping amount is large and a load of the prime mover is large, and sets the decreasing amount ΔF51 to be larger when the dropping amount is small and the load of the prime mover is small.

When the decreasing amount ΔF51 is set, the controller 60 determines, as the decreasing value W52 in the shock reduction control, a value obtained by subtracting the decreasing amount ΔF51 from the control value (referred to as a current control value) W51 of the second control signal immediately before the decreasing.

After the decreasing value W52 is determined, the controller 60 decreases, toward the decreasing value W52, the second control value of the second control signal to be output to the actuation valve 69 from the time point Q11. When the second control value reaches the decreasing value W52 at the time point Q12, the controller 60 outputs a signal to magnetize the solenoid of the traveling switching valve 34 to switch the traveling switching valve (that is, the switching valve) 34 from the second state (that is, the first speed stage) to the first state (that is, the second speed stage) as shown in the line W55 representing the second control value, thereby performing the automatic deceleration. After the time point Q12, the second control value is restored toward the second control value W51 before the decreasing, as shown in a line W55.

In more detail, focusing on a decreasing section Ta from the time point Q11 which is a starting point of decreasing the second control value of second control signal to the time point Q12 which is a terminating point of decreasing the second control value of second control signal (the decreasing section Ta during which the second control value reaches the decreasing value W52), the controller 60 changes a decreasing speed of the second control value of second control signal in a section from the starting point of the decreasing section Ta to the midpoint (referred to as a first interval) Ta1 or in a section from the midpoint to the terminating point (referred to as a second interval) Ta2.

On the line W55 representing the second control value in the decreasing section Ta, the controller 60 determines a first decreasing speed in the first section Ta1 according to the gradient of the line W55a, determines the second decreasing speed in the second section Ta2 according to the gradient of the line W55b, and determines the first decreasing speed (that is, the gradient of the line W55a) to be larger than the second decreasing speed (that is, the gradient of the line W55b). That is, the controller 60 determines at least two decreasing speeds of the second control signal (that is, the second control value) in the decreasing section Ta.

As described above, the controller 60 is capable of performing both the anti-stall control and the shock reduction control. The controller 60 may perform the anti-stall control when the shock reduction control is being performed in the automatic deceleration. That is, the controller 60 may set, as the control signal to be output to the actuation valve 69, both the first control signal for performing the anti-stall control and the second control signal for performing the shock reduction control. In such a case, the controller 60 outputs one of the first control signal and the second control signal to the actuation valve 69 to decrease an opening degree of the actuation valve 69.

Specifically, when the controller 60 sets both the first control signal for the anti-stall control and the second control signal for the shock reduction control, the controller 60 compares the first control signal with the second control signal, selects the smaller one of the first control signal and the second control signal, and outputs the selected control signal to the actuation valve 69.

Figure 13:
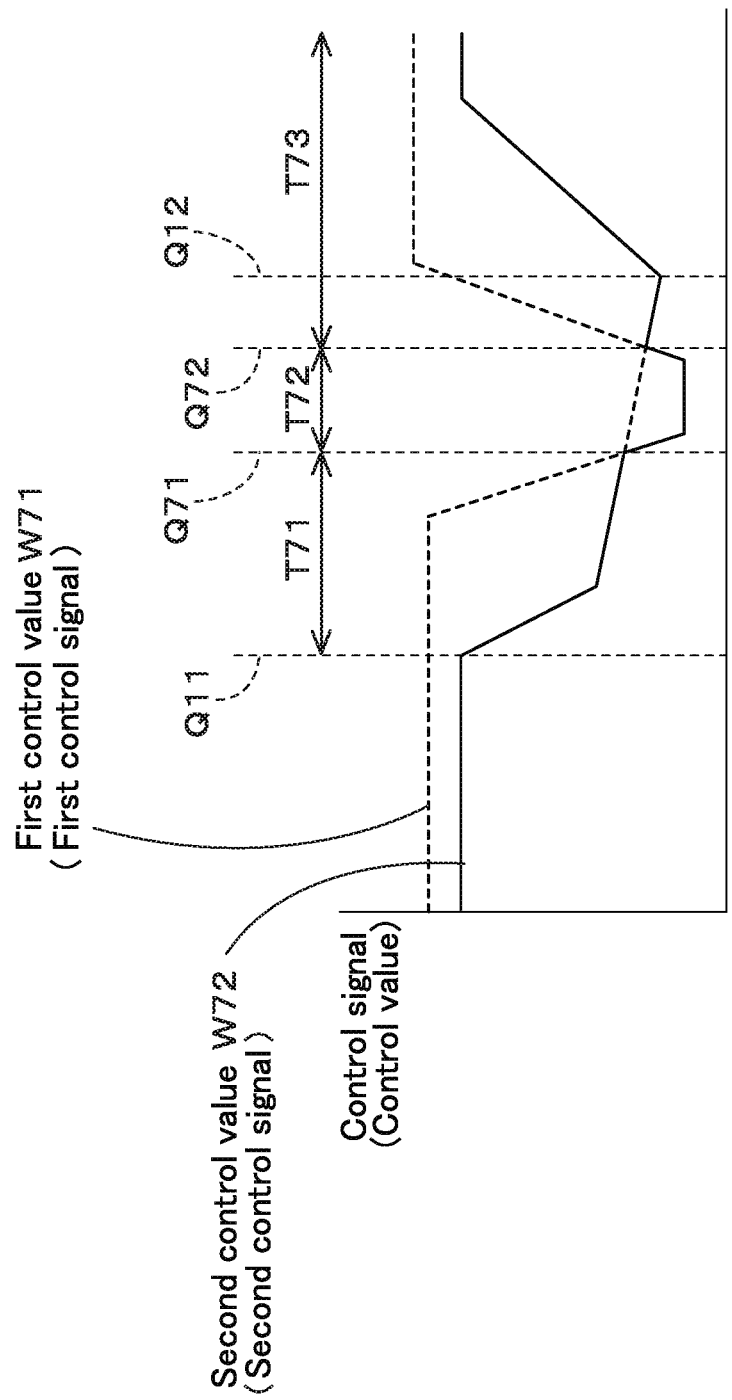
FIG. 13 is a view showing an example of a relationship between change of a first control value of a first control signal in an anti-stall control and change of a second control value of the second control signal in the shock-reduction control according to the third embodiment.

FIG. 13 shows change in the first control value of first control signal for the anti-stall control and change in the second control value of the second control signal for the shock reduction control. In FIG. 13, for convenience of explanation, the first control value (that is, the first control signal) is referred to as a "first control value (first control signal) W71" and the second control value (that is, second control signal) is referred to as a "second control value (second control signal) W72. In FIG. 13, the solid line shows a control signal output to the actuation valve 69.

As shown in FIG. 13, in the shock reduction control, the controller 60 compares the first control value W71 with the second control value W72 after the time point Q11. When the first control value W71 is larger than the second control value W72, the controller 60 outputs, to the actuation valve 69, the second control signal representing the second control value W72 which is a lower value than the first control value W71. When the first control value W71 is smaller than the second control value W72, the controller 60 outputs, to the actuation valve 69, the first control signal representing the first control value W71 which is a lower value than the second control value W72.

That is, the controller 60 outputs the second control signal corresponding to the second control value W72 in a control section T71 from the time point Q11 to the time point Q71, outputs the first control signal corresponding to the first control value W71 in the control section T72 from the time point Q72 to the time point Q72, and outputs the second control signal corresponding to the second control value 72 in the control section T72 after the time point Q72.

Figure 14:
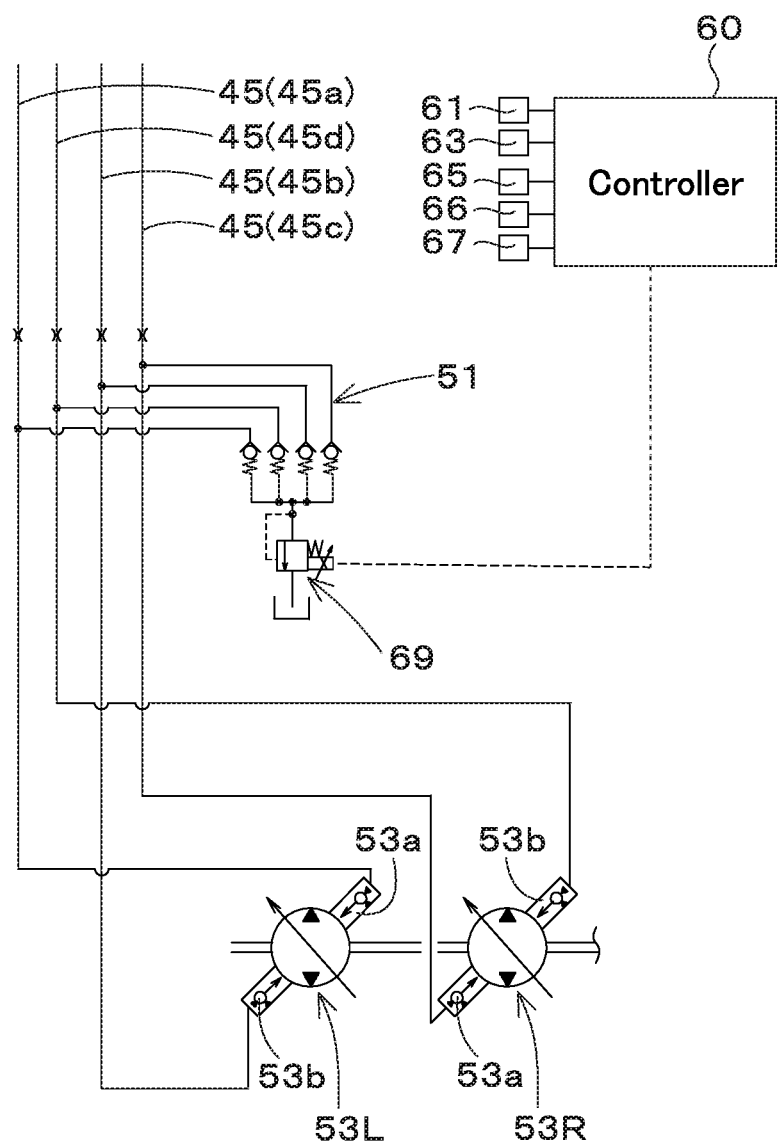
FIG. 14 is a view showing an example of a case where the actuation valve is provided to traveling fluid lines according to the third embodiment.

In the above-described embodiment, the actuation valve 69 is provided at the upstream (that is, in the delivery fluid line 40) of the operation valves 55, but alternatively, the actuation valve 69 may be provided at the downstream (that is, in the traveling fluid line 45) of the operation valves 55. For example, the actuation valve 69 may be provided in the middle of the fifth traveling fluid line 45e, or as shown in FIG. 14, fluid lines 51 may be branched from the first traveling fluid line 45a, the second traveling fluid line 45b, the third traveling fluid line 45c, and the fourth traveling fluid line 45d, and the actuation valve 69 such as a variable relief valve or a solenoid proportional valve may be provided to the fluid lines 51. In this manner, an opening degree of the actuation valve 69 may be controlled according to the first control signal and the second control signal.

Figure 15:
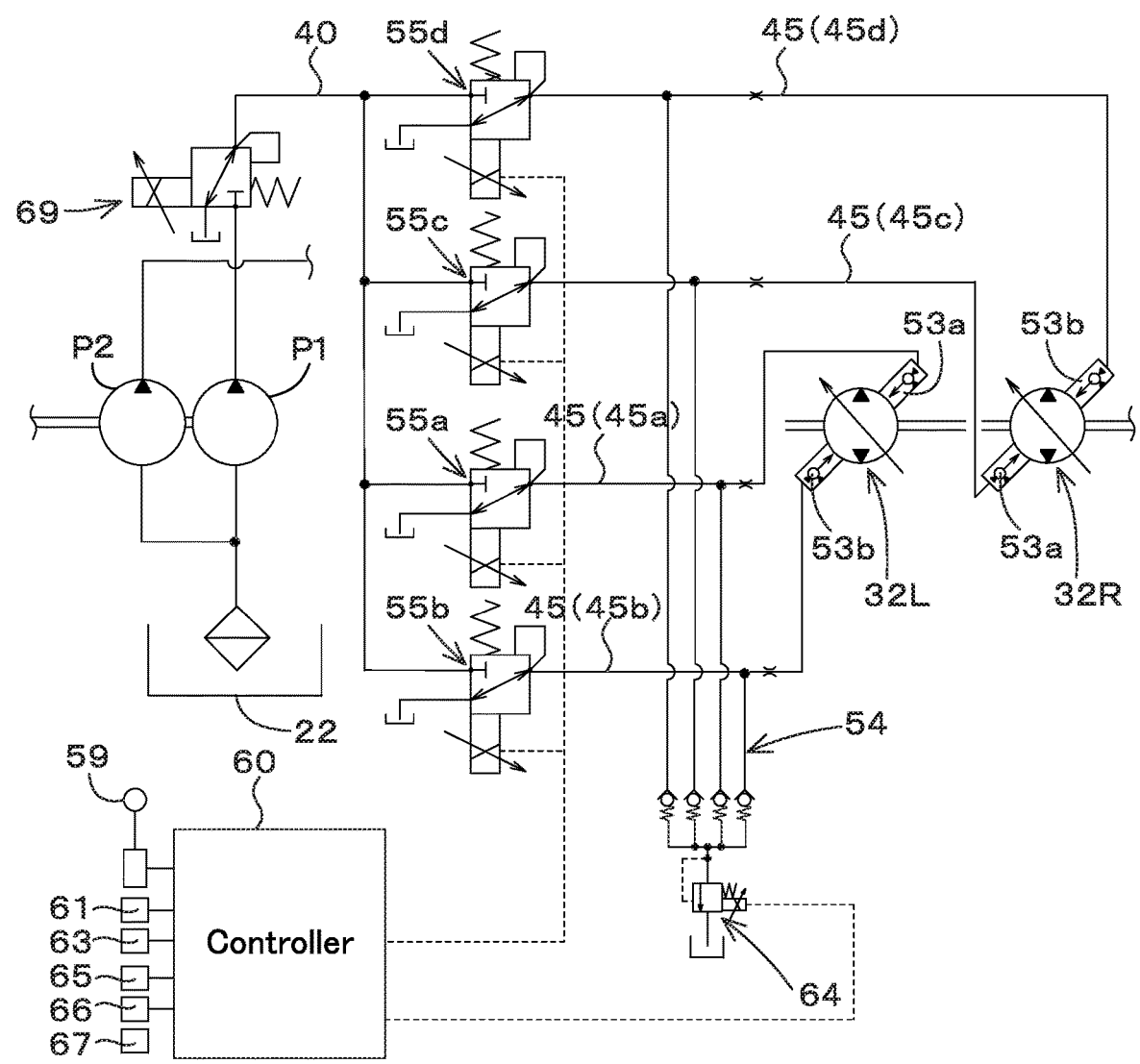
FIG. 15 is a view showing a part of a hydraulic circuit of a case where a traveling operation device is configured to be electrically operable according to the third embodiment.

In the above-described embodiment, the traveling operation device 54 employs a hydraulic type where the operation valves 55 change pilot pressures acting on the traveling pumps (that is, the first traveling pump 53L and the second traveling pump 53R), but as shown in FIG. 15, the traveling operation device 54 may be an electrically-operable device.

As shown in FIG. 15, the traveling operation device 54 has the operation member 59 swingable in the lateral direction (that is, the machine width direction) or the fore-and-aft direction, and the operation valves 55 (that is, the operation valves 55A, 55B, 55C, and 55D) constituted of electromagnetic proportional valves. The controller 60 is connected to the operation detector configured to detect an operation amount and operational direction of the operation member 59. The controller 60 controls the operation valves 55 (that is, the operation valves 55A, 55B, 55C, and 55D) based on the operation amount and operational direction detected by the operation detector.

When the operation member 59 is operated forward (in a direction A1, see FIG. 10), the controller 60 outputs a control signal to the operation valves 55A and 55C to tilt the swash plates of first and second traveling pumps 53L and 53R in a normal direction (that is, forward traveling).

When the operation member 59 is operated backward (in a direction A2, see FIG. 10), the controller 60 outputs a control signal to the operation valves 55B and 55D to tilt the swash plates of first and second traveling pumps 53L and 53R in a reverse direction (that is, backward traveling).

When the operation member 59 is operated to the right (in a direction A3, see FIG. 10), the controller 60 outputs a control signal to the operation valves 55A and 55D to tilt the swash plate of first traveling pump 53L in a normal direction and the swash plate of second traveling pump 53R in a reverse direction.

When the operation member 59 is operated to the left (in a direction A4, see FIG. 10), the controller 60 outputs a control signal to the operation valves 55B and 55C to tilt the swash plate of first traveling pump 53L in a reverse direction and the swash plate of second traveling pump 53R in a normal direction.

Figure 16:
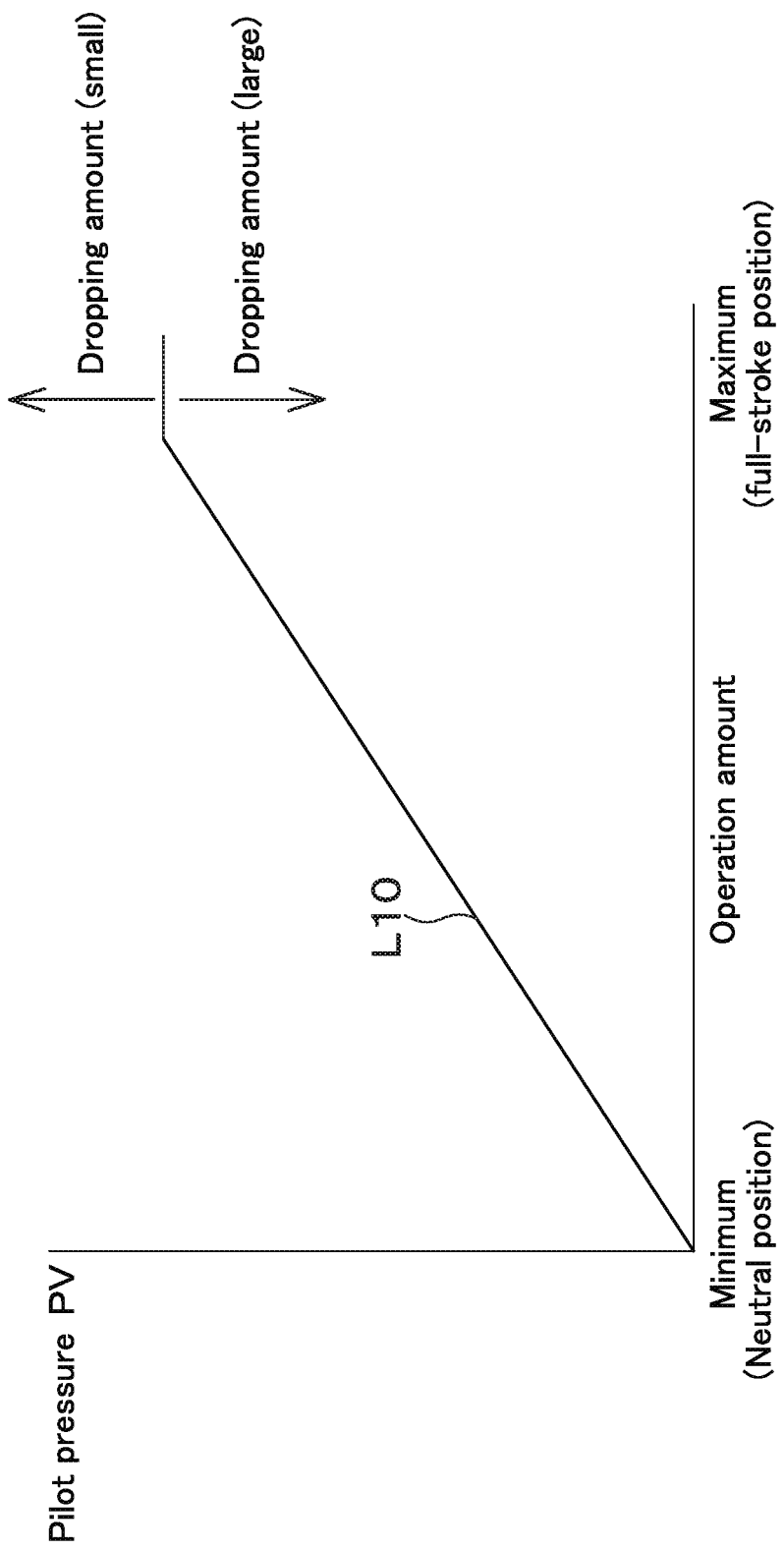
FIG. 16 is a view showing a relationship between a dropping amount, an operation amount, and a pilot pressure PV according to the third embodiment.

As described above, when the traveling operation device 54 is an electrically-operable device, as shown in FIG. 16, the controller 60 may determine a relationship between an operation amount of the operation member 59 and a pressure (that is, a pilot pressure) PV of operation fluid to be output from the operation valves 55 (that is, the operation valves 55A, 55B, 55C, and 55D) based on the dropping amount which is a difference between an actual rotation speed of the prime mover and a target rotation speed of the prime mover.

Referring to FIG. 16, the anti-stall control in the hydraulic circuit shown in FIG. 15 will be described. FIG. 16 shows a graph representing a relationship between an operation amount of the operation member 59 and magnitudes of the pilot pressures PV to be output from the operation valves 55 (that is, the operation valves 55A, 55B, 55C, and 55D). That is, the controller 60 operates the operation valves 55 (that is, the operation valves 55A, 55B, 55C, and 55D) so that the pilot pressures PV corresponding to the operation amount of operation member 59 are obtained.

For example, as shown in FIG. 16, when a dropping amount, which is a difference between an actual rotation speed of the prime mover and a target rotation speed of the prime mover, increases, the controller 60 decreases a gradient of the line L10 representing a relationship between an operation amount of the operation member 59 and the pilot pressures PV to be output from the operation valves 55. In this manner, the pilot pressures PV corresponding to the operation amount of the operation member 59 is decreased.

Conversely, when a dropping amount decreases, the controller 60 increases the gradient of the line L10 representing the relationship between an operation amount of the operation member 59 and the pilot pressures PV. In this manner, the pilot pressures PV corresponding to the operation amount of the operation member 59 is increased.

In this manner, the controller 60 can increase or decrease the pilot pressures PV corresponding to an operation amount of the operation member 59 in accordance with a dropping amount which is a difference between an actual rotation speed of the prime mover and a target rotation speed of the prime mover. According to this configuration, even when the traveling operation device 54 is an electrically-operable device using a joystick or the like, the anti-stall control described in the present embodiment can be properly executed.

As shown in FIG. 15, fluid lines 54 may be branched from the first traveling fluid line 45a, the second traveling fluid line 45b, the third traveling fluid line 45c, and the fourth traveling fluid line 45d, and a variable relief valve 64 may be provided to the fluid lines 54. In this configuration, an upper limit of the pilot pressure PV may be set by adjusting a setting pressure of the variable relief valve 64.

In the above-described embodiment, as shown in FIG. 11, the anti-stall control is performed based on the first control map representing a relationship between the first control signal (that is, the first control value) and a rotation speed of the prime mover; instead of this configuration, the first control signal (that is, the first control value) may be set based on a relationship between the first control signal (that is, the first control value) and a traveling speed (that is, a vehicle speed) of the machine body 2. That is, the horizontal axis in FIG. 11 can be replaced with the traveling speed (that is, the vehicle speed). In this case, the controller 60 determines the first control value of first control signal so that the first control value matches the line L1 when a difference (that is, a dropping amount) between an actual traveling speed and a target traveling speed is less than a threshold, and determines the second control value of first control signal so that the second control value matches the line L2 when the dropping amount is equal to or greater than the threshold.

In the above-described embodiment, the hydraulic system is provided with the mode switch 66 configured to switch the automatic deceleration (that is, the auto deceleration control) to either an enabled state or a disabled state; however, in addition to this, the hydraulic system may have a switch configured to switch the anti-stall control to either an enabled state or a disabled state. In this case, the controller 60 executes the anti-stall control only when the anti-stall control is switched to the enabled state by the switch.

In the embodiment described above, the controller 60 outputs the second control signal in the automatic deceleration. However, the second control signal may be output in the manual deceleration.

The working machine 1 includes the prime mover 32, the traveling pump 53L or 53R (meaning at least one of the traveling pumps 53L and 53R) driven by power of the prime mover 32 to deliver operation fluid, the traveling motor 36L or 36R (meaning at least one of the traveling motors 36L and 36R) rotated by the operation fluid delivered from the traveling pump 53L or 53R to have a rotation speed stage shiftable between the first speed stage and the second speed stage higher than the first speed stage, the machine body 2 on which the prime mover 32, the traveling pump 53L or 53R, and the traveling motor 36L or 36R are provided, the traveling switching valve 34 shiftable between the first state in which the rotation speed stage of the traveling motor 36L or 36R is set to the first speed stage and the second state in which the rotation speed stage of the traveling motor 36L or 36R are set to the second speed stage, the actuation valve 69 having a variable opening to change a pilot pressure of a pilot fluid to control a flow of the operation fluid delivered from the traveling pump 53L or 53R, and the controller 60 to control the opening of the actuation valve 69. The controller 60 is capable of performing the anti-stall control to reduce the opening of the actuation valve 69 in correspondence to a load on the prime mover 32 by outputting the first control signal to the actuation valve 69, and performing the shock reduction control to reduce the opening of the actuation valve 69 in correspondence to the shift of the traveling switching valve from the second state to the first state by outputting a second control signal to the actuation valve 69. The controller 60 selectively outputs either one of the first control signal and the second control signal to reduce the opening of the actuation valve 69.

According to this configuration, since either the first control signal or the second control signal is output to the actuating valve, the opening of the actuation valve can be changed according to the first control signal or the second control signal, and both the reduction of the gearshift shock and the prevention of engine stalling of the prime mover (that is, the anti-stall) can be easily performed. That is, the gearshift shock can be easily reduced, and the engine stall of the prime mover can be prevented.

The actuation valve 69 is configured so that, in the anti-stall control, the opening increases according to increase of a value of the first control signal and reduces as according to reduction of the value of the first control signal, and so that, in the shock-reduction control, the opening increases according to increase of a value of the second control signal and reduces according to reduction of the value of the second control signal. The controller 60 selects either one having the smaller value from the first control signal and the second control signal to reduce the opening of the actuation valve 69. According to this configuration, the opening of the actuation valve 69 can be easily changed in performing both the anti-stall control and the shock reduction control.

The working machine 1 includes the operation member 59 operably connected to the controller 60 to control the opening of the actuation valve 69. The controller 60 determines a relationship between an operation amount of the operation member 59 and the pilot pressure output from the operation valve 55 based on a dropping amount that is a difference between an actual rotation speed of the prime mover 32 and a target rotation speed of the prime mover 32. According to this configuration, no matter what the operation amount of the operation member 59 is, outputs of the traveling pumps 53L and 53R can be easily suppressed according to a load of the prime mover 32, that is, the dropping amount.

The working machine 1 includes the storage 63 storing the first control map in which a relationship between the first control value and a rotation speed of the prime mover 32 is set, and the controller 60 determines the first control value based on the first control map. According to this configuration, the anti-stall control can be easily controlled according to a rotation speed of the prime mover 32, the load fluctuating depending on a load of the prime mover 32.

The working machine 1 has the storage 63 storing the second control map in which a relationship between the first control value and a traveling speed of the machine body 2 is set, and the controller 60 determines the first control value based on the second control map. According to this configuration, the anti-stall control can be easily controlled according to a traveling speed.

In the anti-stall control, the controller 60 determines the first control signal based on a dropping amount that is a difference between an actual rotation speed of the prime mover 32 and a target rotation speed of the prime mover 32. In the shock-reduction control, the controller 60 determines the second control signal when the automatic deceleration control for shifting the traveling switching valve from the second state to the first state is performed. According to this configuration, the working machine 1 can be automatically decelerated (referred to as automatic deceleration) while preventing the engine stall of the prime mover (that is, the anti-stall).

Any valve may serve as the traveling switching valve 34 if it is configured to shift the rotation speed stage of the traveling motor (that is, at least one of the first travel motor 36L and the second travel motor 36R) between the first state in which the first speed stage is set and the second state in which the second speed stage is set, or may be a proportional valve having a configuration different from a directional valve.

The traveling motor may be a motor that has a neutral stage (that is, a neutral position) between the first speed stage and the second speed stage.

The traveling motor (that is, at least one of the first traveling motor 36L and the second traveling motor 36R) may be constituted of an axial piston motor or a radial piston motor. When the traveling motor is the radial piston motor, the rotation speed stage of the traveling motor can be switched to the first speed stage by increasing the motor capacity, and can be switched to the second speed stage by decreasing the motor capacity.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a prime mover;
a traveling pump driven by a power of the prime mover to deliver operation fluid;
a traveling motor rotated by the operation fluid delivered from the traveling pump to have a rotation speed stage shiftable between a first speed stage and a second speed stage higher than the first speed stage;
a traveling switching valve shiftable between a first state where the rotation speed stage of the traveling motor is set to the first speed stage and a second state where the rotation speed stage of the traveling motor is set to the second speed stage;
an actuation valve configured to change a pilot pressure of a pilot fluid to control a flow of operation fluid delivered from the traveling pump; and a controller configured to control the pilot pressure of the pilot fluid output from the actuation valve so that a value of the pilot pressure differs depending on whether the set rotation speed stage of the traveling motor is the first speed stage or the second speed stage.

2. The working machine according to claim 1, wherein the controller controls the pilot pressure based on whether the set rotation speed stage of the traveling motor is the first speed stage or the second speed stage.

3. The working machine according to claim 2, wherein when the rotation speed stage of the traveling motor is set to the first speed stage, the controller controls, based on a rotation speed of the prime mover, a first-speed pilot pressure that is the pilot pressure corresponding to the traveling motor having the rotation speed state set to the first speed stage, and
when the rotation speed stage of the traveling motor is set to the second speed stage, the controller controls, based on the rotation speed of the prime mover, a second-speed pilot pressure that is the pilot pressure corresponding to the traveling motor having the rotation speed stage set to the second speed stage.

4. The working machine according to claim 3, wherein the controller controls the second-speed pilot pressure to be lower than the first-speed pilot pressure.

5. The working machine according to claim 1, comprising:
an accelerator configured to determine a target rotation speed of the prime mover; and
a rotation detector configured to detect an actual rotation speed of the prime mover, wherein
the controller controls the pilot pressure according to a dropping rotation speed that is a difference between the target rotation speed and the actual rotation speed.

6. The working machine according to claim 5, wherein the controller adjusts the pilot pressure when the dropping rotation speed is equal to or higher than a first threshold.

7. The working machine according to claim 5, wherein the controller determines the pilot pressure based on the actual rotation speed when the dropping rotation speed is equal to or higher than a second threshold.

8. The working machine according to claim 1, wherein when the rotation speed stage of the traveling motor is set to the first speed stage, the controller controls, based on an actual rotation speed of the prime mover, a first-speed pilot pressure, which is the pilot pressure corresponding to the traveling motor having the rotation speed stage set to the first speed stage, and
when the rotation speed stage of the traveling motor is set to the second speed stage, the controller controls, based on the actual rotation speed of the prime mover, a second-speed pilot pressure, which is the pilot pressure corresponding to the traveling motor having the rotation speed stage set to the second speed stage, to be lower than the first-speed pilot pressure.

9. The working machine according to claim 8, comprising:
an accelerator configured to determine a target rotation speed of the prime mover; and
a rotation detector configured to detect an actual rotation speed of the prime mover, wherein
the controller includes:
a storage storing a first line determining the first-speed pilot pressure based on the actual rotation speed when the set rotation speed stage of the traveling motor is the first speed stage, a second line determining the second-speed pilot pressure based on the actual rotation speed when the set rotation speed stage of the traveling motor is the second speed stage, and a third line determining the first-speed pilot pressure and the second-speed pilot pressure based on the actual rotation speed regardless of whether the set rotation speed stage of the traveling motor is the first speed stage or the second speed stage; and
a determination unit configured to determine the pilot pressure based on any one of the first line, the second line, and the third line stored on the storage.

10. The working machine according to claim 9, wherein the determination unit determines the pilot pressure based on either the first line or the second line when a dropping rotation speed is equal to or higher than a third threshold, the dropping rotation speed being a difference between the target rotation speed determined by the accelerator and the actual rotation speed detected by the rotation detector.

11. The working machine according to claim 1, wherein the controller controls the pilot pressure to reduce an operation amount of operating the actuation valve before or after the rotation speed stage of the traveling motor is shifted to either the first speed stage or the second speed stage.

12. The working machine according to claim 1, wherein the controller reduces a rotation speed of the prime mover before or after the rotation speed stage of the traveling motor is shifted to either the first speed stage or the second speed stage.

13. The working machine according to claim 1, further comprising:
an accelerator configured to determine a target rotation speed of the prime mover; and
a rotation detector configured to detect an actual rotation speed of the prime mover, wherein
the controller controls the pilot pressure in a PI control or a PID control based on a dropping rotation speed that is a difference between the target rotation speed and the actual rotation speed.

14. The working machine according to claim 13, wherein in the PI control or the PID control, the controller uses a control gain that differs depending on whether the set rotation speed stage of the traveling motor is the first speed stage or the second speed stage.

15. The working machine according to claim 14, wherein in the PI control or the PID control, the controller uses a proportional gain that differs depending on whether the set rotation speed stage of the traveling motor is the first speed stage or the second speed stage.

16. The working machine according to claim 15, wherein in the PI control or the PID control, the controller uses a differential gain that differs depending on whether the set rotation speed stage of the traveling motor is the first speed stage or the second speed stage.

17. A working machine comprising:
a prime mover;
a traveling pump driven by a power of the prime mover and to deliver operation fluid;
a traveling motor rotated by the operation fluid delivered from the traveling pump to have a rotation speed stage shiftable between a first speed stage and a second speed stage higher than the first speed stage;
a machine body on which the prime mover, the traveling pump, and the traveling motor are mounted;

a traveling switching valve shiftable between a first state where the rotation speed stage of the traveling motor is set to the first speed stage and a second state where the rotation speed stage of the traveling motor is set to the second speed stage;

an actuation valve having a variable opening to change a pilot pressure of a pilot fluid to control a flow of the operation fluid delivered from the traveling pump; and a controller to control the opening of the actuation valve, the controller being capable of performing an anti-stall control to reduce the opening of the actuation valve in correspondence to a load on the prime mover by outputting a first control signal to the actuation valve, and performing a shock-reduction control to reduce the opening of the actuation valve in correspondence to the shift of the traveling switching valve from the second state to the first state by outputting a second control signal to the actuation valve, wherein the controller selectively outputs either the first control signal or the second control signal to reduce the opening of the actuation valve.

18. The working machine according to claim 17, wherein the actuation valve is configured so that, in the anti-stall control, the opening increases according to increase of a value of the first control signal and reduces according to reduction of the value of the first control signal, and so that, in the shock-reduction control, the opening increases according to increase of a value of the second control signal and reduces according to reduction of the value of the second control signal, and the controller selects either one having the smaller value of the first control signal and the second control signal to reduce the opening of the actuation valve.

19. The working machine according to claim 17, further comprising:

an operation member operably connected to the controller to control the opening of the actuation valve, wherein the controller determines a relationship between an operation amount of the operation member and the pilot pressure based on a dropping amount that is a difference between an actual rotation speed of the prime mover and a target rotation speed of the prime mover.

20. The working machine according to claim 17, further comprising a storage storing a first control map that defines a relationship between a value of the first control signal and a rotation speed of the prime mover, wherein the controller determines the value of the first control signal based on the first control map.

21. The working machine according to claim 17, further comprising a storage storing a second control map that defines a relationship between the value of the first control signal and a traveling speed of the machine body, wherein the controller determines the value of the first control signal based on the second control map.

22. The working machine according to claim 17, wherein in the anti-stall control, the controller determines the value of the first control signal based on a dropping amount that is a difference between an actual rotation speed of the prime mover and a target rotation speed of the prime mover, and in the shock-reduction control, the controller determines the value of the second control signal when an automatic deceleration control for shifting the traveling switching valve from the second state to the first state is performed.

* * * * *